US008023137B2

(12) United States Patent
Yasui et al.

(10) Patent No.: US 8,023,137 B2
(45) Date of Patent: Sep. 20, 2011

(54) IMAGE FORMING SYSTEM, IMAGE FORMING APPARATUS, USER INTERFACE DEVICE, EXTENDED USER INTERFACE COMPATIBILITY CONFIRMING METHOD, DOCUMENT SCANNING METHOD AND SETTING VALUE MANAGING METHOD

(75) Inventors: Toru Yasui, Osaka (JP); Hiroyuki Takaishi, Osaka (JP)

(73) Assignee: Kyocera Mita Corporation (JP)

( * ) Notice: Subject to any disclaimer, the term of this patent is extended or adjusted under 35 U.S.C. 154(b) by 198 days.

(21) Appl. No.: 12/365,736

(22) Filed: Feb. 4, 2009

(65) Prior Publication Data
US 2009/0198811 A1  Aug. 6, 2009

(30) Foreign Application Priority Data

| Feb. 5, 2008 | (JP) | 2008-024760 |
| Feb. 5, 2008 | (JP) | 2008-024762 |
| Feb. 5, 2008 | (JP) | 2008-024763 |
| Feb. 5, 2008 | (JP) | 2008-024764 |
| Mar. 21, 2008 | (JP) | 2008-074357 |

(51) Int. Cl.
*G06F 3/12* (2006.01)
(52) U.S. Cl. ....... 358/1.15; 358/474; 358/501; 358/518; 379/1.01; 379/211.01; 399/12; 399/27; 382/274
(58) Field of Classification Search .................. 358/474, 358/1.15, 1.18, 403, 400, 498, 515, 518, 358/520, 448; 709/223, 246, 207, 204, 206, 709/208; 379/1.01, 100.1, 211.01, 100.08; 399/12, 27, 46, 82
See application file for complete search history.

(56) References Cited

U.S. PATENT DOCUMENTS

| 5,761,394 | A | * | 6/1998 | Sugiura et al. | 358/1.9 |
| 7,110,691 | B2 | * | 9/2006 | Saida | 399/69 |
| 2002/0093698 | A1 | * | 7/2002 | Kagawa | 358/518 |
| 2003/0011633 | A1 | * | 1/2003 | Conley et al. | 345/762 |
| 2003/0084085 | A1 | * | 5/2003 | Breidenbach et al. | 709/1 |
| 2004/0240903 | A1 | * | 12/2004 | Saida | 399/69 |
| 2006/0077423 | A1 | | 4/2006 | Mathieson et al. | |
| 2007/0177194 | A1 | * | 8/2007 | Yamaguchi | 358/1.15 |
| 2008/0192293 | A1 | * | 8/2008 | Sugimoto | 358/1.15 |
| 2009/0080040 | A1 | * | 3/2009 | Lieberman | 358/504 |
| 2010/0266197 | A1 | * | 10/2010 | Whiting | 382/152 |

FOREIGN PATENT DOCUMENTS

| JP | 2004-536513 | 12/2004 |
| JP | 2006-127503 | 5/2006 |

* cited by examiner

*Primary Examiner* — Negussie Worku
(74) *Attorney, Agent, or Firm* — Stephen Chin

(57) ABSTRACT

An extended user interface compatibility confirming method has the steps of:
(a) connecting an image forming apparatus and an extended user interface device to a network, the extended user interface device having an extended operation panel and sending a web service request from the extended operation panel to the image forming apparatus to perform an image forming function corresponding to the web service request;
(b) requesting manufacturer information of the image forming apparatus from the image forming apparatus with SNMP protocol by the extended user interface device, and receiving the manufacturer information from the image forming apparatus by the extended user interface device; and
(c) sending a web service request compatible with the manufacturer information to the image forming apparatus by the extended user interface device to inquire whether or not the image forming apparatus is capable of using the extended user interface device.

36 Claims, 28 Drawing Sheets

FIG. 19A

SCANNER

RESOLUTION: 1200DPI IS NOT SELECTABLE.

| COLOR MODE | MONOCHROME ▼ | SCAN |
| DOCUMENT TYPE | TEXT ▼ | STOP |
| RESOLUTION | 1200DPI ▼ | |
| DOCUMENT ORIENTATION | VERTICAL ▼ | MAIN MENU |
| DOCUMENT SIZE | A4 ▼ | |

FIG. 19B

SCANNER

| COLOR MODE | COLOR ▼ | SCAN |
| DOCUMENT TYPE | TEXT ▼ | STOP |
| RESOLUTION | 600DPI ▼ | |
| DOCUMENT ORIENTATION | VERTICAL ▼ | MAIN MENU |
| DOCUMENT SIZE | A4 ▼ | |

FIG. 23A

SCANNER

RESOLUTION: 1200DPI HAS BEEN AUTOMATICALLY CHANGED TO 600DPI.

| COLOR MODE | MONOCHROME ▼ | SCAN |
| DOCUMENT TYPE | TEXT ▼ | STOP |
| RESOLUTION | 1200DPI ▼ | |
| DOCUMENT ORIENTATION | VERTICAL ▼ | MAIN MENU |
| DOCUMENT SIZE | A4 ▼ | |

FIG. 23B

SCANNER

| COLOR MODE | COLOR ▼ | SCAN |
| DOCUMENT TYPE | TEXT ▼ | STOP |
| RESOLUTION | 600DPI ▼ | |
| DOCUMENT ORIENTATION | VERTICAL ▼ | MAIN MENU |
| DOCUMENT SIZE | A4 ▼ | |

IMAGE FORMING SYSTEM, IMAGE FORMING APPARATUS, USER INTERFACE DEVICE, EXTENDED USER INTERFACE COMPATIBILITY CONFIRMING METHOD, DOCUMENT SCANNING METHOD AND SETTING VALUE MANAGING METHOD

CROSS-REFERENCE TO RELATED APPLICATIONS

This application relates to and claims priority rights from Japanese Patent Applications:
No. 2008-024764, filed on Feb. 5, 2008,
No. 2008-024762, filed on Feb. 5, 2008,
No. 2008-024760, filed on Feb. 5, 2008,
No. 2008-024763, filed on Feb. 5, 2008, and
No. 2008-074357, filed on Mar. 21, 2008,
the entire disclosures of which are hereby incorporated by reference herein.

BACKGROUND OF THE INVENTION

1. Field of the Invention

This invention relates to image forming system, image forming apparatus, user interface device, extended user interface compatibility confirming method, document scanning method, and setting value managing method.

2. Description of the Related Art

To uniform user interface screens of a plurality of image forming apparatuses that manufacturers and/or types are different from each other, extended user interface devices are sometimes attached to the image forming apparatuses, respectively, and each of the extended user interface devices has a touch panel that includes a liquid crystal display device. In a method, these devices and apparatuses are connected to a server on a LAN (Local Area Network) via a communication medium, and the user interface device obtains an HTML file from the server, and the touch panel displays a user interface screen based on the HTML file.

The method uniforms user interface screens of a plurality of image forming apparatuses, and therefore usability is increased.

Another image forming apparatus operates in two modes: "discontinuous scan mode" and "continuous scan mode". "Discontinuous scan mode" (i.e. normal mode) identifies one scan job by detecting the end of a scan job at the timing when an auto sheet feeder finishes sending out a bunch of document paper sheets. On the other hand, "continuous scan mode" is capable of determining a plurality of scan operations for bunches of document paper sheets as one scan job.

SUMMARY OF THE INVENTION

Most extended user interface devices have a constant configuration regardless of manufacturers of image forming apparatuses. On the other hand, a user wants to use an extended user interface device with an image forming apparatus immediately after the extended user interface device is connected to the image forming apparatus. However, the user only uses it after it is determined that the image forming apparatus is compatible with the extended user interface device. Therefore, for the user, it is necessary to automatically determine whether the image forming apparatus is compatible with the extended user interface device.

When the extended user interface device sends a web service request to the image forming apparatus to inquire whether the image forming apparatus is compatible with the extended user interface device, the extended user interface device has to send a web service request in a format compatible with the type of the image forming apparatus. If the extended user interface device sends the web service request in an incompatible format, then only after a predetermined time has elapsed without any responses, the extended user interface device can find the incompatibility or that the image forming apparatus is not capable of receiving a web service request. Therefore, until receiving any responses, the extended user interface repeatedly has to send the web service request in another format. As a result, it takes a long time to automatically determine whether the image forming apparatus is compatible with the extended user interface device, and it also takes a long time for the extended user interface device to become in a ready state after the extended user interface device is started.

An objective of this invention is to provide an extended user interface compatibility confirming method, and a user interface device and an image forming system thereof, capable of automatically determining whether the image forming apparatus is compatible with the user interface device in a short time.

In another circumstance, a user interface device has only "discontinuous scan mode", and displays a general screen in "discontinuous scan mode". Consequently, even if an image forming apparatus has both of the scan modes, the image forming apparatus can not use "continuous scan mode" that is incompatible with the user interface device.

Another objective of this invention is to provide an image forming apparatus with an extended user interface device, a document scanning method, and an image forming system, capable of using both of "continuous scan mode" and "discontinuous scan mode" without a user operation for switching the scan mode and with a non-complex configuration even if the extended user interface device has only "discontinuous scan mode" of the extended operation panel.

In another circumstance, for a setting such as a scan resolution setting of photograph images in a scanner, a setting value such as "auto mode" of the scan resolution setting is selectable in some types of image forming apparatuses, but it is unselectable in the other types of image forming apparatuses. Corresponding to this selectability of setting values, the user interface server has to have different sets of user interface screen data compatible with respective types of image forming apparatuses not to display unselectable items in a menu, and therefore the user interface screen of an image forming apparatus has to be different from the user interface screen of another image forming apparatus. Further, if an image forming apparatus on the LAN is replaced to a new type of one, it is necessary to prepare new user interface screen data in the user interface server for the new type.

Another objective of this invention is to provide an image forming apparatus, a user interface device, and a setting value managing method, in which it is not necessary to change user interface data in a user interface server even if the image forming apparatus has an unselectable item on a uniform user interface screen or even if the new type of the image forming apparatus has another unselectable item.

In another circumstance where an image forming apparatus can receive a request for scanning a document image from not only its operation panel but also an outside device with communication, one of scan requests sometimes conflicts with another.

For example, in a system that an image forming apparatus and host computers are connected to a LAN, a first user puts a document on a paper drawer tray of a scanner in the image forming apparatus, and then the user temporarily goes away from the image forming apparatus due to urgent business or to take another document to be scanned. When the first user is far from the image forming apparatus, a second user comes to it, understands that someone forgets to pick up the document, removes the document from the tray, puts his/her document on the tray, and goes back to his/her host computer that can not be seen from the image forming apparatus. After the second user goes back, the first user comes back to the image forming apparatus, and removes the document (i.e. the second user's document) from the tray, puts his/her document (i.e. the first user's document) on the tray, and pushes down a scan start button on the operation panel.

Here, another image forming apparatus is connected to a LAN, and a user interface server is connected to the LAN to uniform screens of operation panels of the image forming apparatuses. The operation panels displays user interface screens based on a file obtained from the server with HTTP, and then the image forming apparatus sends a notification to the server when the first user pushes down the button, the server receives the notification, and sends a web service request to the image forming apparatus to start a scan operation.

In this case, if the image forming apparatus receives a scan start request from the host computer of the second user before receiving a scan start request as the web service request from the server, then a result of a scan operation in the image forming apparatus is not what the first and second users intend.

In another situation, the first user puts the document of a sheet on a flatbed of the image forming apparatus, and closes a lid, and the second user does not notice the document on the flatbed, and puts his/her document on the tray. In this situation, if the image forming apparatus receives scan start requests as well as the aforementioned scan start requests, then a result of a scan operation in the image forming apparatus is not what the first and second users intend.

In another case, if the respective host computers send scan requests to the image forming apparatus at the same time, then a result of a scan operation in the image forming apparatus is also not what users of the host computers intend.

Another objective of this invention is to provide an image forming apparatus and an image forming system, capable of preventing an unintended result when scan requests are received from an operation panel of the image forming apparatus and/or an outside device at a time.

The present invention solves these subjects as follows.

An extended user interface compatibility confirming method according to the first aspect of this invention, has the steps of:

(a) connecting an image forming apparatus and an extended user interface device to a network, the extended user interface device having an extended operation panel and sending a web service request from the extended operation panel to the image forming apparatus to perform an image forming function corresponding to the web service request;

(b) requesting manufacturer information of the image forming apparatus from the image forming apparatus with SNMP protocol by the extended user interface device, and receiving the manufacturer information from the image forming apparatus by the extended user interface device; and (c) sending a web service request compatible with the manufacturer information to the image forming apparatus by the extended user interface device to inquire whether or not the image forming apparatus is capable of using the extended user interface device.

An extended user interface compatibility confirming method according to the second aspect of this invention, has the steps of:

(a) connecting an image forming apparatus, an extended user interface device and a server apparatus to a network, the extended user interface device having an extended operation panel and sending a web service request from the extended operation panel to the image forming apparatus to perform an image forming function corresponding to the web service request, the server apparatus sending a user interface screen file requested by the extended user interface device;

(b) requesting manufacturer information of the image forming apparatus from the image forming apparatus with SNMP protocol by the server apparatus, and receiving the manufacturer information from the image forming apparatus by the server apparatus; and (c) sending a web service request compatible with the manufacturer information to the image forming apparatus by the server apparatus to inquire whether or not the image forming apparatus is capable of using the extended user interface device.

An extended user interface compatibility confirming method according to the third aspect of this invention, contains either the first or the second aspect, and has the step of:

(d) if the image forming apparatus is capable of using the extended user interface device, then sending a response of the request in the step (c) to the extended user interface device by the image forming apparatus to notify that the image forming apparatus is capable of using the extended user interface device, and starting a program in the image forming apparatus for using the extended user interface device.

By the first or the second aspect, it is automatically determined in a short time whether the image forming apparatus is compatible with the extended user interface device, and consequently, the extended user interface device can be used immediately when an image forming apparatus is added or replaced with a new one.

By the third aspect, the image forming apparatus automatically changes its operation mode to a mode in which it can use the extended user interface device.

A document scanning method according to the fourth aspect of this invention has the steps of:

(a) connecting an extended user interface device to an image forming apparatus, the extended user interface device having an extended operation panel, the image forming apparatus having an operation panel, and a scanner with an auto sheet feeder;

(b) sending a scan request to the image forming apparatus by the extended user interface device, the scan request corresponding to an instruction received by the extended operation panel;

(c) generating respective pieces of image data corresponding to document images scanned by the scanner according to either the scan request or respective first instructions received by the operation panel of the image forming apparatus after the scan request, and sending (1) the pieces of the image data and (2) scan end information corresponding to a second instruction received by the operation panel of the image forming apparatus, to the extended user interface device; and (d) receiving the pieces of image data and the scan end information by the extended user interface device, and determining that pieces of the image data received until the scan end information is received are image data of one scan job.

A document scanning method according to the fifth aspect of this invention contains the fourth aspect, and has the steps by the image forming apparatus of:

storing setting information in a storage unit, the setting information indicating a scan mode available when the image forming apparatus is capable of using the extended user interface device, the scan mode being either "continuous scan mode" or "discontinuous scan mode";

identifying the scan mode upon each of the first instructions;

if the scan mode is "continuous scan mode", then enabling the operation panel of the image forming apparatus to receive the first instructions and the second instruction; and if the scan mode is "discontinuous scan mode", then generating respective pieces of image data corresponding to document images scanned by driving the auto sheet feeder until the end of the document images according to the scan request, and automatically sending the scan end information to the extended user interface device after all the pieces of image data are sent.

A document scanning method according to the sixth aspect of this invention contains the fifth aspect, and in the sixth aspects, a workflow to specify a processing procedure is stored in the storage unit; and when the extended operation panel receives the second instruction, if the scan end information has been received, the extended user interface device executes a next process along the workflow.

By the fourth aspect, even though the extended user interface device has only "discontinuous scan mode" and the image forming apparatus has "continuous scan mode", the image forming apparatus can operate in "continuous scan mode" without a user operation for switching to "continuous scan mode" as follows. The image forming apparatus scans a bunch of document paper sheets according to an instruction from the extended user interface device, scans a next bunch of document paper sheets according to an instruction from the operation panel of the image forming apparatus, and ends a scan job when a scan job end instruction is input to the operation panel of the image forming apparatus.

By the fifth aspect, when the image forming apparatus is capable of using the extended user interface device, a user operation is not necessary for switching a scan mode of the image forming apparatus to "continuous scan mode".

By the sixth aspect, regardless of the scan mode, a next process can be executed along the workflow according to the second instruction after at least a bunch of document paper sheets is scanned.

A setting value managing method according to the seventh aspect of this invention has the steps of:

(a) connecting an image forming apparatus, a user interface device as an extended console of the image forming apparatus, and a user interface server to each other via a communication medium, the user interface server managing a screen transition of the user interface device;

(b) storing setting information on selectability of setting values in a storage unit of the image forming apparatus;

(c) receiving input of setting value selection information by a user interface screen of the user interface device, and sending the setting value selection information to the image forming apparatus by the user interface device upon receiving the input or finalizing the input; and (d) receiving the setting value selection information by the image forming apparatus, determining whether a setting value specified in the setting value selection information is selectable or not according to the setting information by the image forming apparatus, and if it is determined that the setting value is not selectable, then sending information that the setting value is not selectable to the user interface device by the image forming apparatus.

A setting value managing method according to the eighth aspect of this invention contains the seventh aspect, and has the step of:

(e) receiving the information that the setting value is not selectable, and displaying this information in the user interface screen by the user interface device.

A setting value managing method according to the ninth aspect of this invention contains the seventh or the eighth aspect, and in the ninth aspect, the setting information includes only unselectable setting values out of all setting values.

A setting value managing method according to the tenth aspect of this invention contains the seventh aspect, and in the tenth aspect, the user interface screen is displayed with a web browser; and the setting value selection information is sent as a SOAP request message in the step (c), and the information that the setting value is not selectable is sent as a SOAP response message in the step (d).

By the seventh aspect, in the user interface server, it is not necessary to use different programs for displaying user interface screens corresponding to the types of image forming apparatuses. Even if an image forming apparatus is replaced in the system, it is not necessary to change the program in the user interface server.

By the eighth aspect, the user interface device is not dependent on the type of the image forming apparatus.

By the ninth aspect, since the setting information includes only unselectable values, it reduces the amount of data required to determine whether the selected setting value is selectable or not.

By the tenth aspect, using a popular technology can reduce development costs.

A setting value managing method according to the eleventh aspect of this invention, has the steps of:

(a) connecting an image forming apparatus, a user interface device as an extended console of the image forming apparatus, and a user interface server to each other via a communication medium, the user interface server managing a screen transition of the user interface device;

(b) storing automatic change setting information in a storage unit of the image forming apparatus, the automatic change setting information including a pair of an unselectable setting value and a change value of the unselectable setting value;

(c) receiving input of setting value selection information by a user interface screen of the user interface device, and sending the setting value selection information to the image forming apparatus by the user interface device upon receiving the input or finalizing the input; and (d) receiving the setting value selection information by the image forming apparatus, determining whether a setting value specified in the setting value selection information is selectable or not according to the automatic change setting information by the image forming apparatus, and if it is determined that the setting value is not selectable, then changing the setting value to the change value of the setting value by the image forming apparatus.

A setting value managing method according to the twelfth aspect of this invention, contains the eleventh aspect, and further has the steps of:

further in the step (d), sending change notification information to the user interface device, and the change notification information indicates that the selected setting value was automatically changed to the change value.

A setting value managing method according to the thirteenth aspect of this invention, contains the twelfth aspect, and in the thirteenth aspect, (e) receiving the change notification information, and displaying the change notification information in the user interface screen by the user interface device.

A setting value managing method according to the fourteenth aspect of this invention, contains any of the eleventh to the thirteenth aspect, and in the fourteenth aspect, the automatic change setting information includes only pairs of respective unselectable setting values out of all available setting values and respective change values of the unselectable setting values.

A setting value managing method according to the fifteenth aspect of this invention, contains the thirteenth aspect, and in the fifteenth aspect, the user interface screen is displayed with a web browser; and the setting value selection information is sent as a SOAP request message in the step (c), and the change notification information is sent as a SOAP response message in the step (d).

By the eleventh aspect, it is not necessary to change user interface data in a user interface server even if the image forming apparatus has an unselectable item on a uniform user interface screen and/or even if the new type of the image forming apparatus has another unselectable item. In addition, the setting value is changed without a user operation.

By the twelfth aspect, the user interface device can notify a user of an automatic change of the unselectable setting value according to the change notification information.

By the thirteenth aspect, the automatic change of the unselectable setting value is notified to a user.

By the fourteenth aspect, the automatic change setting information includes only pairs of respective unselectable setting values and respective change values of the unselectable setting values, and consequently, the data amount of the automatic change setting information is reduced.

By the fifteenth aspect, using a popular technology can reduce development costs.

An image forming apparatus according to the sixteenth aspect of this invention, has:

a scanner;

a storage unit;

an instruction inputting part that has devices capable of receiving an instruction input at different places; and a control part that receives a scan start request from the instruction inputting part, drives the scanner upon receiving the request, and stores document image data output by the scanner in the storage unit.

The instruction inputting part relates a requester identifier to the scan start request and other scan-related requests.

The control part stores the requester identifier of a scan start request in the storage unit as a permission identifier when the scan start request is received, and does not receive another scan start request related to a requester identifier other than the permission identifier until a scan with the permission identifier is finished.

By the sixteenth aspect, the image forming apparatus prevents scan operations that a user does not intend.

These and other objects, features and advantages of the present invention will become more apparent upon reading of the following detailed description along with the accompanied drawings.

BRIEF DESCRIPTION OF THE DRAWINGS

FIG. 19A and FIG. 19B show user interface screens in which respective results of the process shown in FIG. 16A are displayed by a web browser;

FIG. 23A and FIG. 23B show user interface screens in which respective results of the process shown in FIG. 21 are displayed by a web browser;

DETAILED DESCRIPTION OF THE PREFERRED EMBODIMENT

Embodiment 1

Figure 5:
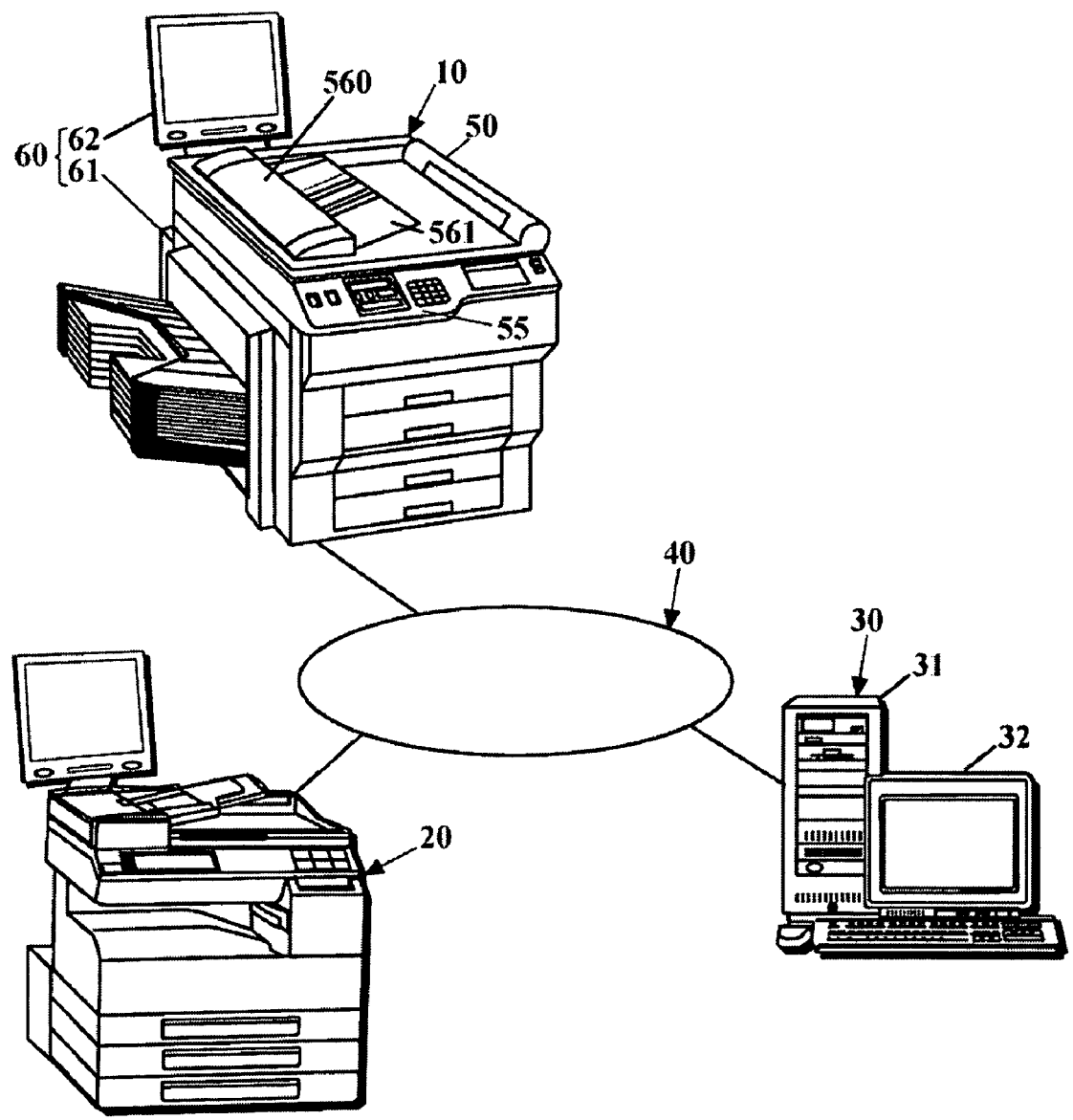
FIG. 5 shows a schematic diagram that indicates an image forming system according to Embodiment 1 of this invention.

FIG. 5 shows a schematic diagram that indicates an image forming system according to Embodiment 1 of this invention.

In the system, image forming apparatuses 10 and 20, and a server 30 are connected to a LAN 40. The type of the image forming apparatus 10 and the type of the image forming apparatus 20 are different from each other. For simplicity, the system has only two image forming apparatuses, but the system may have three or more image forming apparatuses. The server 30 provides a common service to image forming apparatuses of which machine types are not identical, and manages screen transitions of user interface screens on the image forming apparatuses to uniform the user interface screens, and executes processes such as a process to reduce a scanned document image to generate a preview image according to a request. To cooperate with the server 30, in the apparatus 10, an extended user interface device 60 is attached to an image forming apparatus 50 (i.e. an image forming apparatus body). The extended user interface device 60 is a computer system, and has an extended user interface device body 61 and a touch panel 62 attached to the body 61, and acts as an extended operation panel for the image forming apparatus 50.

The apparatus 20 has the same configuration as that of the apparatus 10. In Embodiment 1, all of the image forming apparatuses in the system are MFPs (Multi-Function Peripheral).

Hereinafter, a relationship between the apparatus 10 and the server 30 in Embodiment 1 will be explained, and a relationship between the apparatus 20 and the server 30 is the same as that between the apparatus 10 and the server 30.

Figure 6:
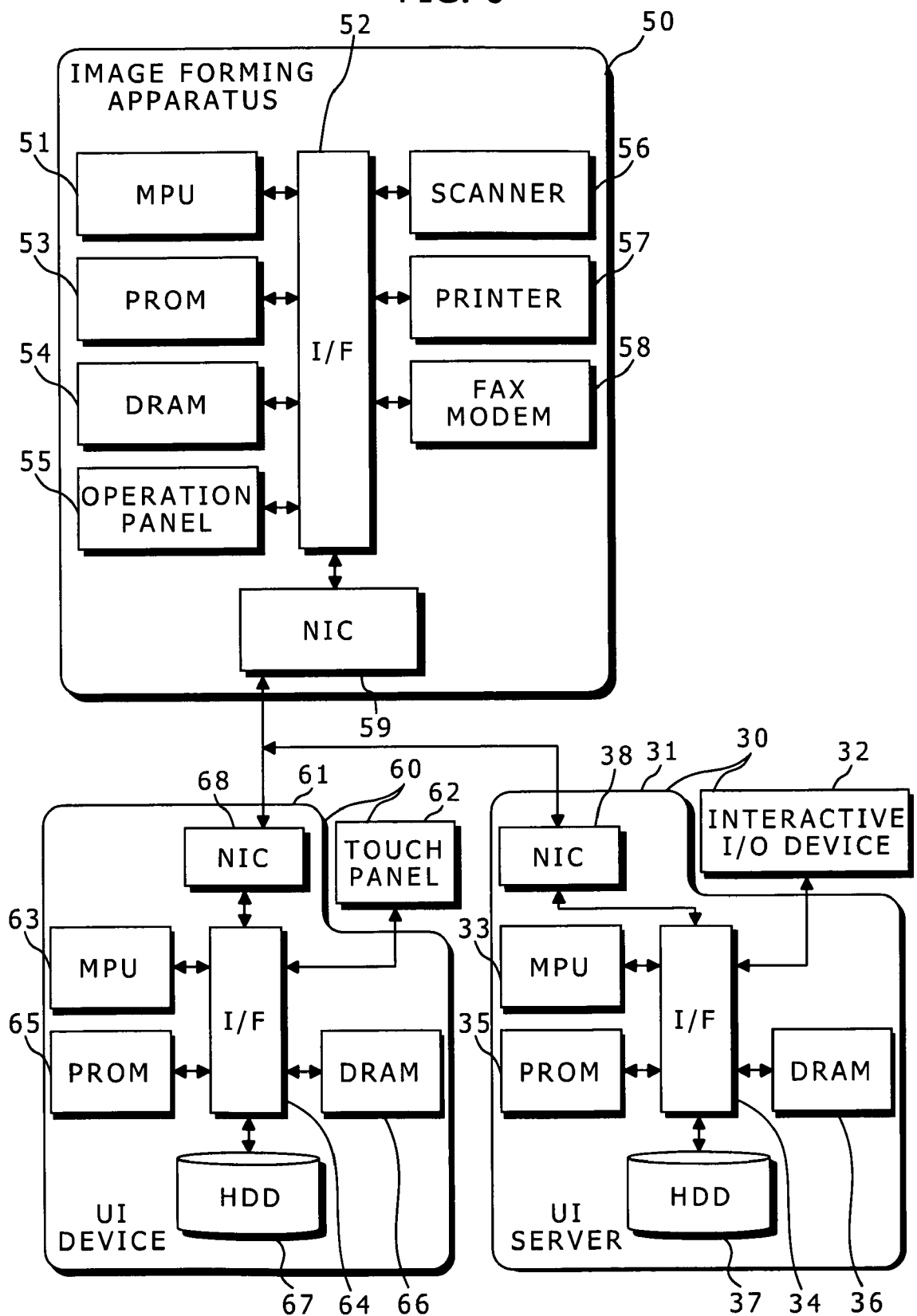
FIG. 6 shows a schematic block diagram that indicates a hardware configuration of the system shown in FIG. 5.

FIG. 6 shows a schematic block diagram that indicates a hardware configuration of the system shown in FIG. 5.

In the image forming apparatus 50, an MPU (Micro Processing Unit) 51 is connected to a PROM (Programmable Read Only Memory) 53, a DRAM (Dynamic Random Access Memory) 54, an operation panel 55, a scanner 56, a printer 57, a FAX modem 58, and a network interface 59 via interfaces 52.

For simplicity, the interfaces 52 are depicted as one block in FIG. 6.

In the PROM 53 such as flash memory, an operating system (OS), programs to be executed in an upper layer of the OS, and data have been stored. The programs are executed to embody an image forming function part, an SNMP agent, a web service server (a WS server), a processing part (i.e. a panel interface) for the operation panel, and a control unit for these processing parts. Image forming functions of the image forming function part includes copying, scanning, printing, transmitting and receiving facsimile data, and transmitting and receiving email.

The data stored in the PROM 53 include setting values and a MIB (Management Information Base). The WS server parses a SOAP request message received with SOAP/HTTP protocols, and provides a parsing result to the control unit, and generates a SOAP response message based on information from the control unit.

The DRAM 54 is used as a work area for converting image data to bitmap data, and so on.

The operation panel 55 has a display unit and a key input unit, receives input of setting information or instruction, and displays a screen such as selection screen or setting screen. In this embodiment, in a normal state the extended user interface device 60 is used instead of the operation panel 55, but when the image forming apparatus 50 operates in a standalone state due to system failure, the operation panel 55 is used.

The scanner 56 is a device to input an image for copying and facsimile transmission.

The printer 57 has a print engine, a toner cartridge, a fuser, a paper drawer, a paper transportation unit, and a paper output unit, and forms an electrostatic latent image on a photoconductor drum in the print engine with bitmap data supplied as print data, develops it with toner, transfers the toner image onto a sheet, fixes the toner image, and outputs the sheet.

The FAX modem 58 is a communicating device for facsimile transmission and reception. The network interface 59 is connected to the LAN 40, and the FAX modem 58 is connected to a PSTN (Public Switched Telephone Network) not shown.

In the extended user interface device body 61, an MPU 63 is connected to a PROM 65, a DRAM 66, an HDD 67, a network interface 68 and a touch panel 62 via interfaces 64.

In the PROM 65, a BIOS (Basic Input/Output System) and its setting values have been stored. The DRAM 66 is used for a main memory device of a virtual memory system.

In the HDD 67, programs have been installed to embody an OS, drivers, an SNMP manager, a web service (WS) client, a web browser, and a control unit. The WS client performs client-server communication with the WS server in the image forming apparatus 50. This control unit executes an initialization process via the WS client as mentioned below.

The web browser causes the touch panel 62 to display a screen based on a user interface screen file (an HTML file or an XHTML file) received from a TCP layer of the OS, and/or sends a service request to the image forming apparatus 50 and the server 30 via the WS client by executing a script described in the user interface screen file. The WS client generates a SOAP request message based on information from the web browser or the control unit, and parses a received SOAP response message, and provides a parsing result to the web browser or the control unit.

On the other hand, in the server 30, an MPU 33 is connected to a PROM 35, a DRAM 36, an HDD 37, a network interface 38, and an interactive input and output device 32 via interfaces 34.

The interactive input and output device 32 has a keyboard and a pointing device as input devices, and a display device as an output device.

In the PROM 35, a BIOS and its setting values have been stored. The DRAM 36 is used for a main memory device of a virtual memory system.

In the HDD 37, programs have been installed to embody an OS, drivers, a database (DB), a DBMS to manage the database, a web server, a WS server, and a web application. The DBMS performs retrieving, updating and adding data, a consistency check, an exclusive lock, and a shared lock. The WS server (i.e. a SOAP server) operates in an upper layer than the web server (i.e. an HTTP server). The WS server parses a received SOAP request message and provides a parsing result to the web application, and generates a SOAP response message based on information from the web application.

Figure 1:
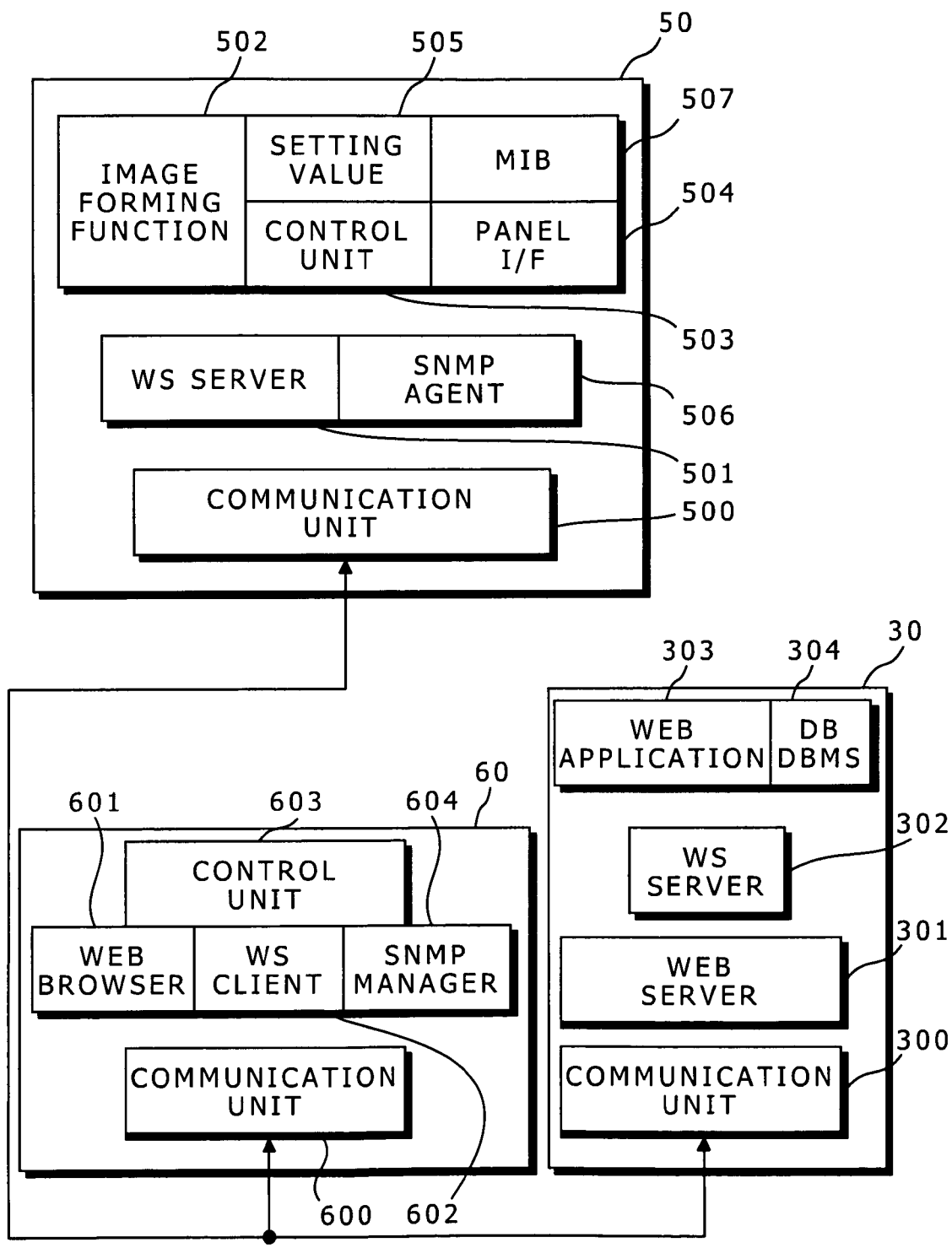
FIG. 1 shows a schematic diagram that indicates a software configuration in the image forming apparatus according to Embodiment 1 of this invention.

FIG. 1 shows a schematic block diagram that indicates a software configuration of the system shown in FIG. 6.

A communication unit 500 in the image forming apparatus 50, a communication unit 600 in the extended user interface device 60, and a communication unit 300 in the server 30 have respective drivers (data link layers) of the network interfaces, respective TCP/IP layers, and respective socket layers realized by executing programs.

When a user uses the extended user interface device 60, in the image forming apparatus 50, a control unit 503 rewrites a setting value in a setting value storage 505 or causes an image forming function part 502 to execute a process such as document scan according to a service request provided via a WS server 501 from the communication unit 500, and sends a result of either rewriting or the process to the requester of the service request. When a user uses the operation panel 55, the control unit 503 rewrites a setting value in a setting value storage 505 or causes an image forming function part 502 to execute a process such as document scan according to a service request provided via a panel interface 504 from the operation panel 55. An SNMP agent 506 receives a request of MIB data via the communication unit 500, and reads out the requested data from a MIB storage 507, and sends it to the requester of the request. The MIB storage 507 has MIB data that contains information on not only internal device states but also a manufacturer name and the type of the image forming apparatus 50. The type is one of MFP, printer, facsimile machine, and so on.

In the extended user interface device 60, a web browser 601 sends a request corresponding to a touch operation to a button on the touch panel 62, and receives a result of the request from the requestee as follows. The web browser 601 sends a request of a user interface screen file via the communication unit 600 to the server 30. The web browser 601 sends a service request such as setting value change request or scan request via a WS client 602 and the communication unit 600 to the image forming apparatus 50. The web browser 601 sends an image reduction service request via a WS client 602 and the communication unit 600 to the server 30. The WS client 602 has client proxy classes that have been generated based on WSDL files of respective manufacturers. The WS client 602 uses an instance of one of the client proxy classes corresponding to a manufacturer of the image forming apparatus 50.

The control unit 603 sends a request of an initialization information providing service (mentioned below) to the image forming apparatus 50 either via an SNMP manager 604 and the communication unit 600 or via the WS client 602 and the communication unit 600, not via the web browser 601.

Instead of the WS client 602 and/or the control unit 603, the web browser 601 can realize functions of the WS client 602 and/or the control unit 603 by parsing a script contained by the user interface screen file and executing the script with class libraries. Web service requests and dynamic update of the user interface screen file can be realized with AJAX (Asynchronous JavaScript and XML).

In the server 30, a web application 303 receives a request via the communication unit 300 and a web server 301, and performs a service corresponding to the request as follows. The web application 303 causes a data management unit 304 to register or update initial setting values of the image forming apparatus. The web application 303 dynamically generates a user interface screen file (e.g. an HTML file or an XHTML file) based on the setting values, and sends it as a response of the request. The user interface screen file is transmitted to the web browser 601. Further, the web application 303 receives an image reduction service request via the communication unit 300 and the web server 301, and performs an image reduction service corresponding to the request, and sends a result of the service as a response of the request.

Figure 2A:
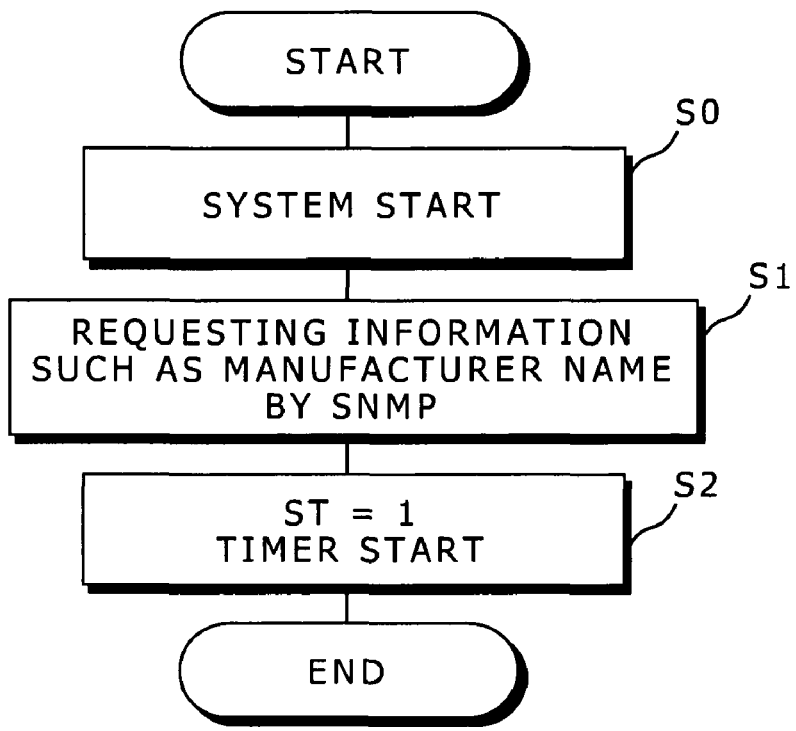
FIG. 2A shows a flowchart that indicates a process started at a system reset or when the extended user interface device is powered on, and FIG. 2B shows a flowchart that indicates a process of a receive event handler of a control unit in Embodiment 1.
Figure 3:
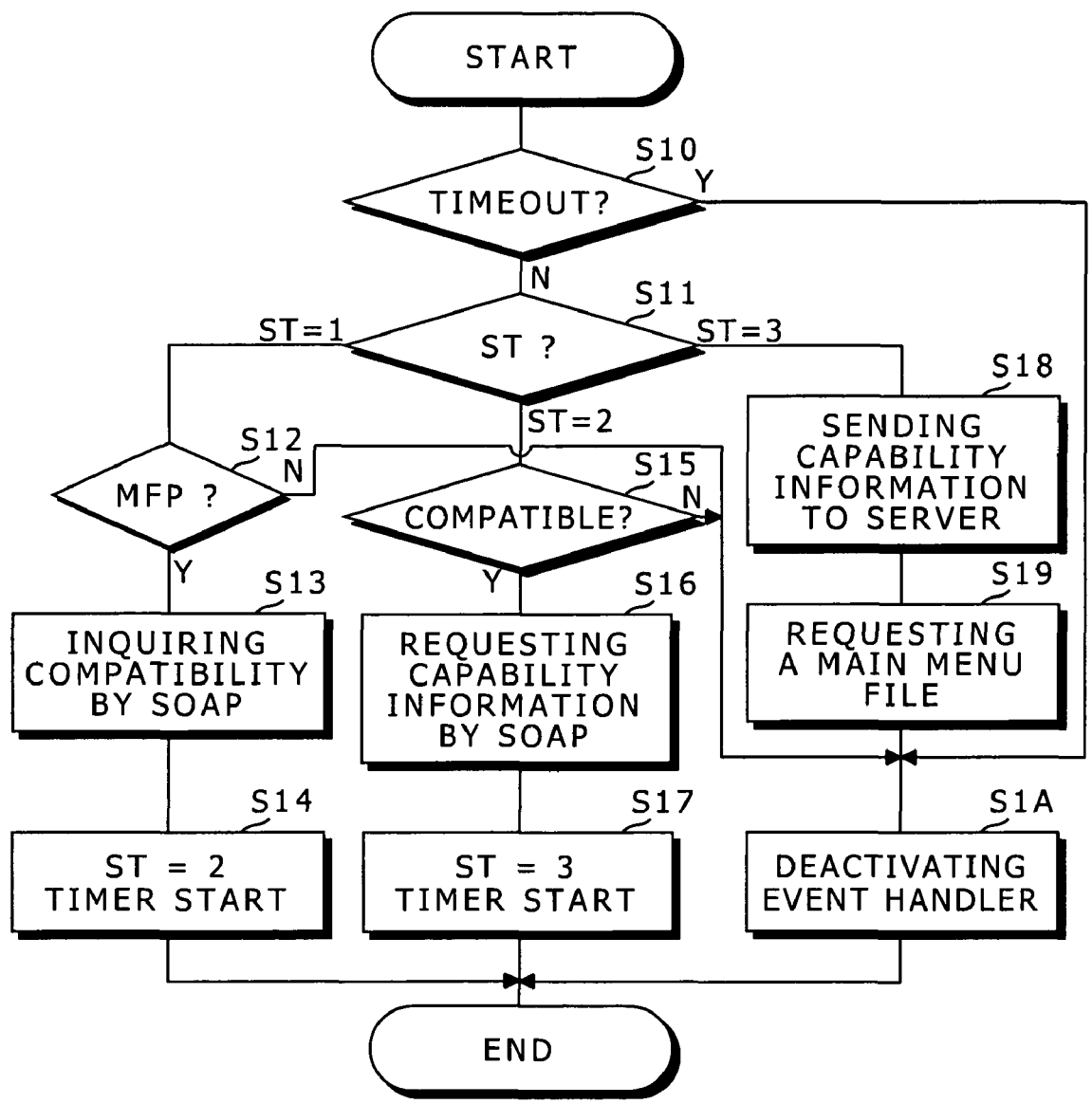
FIG. 3 shows a flowchart that indicates a process of an event handler of the control unit when a receive event or a timeout event occurs in Embodiment 1.

FIG. 2A and FIG. 3 show flowcharts that indicate a process to determine whether the image forming apparatus 50 is compatible with the extended user interface device 60, and to obtain capability information of the image forming apparatus 50 compatible with the extended user interface device 60. The control unit 603 executes the process shown in FIG. 2A and FIG. 3 except for Step S0 in FIG. 2A. The process shown in FIG. 2A is started at a system reset of the extended user interface device 60 or when the extended user interface device 60 is powered on.

Figure 4:
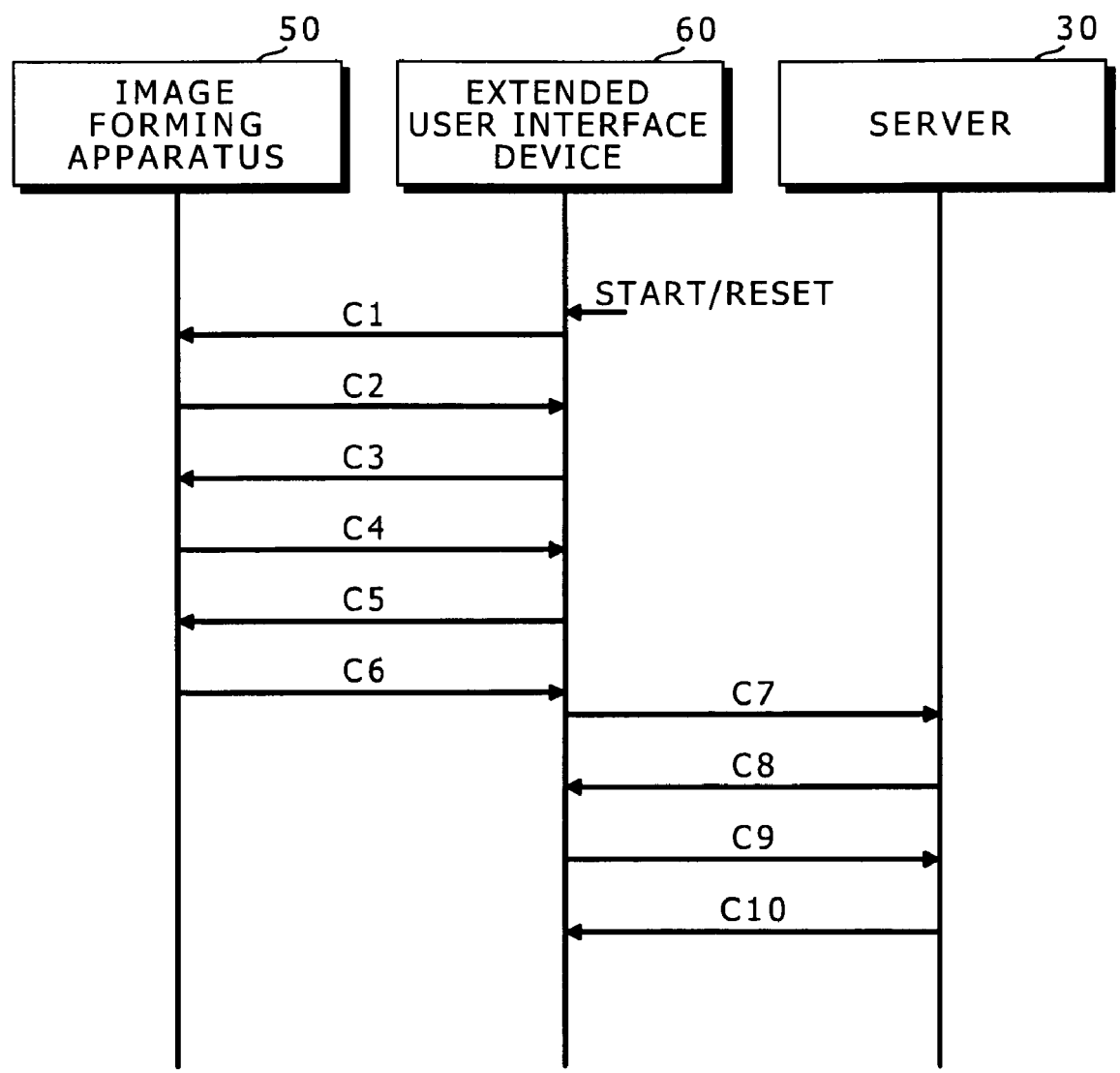
FIG. 4 shows a schematic sequence diagram that indicates communication between nodes in the system shown in FIG. 1 from startup or system reset of the extended user interface device until an initial menu is displayed on a screen of a touch panel in the extended user interface.

FIG. 4 shows a schematic sequence diagram that indicates communication between nodes in the system shown in FIG. 1 from a startup or a system reset of the extended user interface device until an initial menu is displayed on a screen of a touch panel in the extended user interface.

(Step S0) The extended user interface device 60 starts up its system. In the system, an OS is started up, and applications are started up to activate its functions. After Step S0, the control is moved to the control unit 603, and the control unit 603 executes a process as follows.

(Step S1) the control unit 603 sends a request of a manufacturer name and type information of the image forming apparatus 50 to the SNMP agent 506 via the SNMP manager 604 and the communication units 600 and 500 (C1 in FIG. 1).

The SNMP agent 506 receives the request, and reads out the requested data from the MIB storage 507, and sends the data to the SNMP manager 604 (C2 in FIG. 4).

(Step S2) the control unit 603 sets a variable ST as 1 and starts a timer after Step S1. The variable ST indicates a state of subsequent processes. The timer is used to detect that any responses of the request are not received within a predetermined time.

FIG. 3 shows a flowchart that indicates a process of an event handler of the control unit 603 when a receive event at the communication unit 600 or a timeout event occurs at the timer. For simplicity, in FIG. 3, it is assumed that the control unit 603 receives one of only responses corresponding to respective values of the variable ST (ST=1, 2 and 3) within a period of the initialization process.

The process in FIG. 3 is started when a receive event occurs due to a response of the request in Step S1.

(Step S10) the control unit 603 detects an event, and determines whether the event is a timeout event. If the event is a timeout event, the control unit 603 next executes Step S1A; otherwise, the control unit 603 next executes Step S11.

(Step S11) the control unit 603 identifies the value of the variable ST. If ST=1, then the control unit 603 next executes Step S12. If ST=2, then the control unit 603 next executes Step S15. If ST=3, then the control unit 603 next executes Step S18. At the first time, the variable ST is set as 1 in Step S2 of FIG. 2.

(Step S12) the control unit 603 determines whether the type information in the response indicates MFP. If the type information indicates MFP, the control unit 603 next executes Step S13; otherwise, the control unit 603 next executes Step S1A.

(Step S13) the control unit 603 inquires whether the image forming apparatus 50 is compatible with the extended user interface device 60 (C3 in FIG. 4). This inquiry is transmitted to the control unit 503 via the WS client 602, the communication units 600 and 500, and the WS server 501. Between the WS client 602 and the WS server 501, this inquiry is transmitted by SOAP protocol. To send the inquiry, the control unit 603 uses an instance of a client proxy class in the WS client 602. The client proxy class corresponds to the received manufacturer name.

(Step S14) the control unit 603 sets the variable ST as 2, and resets and starts the timer, and then ends this process of the event handler.

Figure 2B:
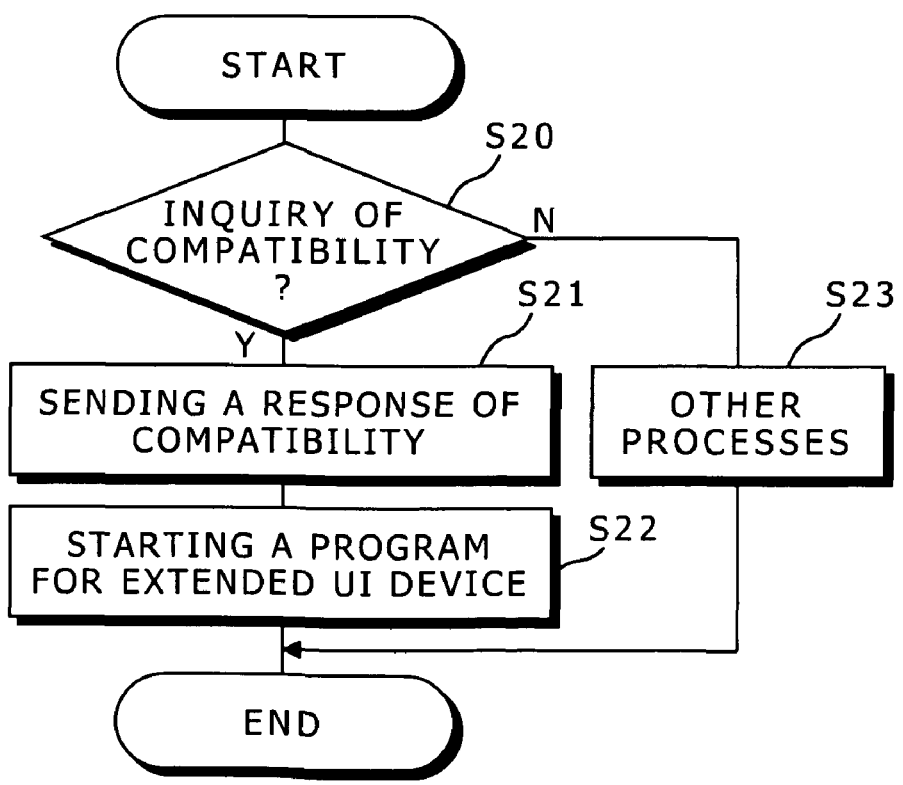

FIG. 2B shows a flowchart that indicates a process of the receive event handler of the control unit 503, and mainly indicates a process for the inquiry in Step S13.

(Step S20) the control unit 503 receives an inquiry or a request, and determines whether an inquiry of compatibility is received like the inquiry in Step S13. If it is determined that an inquiry of compatibility is received, the control unit 503 next executes Step S21; otherwise, the control unit 503 next executes Step S23.

(Step S21) the control unit 503 sends a response to the control unit 603 (C4 in FIG. 4). The response contains information that indicates whether the image forming apparatus 50 is compatible with the extended user interface device 60. The response is transmitted by SOAP protocol.

(Step S22) if the image forming apparatus 50 is compatible with the extended user interface device 60, then the control unit 503 starts a program to enable the image forming apparatus 50 to use the extended user interface device 60, and ends this process of the event handler. As a result, the operation panel 55 becomes unavailable, and the extended user interface device 60 becomes available after the extended user interface device 60 becomes in a ready state.

(Step S23) the control unit 503 executes a process corresponding to the received inquiry or request, such as scanning or facsimile transmission, and sends a result of the process as a response, and ends this process of the event handler.

If the control unit 603 of the user interface device 60 receives the response sent in Step S21 within a predetermined time, the control unit 603 restarts the process shown in FIG. 3, and determines that ST=2 in Step S11, and next executes Step S15.

(Step S15) the control unit 603 determines, according to the response, whether the image forming apparatus 50 is compatible with the extended user interface device 60. If the image forming apparatus 50 is compatible with the extended user interface device 60, the control unit 603 next executes Step S16; otherwise the control unit 603 next executes Step S1A.

(Step S16) the control unit 603 sends a request of capability information of the image forming apparatus 50 to the control unit 503 (C5 in FIG. 4). The capability information includes information used to identify an undisplayed part of the user interface screen in the extended user interface device 60, for example, information that indicates whether an MFP as the image forming apparatus 50 has an email transmission-reception function, whether the MFP has a postprocessing function of printing, and so on.

(Step S17) the control unit 603 sets the variable ST as 3, and resets and starts the timer, and ends this process of the event handler.

If the control unit 603 receives a response of the request sent in Step S16 from the control unit 503 within a predetermined time (C6 in FIG. 4), then the control unit 603 restarts the process shown in FIG. 3, and determines that ST=3 in Step S11, and next executes Step S18.

(Step S18) the control unit 603 sends the received capability information to the web application 303 in the server 30 by HTTP/SOAP protocols (C7 in FIG. 4). The web application 303 receives the capability information, and associates the capability information with the extended user interface device 60, and registers the capability information to the data management unit 304. The web application 303 sends information on a successful register to the control unit 603 (C8 in FIG. 4). For simplicity, this communication is not depicted in FIG. 3.

(Step S19) the control unit 603 causes the web browser 601 to send a request of a main menu file to the web application 303. The web application 303 receives the request from the web browser 601 (C9 in FIG. 4), and generates a main menu file based on the capability information of the extended user interface device 60, and sends the main menu file as a response to the web browser 601 (C10 in FIG. 4). The main menu file is either a standard main menu file or an edited main menu file. The edited main menu file is generated by deleting a part from the standard main menu file.

(Step S1A) the control unit 603 deactivates the event handler that executes the process in FIG. 3. The control unit 603 releases all event types related to the event handler.

By this embodiment, the extended user interface device 60 inquires, of the image forming apparatus 50 with SNMP protocol, (a) a manufacturer name of the image forming apparatus 50 and (b) whether the type of the image forming apparatus 50 is MFP or not. If the type is MFP, the image forming apparatus 50 inquires, as a web server request in a format corresponding to the manufacturer, whether the image forming apparatus 50 is compatible with the extended user interface device 60. Therefore, without an incompatible inquiry to the image forming apparatus 50, the extended user interface device 60 determines in a short time whether the image forming apparatus 50 is compatible with the device 60. Consequently, it reduces the time from startup to a ready state of the extended user interface device 60. Further, the image forming apparatus 50 automatically changes its operation mode to a mode in which the extended user interface device 60 is available. As a result, it is possible to use the extended user interface device 60 immediately after the image forming apparatus 50 is replaced.

Embodiment 2

A basic configuration of an image forming system according to Embodiment 2 of this invention is the same as that according to Embodiment 1 (FIG. 5).

Hereinafter, a relationship between the apparatus 10 and the server 30 in Embodiment 2 will be explained, and a relationship between the apparatus 20 and the server 30 is the same as that between the apparatus 10 and the server 30.

A hardware configuration of the image forming system according to Embodiment 2 is the same as that according to Embodiment 1 (FIG. 6).

In Embodiment 2, in the PROM 53 of the image forming apparatus 50, an operating system (OS), drivers, programs to be executed in an upper layer of the OS, and setting values have been stored. The programs are executed to embody an image forming function part, a web service server (a WS server), a processing part (i.e. a panel interface) for the operation panel, and a control unit for these processing parts. Image forming functions of the image forming function part includes copying, scanning, printing, transmitting and receiving facsimile data, and transmitting and receiving email. The WS server parses a SOAP request message received with SOAP/HTTP protocols, and provides a parsing result to the control unit, and generates a SOAP response message based on information from the control unit.

In Embodiment 2, the operation panel 55 has a display unit and a key input unit, receives input of setting information or instruction, and displays a screen such as selection screen or setting screen. In Embodiment 2, in a normal state the extended user interface device 60 is used instead of the operation panel 55, but when a system failure occurs the operation panel 55 is used. However, for a document scan, both of the extended user interface device 60 and the operation panel 55 can be used as mentioned below.

In Embodiment 2, in the HDD 67 of the extended user interface device 60, programs have been installed to embody an OS, drivers, a web service (WS) client, a web browser, and a control unit. The WS client performs client-server communication with the WS server in the image forming apparatus 50. This control unit executes an initialization process via the WS client as mentioned below. The web browser causes the touch panel 62 to display a screen based on a user interface screen file (an HTML file or an XHTML file) received from a TCP layer of the OS, and/or sends a service request to the image forming apparatus 50 and the server 30 via the WS client by executing a script described in the user interface screen file. The WS client generates a SOAP request message based on information from the web browser or the control unit, and parses a received SOAP response message, and provides a parsing result to the web browser or the control unit.

In Embodiment 2, in the HDD 37 of the user interface server 30, programs have been installed to embody an OS, drivers, a database (DB), a DBMS to manage the database, a web server, a WS server, and a web application. The DBMS performs retrieving, updating and adding data, a consistency check, an exclusive lock, and a shared lock. The WS server (i.e. a SOAP server) operates in an upper layer than the web server (i.e. an HTTP server). The WS server parses a received SOAP request message and provides a parsing result to the web application, and generates a SOAP response message based on information from the web application.

Figure 7:
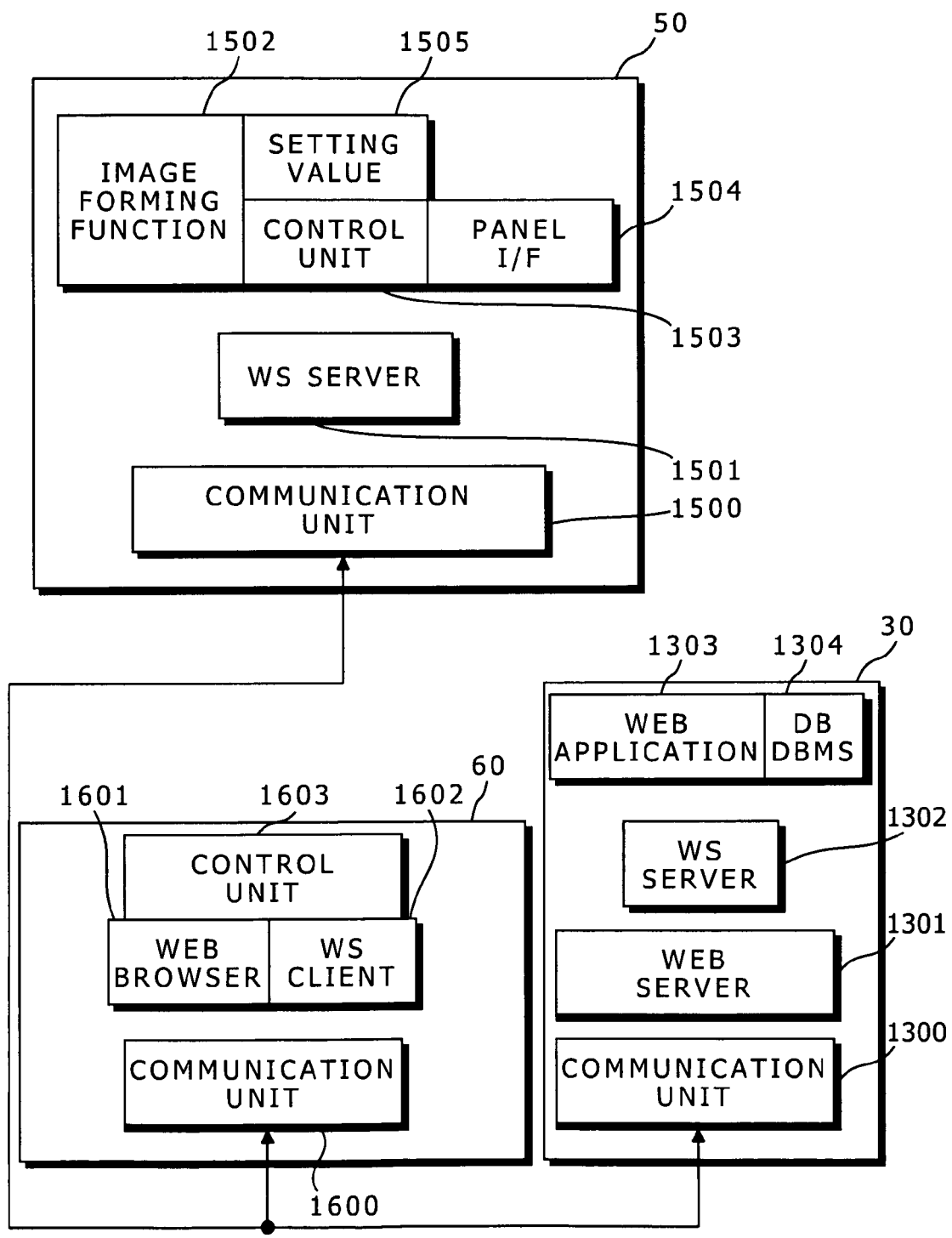
FIG. 7 shows a schematic diagram that indicates a software configuration in the image forming apparatus according to Embodiment 2 of this invention.

FIG. 7 shows a schematic diagram that indicates a software configuration in the image forming apparatus according to Embodiment 2 of this invention.

A communication unit 1500 in the image forming apparatus 50, a communication unit 1600 in the extended user interface device 60, and a communication unit 1300 in the server 30 have respective drivers (data link layers) of the network interfaces, respective TCP/IP layers, and respective socket layers realized by executing programs.

When a user uses the extended user interface device 60, in the image forming apparatus 50, a control unit 1503 rewrites a setting value in a setting value storage 1505 or causes an image forming function part 1502 to execute a process such as document scan according to either a service request provided via a WS server 1501 from the communication unit 1500 or a service request provided via a panel interface 1504 from the operation panel 55, and sends a result of either rewriting or the process to the requester of the service request.

In the extended user interface device 60, a web browser 1601 sends a request corresponding to a touch operation onto a button on the touch panel 62, and receives a result of the request from the requestee. The web browser 1601 sends a request of a user interface screen file via the communication unit 1600 to the server 30. The web browser 1601 sends a service request such as changing a setting value or scanning via a WS client 1602 and the communication unit 1600 to the image forming apparatus 50. The web browser 1601 sends an image reduction service request via a WS client 1602 and the communication unit 1600 to the server 30. The control unit 1603 sends a request of an initialization information providing service (mentioned below) to the image forming apparatus 50 via the WS client 1602 and the communication unit 1600, not via the web browser 1601.

Instead of the WS client 1602 and/or the control unit 1603, the web browser 1601 can realize functions of the WS client 1602 and/or the control unit 1603 by parsing a script contained by the user interface screen file and executing the script with class libraries.

Web service requests and dynamic update of the user interface screen file can be realized with AJAX.

In the server 30, a web application 1303 receives a request via the communication unit 1300 and a web server 1301, and performs a service corresponding to the request as follows. The web application 1303 causes a data management unit 1304 to register or update initial setting values of an image forming apparatus. The web application 1303 dynamically generates a user interface screen file (e.g. an HTML file or an XHTML file) based on the setting values, and sends it as a response of the request. The user interface screen file is transmitted to the web browser 1601. Further, the web application 1303 receives an image reduction service request via the communication unit 1300 and the web server 1301, and performs an image reduction service corresponding to the request, and sends a result of the service as a response of the request.

In FIG. 7, in an initialization process after the extended user interface device 60 is powered on, the control unit 1603 sends a request of an initialization information providing service to the image forming apparatus 50 via the WS client 1602 and the communication unit 1600. Specifically, the control unit 1603 inquires (a) whether the image forming apparatus 50 is compatible with the extended user interface device 60, and (b) available image forming functions in the image forming apparatus 50. This inquiry is provided to the control unit 1503 via the communication unit 1500 and the WS server 1501. If the image forming apparatus 50 is compatible with the extended user interface device 60, then the control unit 1503 starts a program to enable itself to use the extended user interface device 60, and sends a response of the inquiry via the WS server 1501 and the communication unit 1500. The response indicates that the image forming apparatus 50 is compatible with the extended user interface device 60, and contains capability information on the image forming functions. By the aforementioned service request and the aforementioned response, it is possible to use the extended user interface device 60 immediately after the image forming apparatus 50 is replaced.

Figure 8:
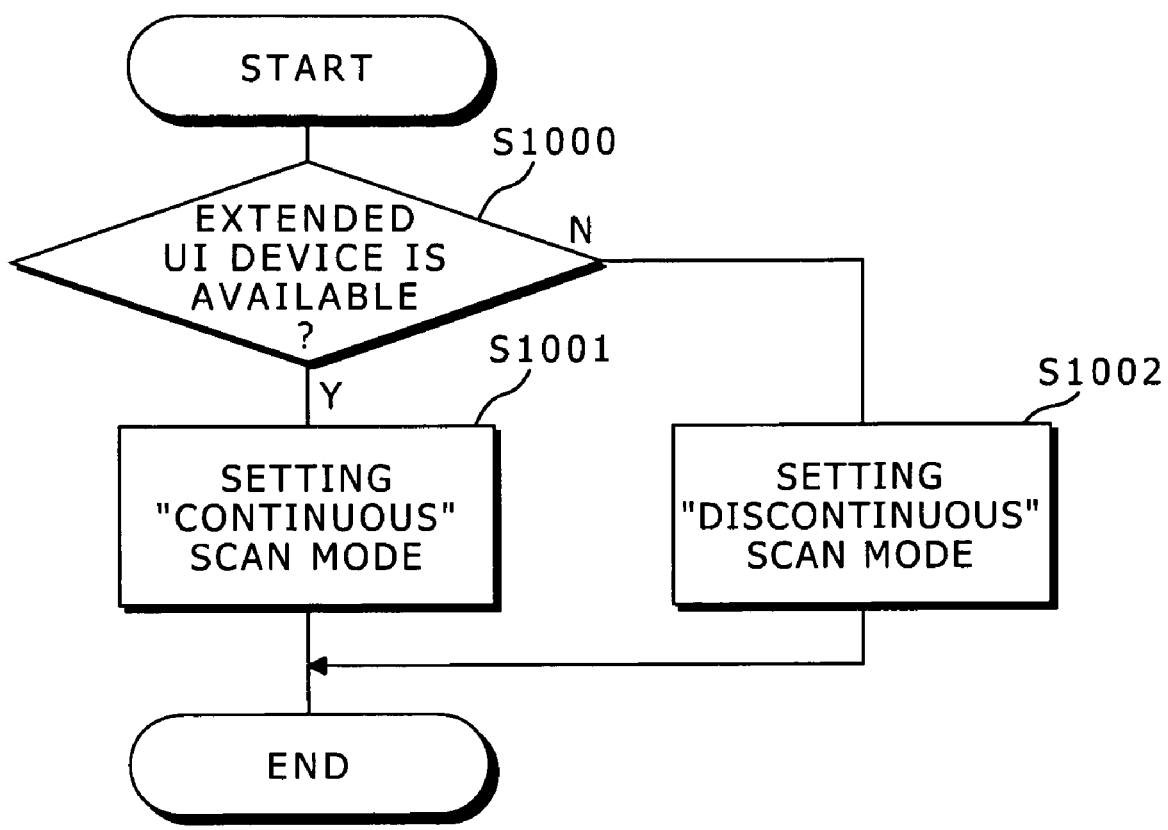
FIG. 8 shows a flowchart that indicates an initialization process of a scan mode in the image forming apparatus of Embodiment 2.

The control unit 1503 next executes an initialization process shown in FIG. 8.

(Steps S1000 to S1002) the control unit 1503 determines whether the extended user interface device 60 is available, that is, whether the program has been started to enable the image forming apparatus 50 to use the extended user interface device 60. If the program has been started, the control unit 1503 sets a scan mode as "continuous scan mode"; otherwise, the control unit 1503 sets a scan mode as "discontinuous scan mode". Here, the control unit 1503 sets a setting value of the scan mode stored in the setting value storage 1505 as either "continuous scan mode" or "discontinuous scan mode". Therefore, when the image forming apparatus 50 is used in an image forming system, the default scan mode is set as "continuous scan mode". When the image forming apparatus 50 is used in a standalone state, the default scan mode is set as "discontinuous scan mode".

Figure 12:
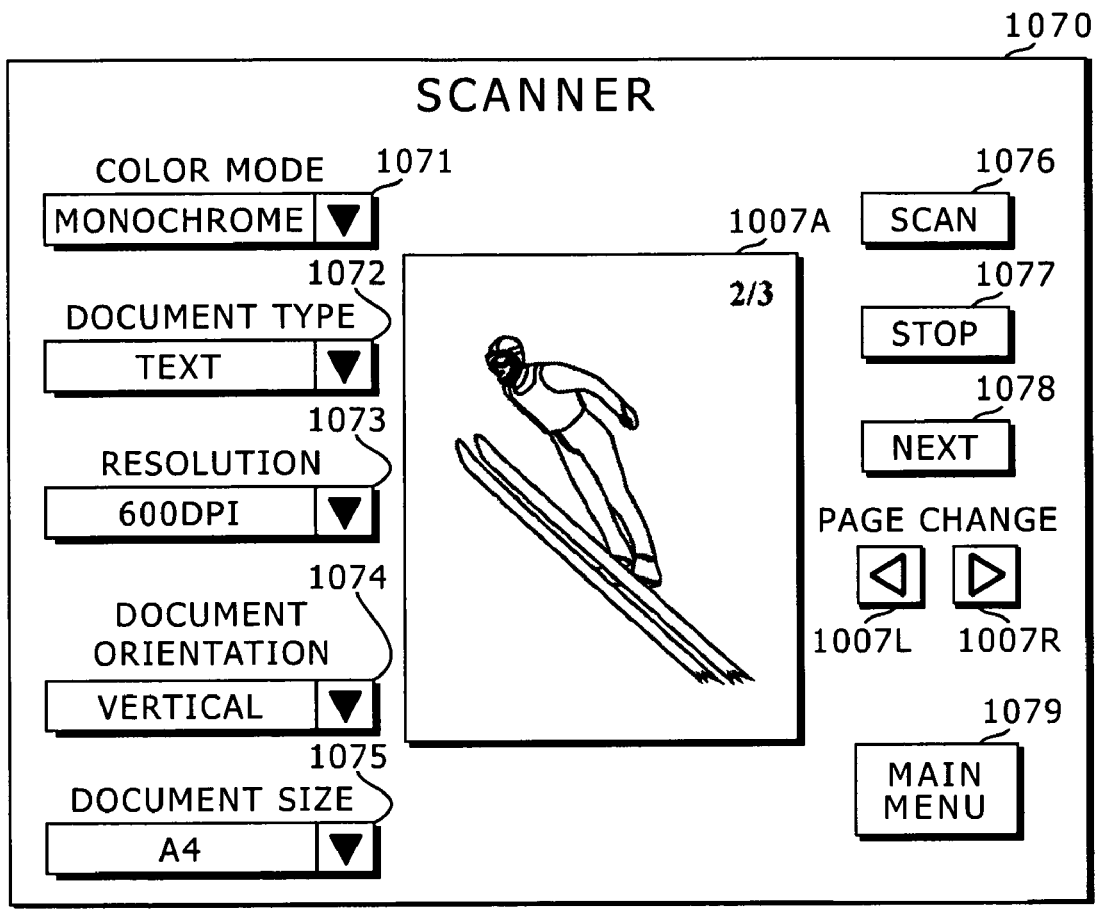
FIG. 12 shows a screen displayed on an extended operation panel at a scan in Embodiment 2.

In the system shown in FIG. 7, if "scanner" is chosen in a main menu (not shown) displayed by the touch panel 62, then the web browser 1601 sends a request of a user interface screen file to the server 30 via the communication unit 1600, and receives a user interface screen file as a response, and causes the touch panel 62 to display a user interface screen 1070 based on the file as shown in FIG. 12.

The user interface screen 1070 has selection boxes 1071 to 1075 for selection of setting values, a "scan" button 1076 for control, a "scan stop" button 1077 for control, a previous page button 1007L for control, a next page button 1007R for control, a "next" button 1078 to make a screen transition of this screen, and a "main menu" button 1079.

An event handler is described in a header part of the user interface screen file. In "Form" of the user interface screen file, selection input fields (i.e. Select boxes), and button fields are described corresponding to the selection boxes 1071 to 1075 and the buttons 1076 to 1079, 1007L and 1007R. Respective event handler calls are described in the fields as scripts (e.g. in JavaScript).

At the image forming apparatus 50 shown in FIG. 5, a user puts a bunch of document paper sheets on the paper drawer tray 561 of the auto sheet feeder 560, and chooses setting values with the selection boxes 1071 to 1075, and then touches the scan button 1076. This touch starts the process shown in FIG. 9.

Figure 9:
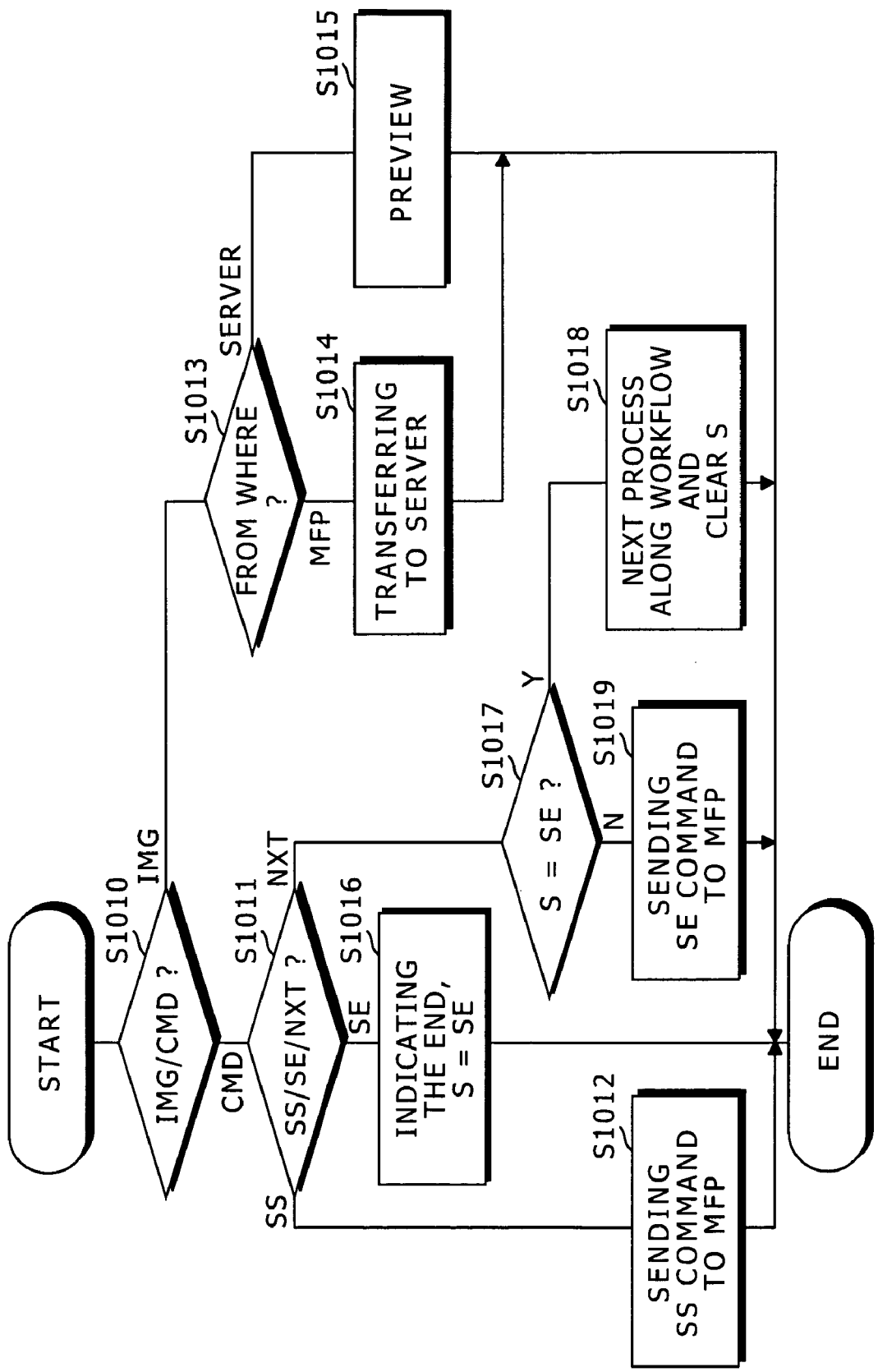
FIG. 9 shows a flowchart that indicates a process of an event handler for events by either a button touch or data receipt in a period from start to end of a document scan.
Figure 11:
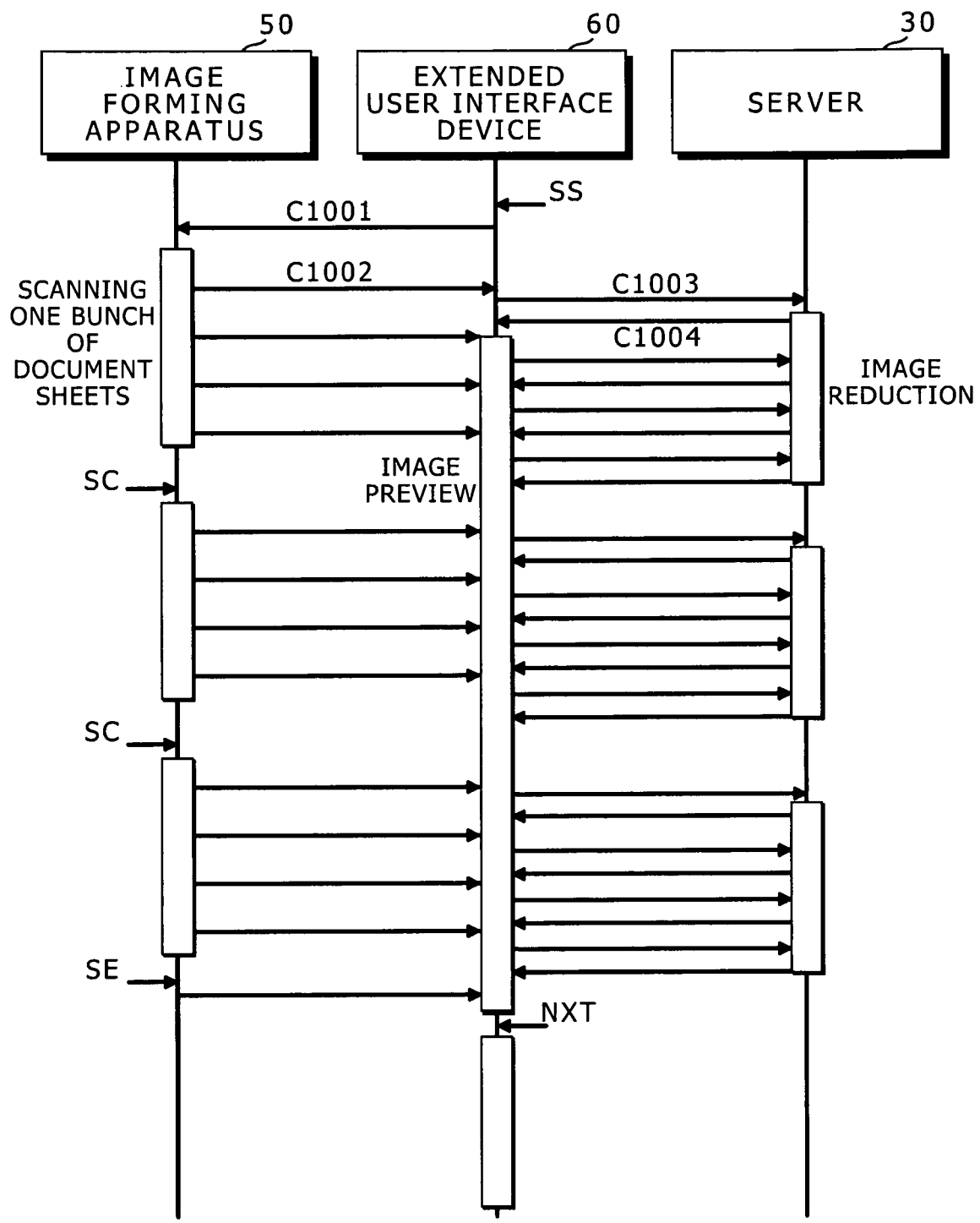
FIG. 11 shows a schematic sequence diagram of the image forming system shown in FIG. 7.

FIG. 9 shows a flowchart that indicates a process of an event handler for events induced by either a button touch or data receipt in a period from start to end of a document scan in Embodiment 2. The web browser 1601 of the user interface device 60 executes this event handler with the WS client 1602. FIG. 11 shows a schematic sequence diagram that indicates cooperative operations of the image forming apparatus 50, the extended user interface device 60 and the server 30.

In Step S1010 of FIG. 9, the web browser 1601 identifies a touch to the "scan" button 1076 as a command (CMD), and next executes Step S1011. In Step S1011, the web browser 1601 identifies this touch as a scan start command SS, and next executes Step S1012. In Step S1012, the web browser 1601 provides information to the WS client 1602 to execute a scan method of an object in the image forming function part 1502. The information is required to execute the scan method, for example, an object name of the object, a method name of the method, and one or more arguments of the method. The WS client 1602 receives the information, and generates a SOAP request message based on the information, SOAP protocol and a WSDL (Web Services Description Language) file that has been received from the image forming apparatus 50. The WS client 1602 generates an HTTP request message that contains the SOAP request message in its body, and sends it via the communication unit 1600 (C1001 in FIG. 11).

Figure 10:
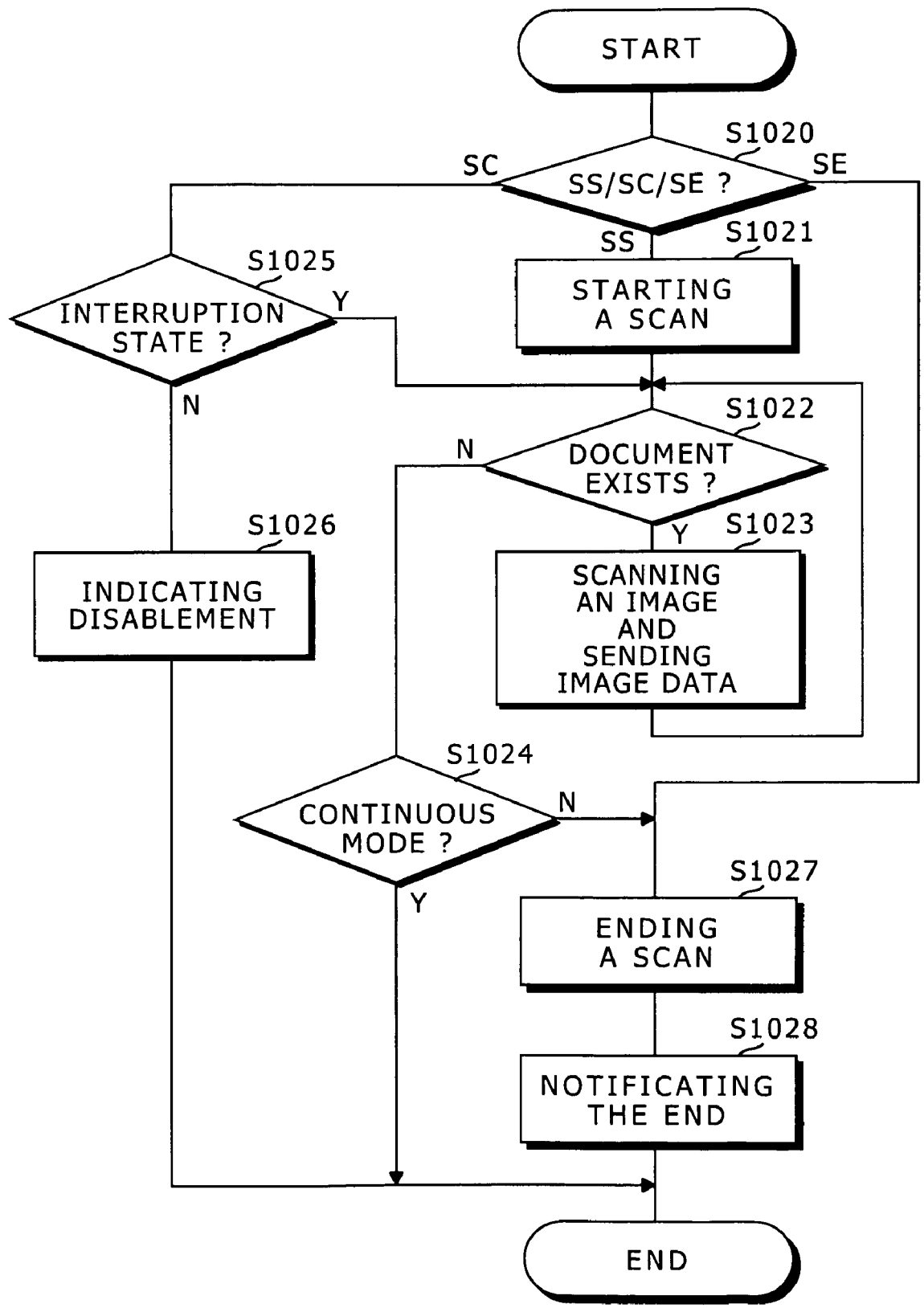
FIG. 10 shows a flowchart that indicates a process of an event handler in the image forming apparatus corresponding to the process shown in FIG. 9.

FIG. 10 shows a flowchart that indicates a process of an event handler in the image forming apparatus 50, corresponding to the process shown in FIG. 9. The control unit 1503 executes the process shown in FIG. 10 according to a request from either the panel interface 1504 or the WS server 1501.

In Step S1020, the control unit 1503 determines that the received information is a scan start command SS, and next executes Step S1021. In Step S1021, the control unit 1503 executes a preparation process (i.e. an open process) to enable a driver (e.g. a TWAIN driver) of the scanner 56 to start a scan operation. In Step S1022 next to Step S1021, the control unit 1503 determines whether a sheet detector (not shown) placed to the auto sheet feeder 560 detects a document paper sheet. If the detector detects a document paper sheet, the control unit 1503 next executes Step S1023.

In Step S1023, the control unit 1503 drives the auto sheet feeder 560 to transport the document paper sheet, and causes the scanner 56 to scan its image and generate image data, and to transfer the image data to a buffer of the communication unit 1500, and then the control unit 1503 causes the WS server 1501 and the communication unit 1500 to send the image data as a response message to the communication unit 1600 (C1002 in FIG. 11).

The web browser 1601 starts the process shown in FIG. 9 when the communication unit 1600 receives the response.

In Step S1010, the web browser 1601 determines that the image data is received, and next executes Step S1013.

In Step S1013, the web browser 1601 determines that the image data is received from the image forming apparatus 50, and next executes Step S1014. In Step S1014, the web browser 1601 sends an image reduction process request and the image data to the communication unit 1300 via the WS client 1602 and the communication unit 1600 (C1003 in FIG. 11).

In the server 30, the communication unit 1300 receives the image data, and provide it to the web application 1303 via the web server 1301 and the WS server 1302. The image data is stored in a buffer storage area by the WS server 1302. The web application 1303 executes an image reduction process for the image data, and sends the reduced image data as a response message to the communication unit 1600 via the WS server 1302, the web server 1301 and the communication unit 1300 (C1004 in FIG. 11). The communication unit 1600 provides the response message to the web browser 1601 via the WS client 1602, and the WS client 1602 stores the image data included in the message into a buffer storage area, and notifies the web browser 1601 of a storing address of the image data. When the web browser 1601 receives it, the web browser 1601 partially rewrites HTML data of an HTML file used to display the current screen according to a script in the HTML file by using AJAX techniques. As a result, a preview image of the reduced image data is added to an area 1007A on the user interface screen 1070 as shown in FIG. 12, or a preview image in the area 1007A is replaced with that based on the reduced image data.

Return to FIG. 10, and when the aforementioned image scan process for one page is finished, the control returns to Step S1022. Until the sheet detector of the auto sheet feeder 560 detects no sheets on the tray 561, the processes in Steps S1022 and S1023 are executed repeatedly.

In Step S1022, if the control unit 1503 identifies no sheets on the tray 561, then it next executes Step S1024.

In Step S1024, the control unit 1503 determines that the scan mode is "continuous scan mode" set in the aforementioned process in FIG. 8, and next ends this process in FIG. 10, and then moves its own operation state to a scan interruption state. The scan interruption state is a state in which for a scan job, a process of Step S1021 has been executed, but a process of Step S1027 has not been executed.

After scanning a bunch of document paper sheets, a user sometimes wants to scan a next bunch of document paper sheets, and merges the two bunches into one scan job (i.e. one image file). In this case, the user puts the next bunch on the tray 561, and touches a "next scan" button 1550 displayed on the operation panel 55 as shown in FIG. 13.

This touch operation starts the process shown in FIG. 10 again. In this time, the control unit 1503 determines that this touch operation is a scan continuation command SC, and next executes Step S1025. In Step S1025, the control unit 1503 determines whether the current state is the scan interruption state. If the current state is the scan interruption state, the control unit 1503 next executes Step S1022; otherwise, the control unit 1503 next executes Step S1026. In Step S1026, the control unit 1503 causes the operation panel 55 to display a message that scan continuation is disable.

Figure 13:
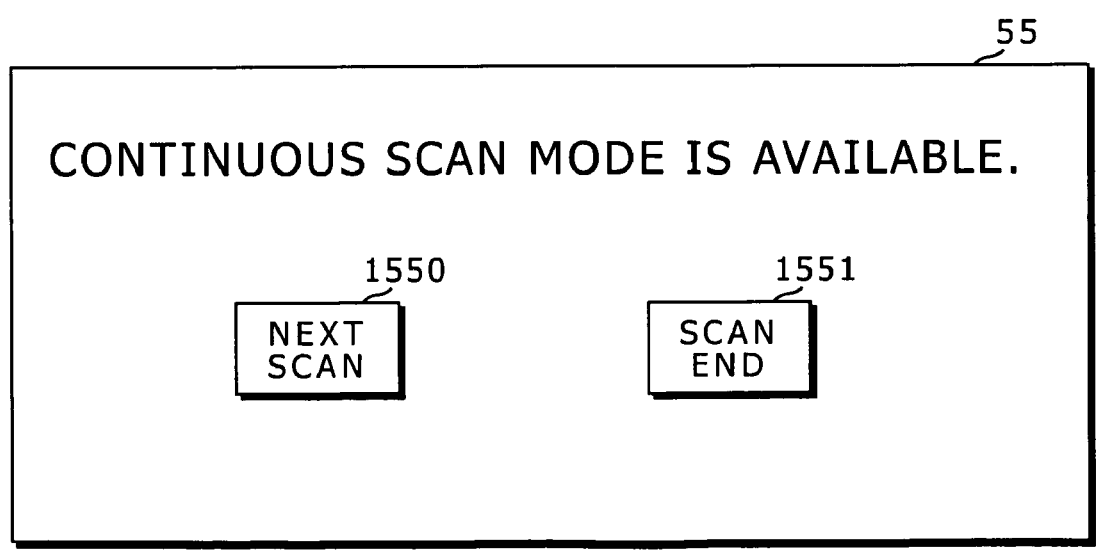
FIG. 13 shows a screen displayed on an operation panel at a scan in Embodiment 2.

After scanning a bunch of document paper sheets, if the user does not have a next bunch of document paper sheets, then the user touches a "scan end" button 1551 on the operation panel 55 shown in FIG. 13. This touch operation starts the process shown in FIG. 10 again. In this time, the control unit 1503 determines that this touch operation is a scan end command SE, and next executes Step S1027. In Step S1027, the control unit 1503 executes a scan end process (i.e. a close process) for the driver of the scanner 56, corresponding to the open process in Step S1021. In Step S1028 next to Step S1027, the control unit 1503 provides a scan end command SE to the communication unit 1500 via the WS server 1501 to send it to the web browser 1601.

The web browser 1601 receives the scan end command SE, and starts the process shown in FIG. 9 again according to the script. In Step S1010, the web browser 1601 determines that a command is received, and next executes Step S1011. In Step S1011, the web browser 1601 determines that the received command is a scan end command SE, and next executes Step S1016. In Step S1016, the web browser 1601 causes the touch panel 62 to indicate that one scan job is finished, and memorizes the current state S as a scan end state.

The user next touches a "next" button 1078 on the user interface screen 1070 shown in FIG. 12. This touch starts the process shown in FIG. 9 again. In the Step S1010, the web browser 1601 determines that a command is received, and next executes Step S1011. In Step S1011, the web browser 1601 determines that the received command is a next command NXT, and next executes Step S1017. In Step S1017, the web browser 1601 determines that the current state S is the scan end state, and next executes Step S1018. In Step S1018, the web browser 1601 sends a request of a user interface screen file to the server 30. This user interface screen file is used to execute a next process along a predetermined workflow. For example, this user interface screen is used to assign a file name and a file type to an image data file stored in the HDD 37 as mentioned above, and to attach retrieval meta data to the file.

As mentioned above, the user can use "continuous scan mode". Also, the user can cause the image forming apparatus 50 to scan in "discontinuous scan mode". For this, the user does not touch buttons on the operation panel 55, but touches the next button 1078 on the user interface screen 1070 after the end of scanning a previous bunch of document paper sheets.

In the process shown in FIG. 9, in the Step S1010, the web browser 1601 determines that a command is received, and next executes Step S1011. In Step S1011, the web browser 1601 determines that the received command is a next command NXT, and next executes Step S1017. In Step S1017, the web browser 1601 determines that the current state is not the scan end state, and next executes Step S1019. In Step S1019, the web browser 1601 sends a scan end command SE to the image forming apparatus 50.

In the image forming apparatus 50, the control unit 1503 determines that a command is received. In Step S1020 of FIG. 10, the control unit 1503 determines that the received information is a scan end command SE, and next executes Step S1027. In Step S1027, the control unit 1503 executes the aforementioned scan end process, and in Step S1028, the control unit 1503 sends the scan end command SE to the extended user interface device 60. The extended user interface device 60 receives the command SE, and then executes the aforementioned process in Step S1016.

Therefore, by means of the extended user interface device 60, the user uses the image forming apparatus 50 in whichever of "continuous scan mode" and "discontinuous scan mode" without switching the scan mode manually.

When the image forming apparatus 50 is used in a standalone state without the extended user interface device 60, the process shown in FIG. 8 sets the scan mode as "discontinuous scan mode" (i.e. a default scan mode in a standalone state), and in FIG. 10, Step S1027 is executed next to Step S1024. Consequently, each of bunches of document paper sheets is processed as one scan job. It should be noted that the image forming apparatus 50 in a standalone state does not perform transmission in Steps S1023 and S1028.

In the user interface screen shown in FIG. 12, a preview image in the area 1007A is replaced with that of a previous page by a touch to the previous page button 1007L, or replaced with that of a next page by a touch to the next page button 1007R. This replacement is performed by partially and dynamically changing HTML data in an HTML file as mentioned above.

If the user touches the stop button 1077 on the user interface screen 1070 of the touch panel 62, then a scan stop service request is provided to the image forming function part 1502. The image forming function part 1502 stops a scan operation according to the request.

If the user touches the main menu button 1079 on the user interface screen 1070 of the touch panel 62, then a request of a main user interface screen file is sent to the server 30. The main user interface screen file is received as a response from the server 30, and the touch panel 62 displays a main user interface screen based on the received file.

Embodiment 3

A basic configuration of an image forming system according to Embodiment 3 of this invention is the same as that according to Embodiment 1 (FIG. 5).

Hereinafter, a relationship between the apparatus 10 and the server 30 in Embodiment 3 will be explained, and a relationship between the apparatus 20 and the server 30 is the same as that between the apparatus 10 and the server 30.

A hardware configuration of the image forming system according to Embodiment 3 is the same as that according to Embodiment 1 (FIG. 6).

In Embodiment 3, in the PROM 53 of the image forming apparatus 50, an operating system (OS), drivers, programs to be executed in an upper layer of the OS, and setting values have been stored. The programs are executed to embody an image forming function part, a web service server (a WS server), and a setting part. Image forming functions of the image forming function part includes copying, scanning, printing, transmitting and receiving facsimile data, and transmitting and receiving email. The WS server communicates in SOAP/HTTP protocols. The setting part includes a setting value selectability determining method, a setting value changing method, and a setting state tree. The setting value changing method is executed when it is determined that a setting value is selectable. The setting state tree is used for determining whether a setting value is selectable.

In Embodiment 3, the operation panel 55 has a display unit and a key input unit, receives input of setting information or instruction, and displays a screen such as selection screen or setting screen. In Embodiment 3, in a normal state the user interface device 60 is used instead of the operation panel 55, but when a system failure occurs the operation panel 55 is used.

In Embodiment 3, it the HDD 67 of the user interface device 60, programs have been installed to embody an OS, drivers, a web service (WS) client, and a web browser. The WS client performs client-server communication with the WS server in the image forming apparatus 50. The web browser causes the touch panel 62 to display a screen based on a user interface screen file (e.g. an HTML file or an XHTML file) received from a TCP layer of the OS.

In the HDD 37 of the user interface server 30, programs have been installed to embody an OS, drivers, a database (DB), a DBMS to manage the database, a web server, and a web application. The DBMS performs retrieving, updating and adding data, a consistency check, an exclusive lock, and a shared lock. The web application dynamically generates an HTML file or an XHTML file based on data in the database according to an instruction from the web server, and updates data in the database according to an instruction from the web server.

Hereinafter, a scan process will be explained in a case that a user puts a document on the image forming apparatus 10 combined with an extended console, and operates the touch panel 62 to start the scan process.

Figure 17:
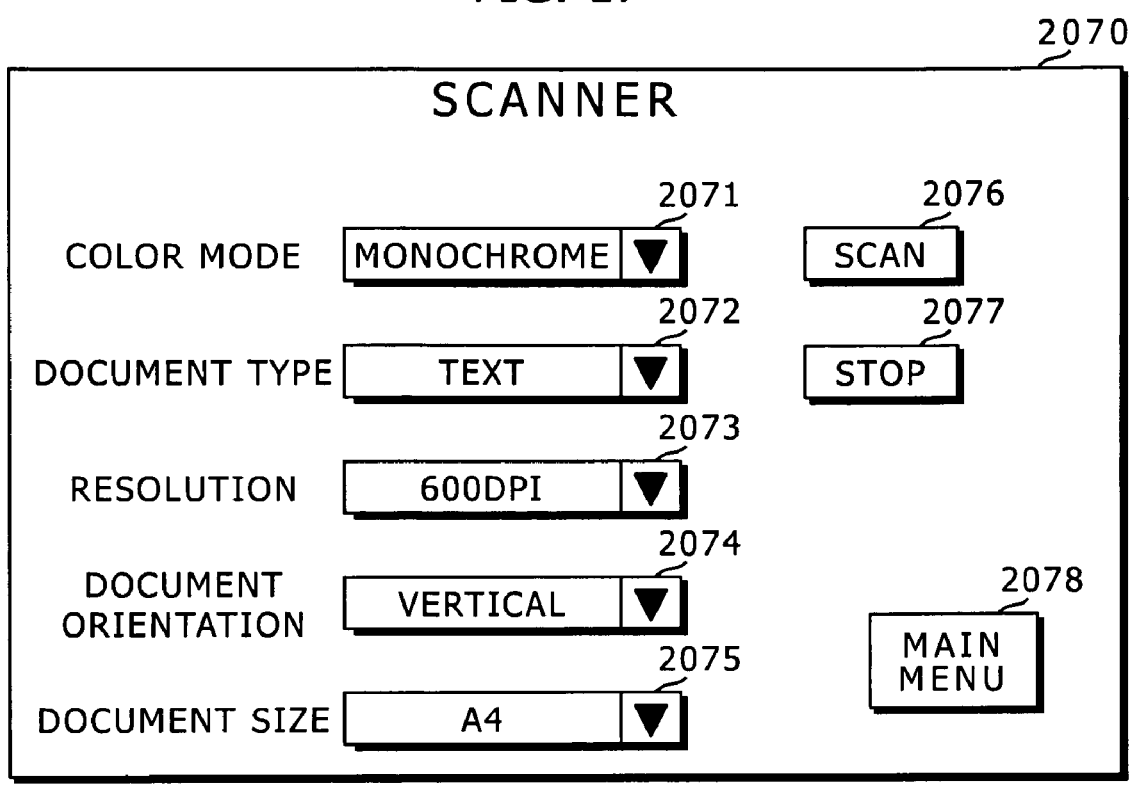
FIG. 17 shows a user interface screen for inputting scanner settings and for executing a scan in Embodiment 3.

The touch panel 62 displays a user interface screen 2070 as shown in FIG. 17. The user interface screen 2070 has selection boxes 2071 to 2075 for selection of setting values, a "scan" button 2076 for control, a "scan stop" button 2077 for control, and a "main menu" button 2078 for returning to a main menu screen.

Each of the selection boxes 2071 to 2075 has a triangle image. When a user touches the triangle image, through a browser function, a dropdown list comes to be displayed. The list has one or more selectable items. When the user touches an item in the list, through a browser function, the list is deleted, and then a setting value corresponding to the item is displayed in a text box within the selection box. When the setting value is changed, an on Change event occurs. The on Change event starts a process mentioned below.

Figure 18A:
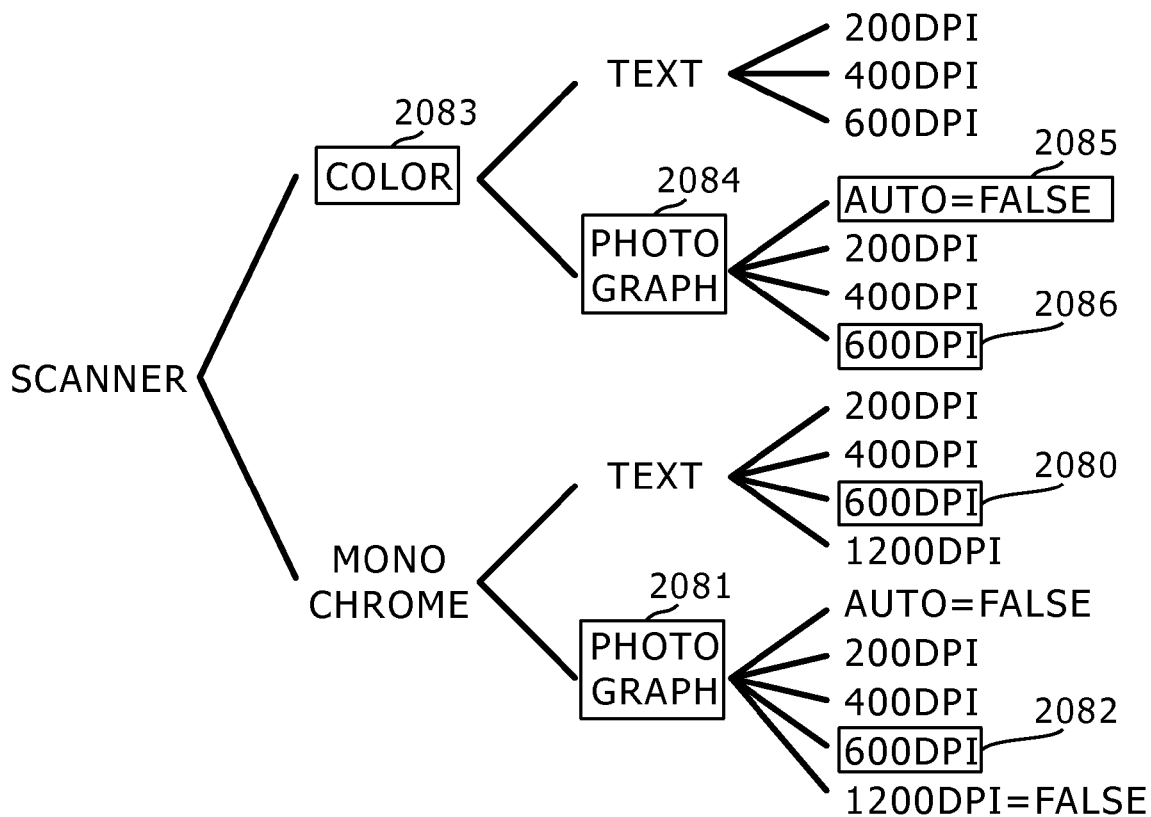
FIG. 18A shows a setting state tree that contains all combinations of setting values in Embodiment 3.

The selection box 2071 is one for a color mode setting, and its available setting values are "color" and "monochrome", as shown in FIG. 18A.

The selection box 2072 is one for a document type setting, and its available setting values are "text" and "photograph", as shown in FIG. 18A.

The selection box 2073 is one for a resolution setting, and a set of its available setting values corresponds to a combination of selected setting values of the color mode setting and the document type setting, as shown in FIG. 18A.

The selection box 2074 is one for a document orientation setting, and its available setting values are "vertical" and "horizontal". The selection box 2075 is one for a document size setting, and its available setting values are "A3", "A4", "B4", and so on.

In FIG. 17, respective initial setting values of scan setting items have been selected. This combination of the initial setting values is denoted by a node 2080 in the setting state tree in FIG. 18A. The node 2080 corresponds to a setting state that "monochrome", "text" and "600 dpi" have been selected in the scanner. For simplicity, FIG. 18A shows setting values in only four layers from the top layer to the fourth layer for scan setting items.

In the state shown in FIG. 17, if a user changes a setting value of the document type setting to "photograph", then the setting state is changed to that denoted by a node 2082 shown in FIG. 18A. After this change, if a user changes a setting value of the color mode setting to "color", then the node 2083, a node 2084 and a node 2086 are selected, and the setting state is changed to that denoted by the node 2086.

In a case that a setting value of the document type setting is "photograph", if the document scan resolution is prevented from being set as "auto", then the value "auto=false" has been described to specify "auto" as an unselectable setting value in this case. This value is assigned to a node 2085 in the setting state tree. The setting value "auto" is one for automatically setting the document scan resolution. In a case that setting values of the document type setting and the color mode setting are "photograph" and "monochrome", if the resolution setting is prevented from being set as "1200 dpi", the value "1200 dpi=false" has been described to specify "1200 dpi" as an unselectable setting value in this case.

Figure 14:
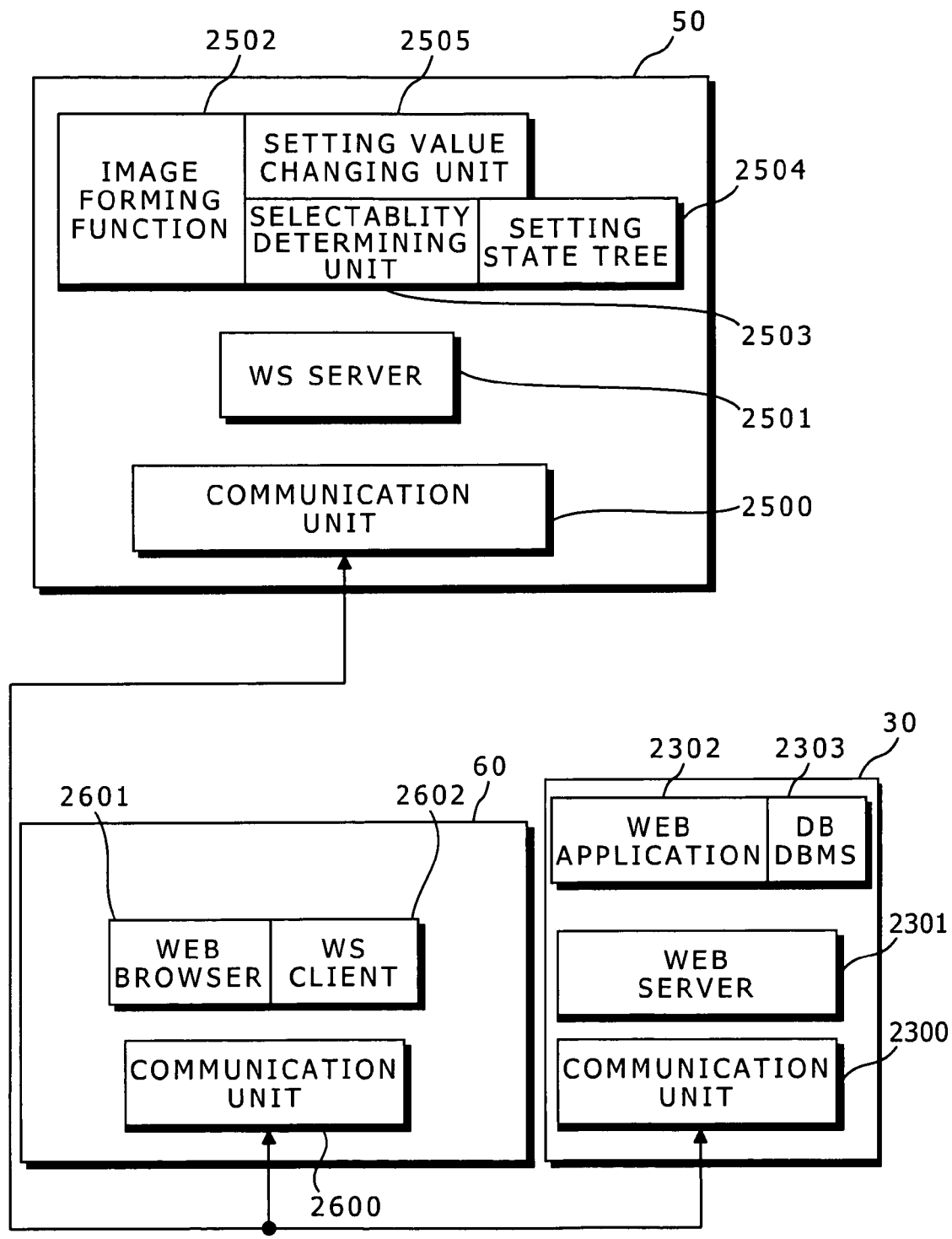
FIG. 14 shows a schematic diagram that indicates a software configuration in the image forming system according to Embodiment 3 of this invention.

FIG. 14 shows a schematic diagram that indicates a software configuration in the image forming system according to Embodiment 3 of this invention.

A communication unit 2500 in the image forming apparatus 50, a communication unit 2600 in the user interface device 60, and a communication unit 2300 in the server 30 have respective drivers (data link layers) of the network interfaces, respective TCP/IP layers, and respective socket layers realized by executing programs.

The image forming apparatus 50 has the communication unit 2500, a WS server 2501, and an image forming function part 2502, and a setting part. The setting part has a selectability determining unit 2503, a setting state tree 2504, and a setting value changing unit 2505.

The user interface device 60 has the communication unit 2600, a web browser 2601 and a WS client 2602. The WS client 2602 may have been set in the web browser 2601. Using AJAX techniques, the WS client 2602 is associated with the web browser 2601 for parsing and executing a script in an XHTML file by an interpreter function.

The user interface server 30 has the communication unit 2300, a web server 2301, a web application 2302, and a data management unit 2303. The data management unit 2303 (e.g. a database server) has a database (DB) and a database management system (DBMS). Respective sets of setting values of the image forming apparatuses are stored in the database. The DBMS manages accesses to the database.

The web application 2302 receives an HTTP request message from the web server 2301, and causes the data management unit 2303 to update a setting state (i.e. a combination of setting values) according to the request message, and dynamically generates a user interface screen file (e.g. an HTML file or an XHTML file) based on the setting values. The user interface screen file will be sent to the web browser 2601.

An event handler is described in a header part of the user interface screen file used to display the user interface screen 2070 shown in FIG. 17. In "Form" of the user interface screen file, selection input fields (i.e. Select boxes), and transmission button fields are described corresponding to the selection boxes 2071 to 2075 and the buttons 2076 to 2078. Respective event handler calls are described in the fields as scripts (e.g. in JavaScript). The selection input fields are to select respective setting values from respective lists of a color mode setting, a document type setting, a resolution setting, a document orientation setting and a document size setting. When a current setting value is changed in one of the selecting input fields by a selection of a new value, an on Change event occurs, and an event handler corresponding to this event is executed. When one of the transmission button fields is touched, an onClick event occurs, and an event handler corresponding to this event is executed.

Figure 16A:
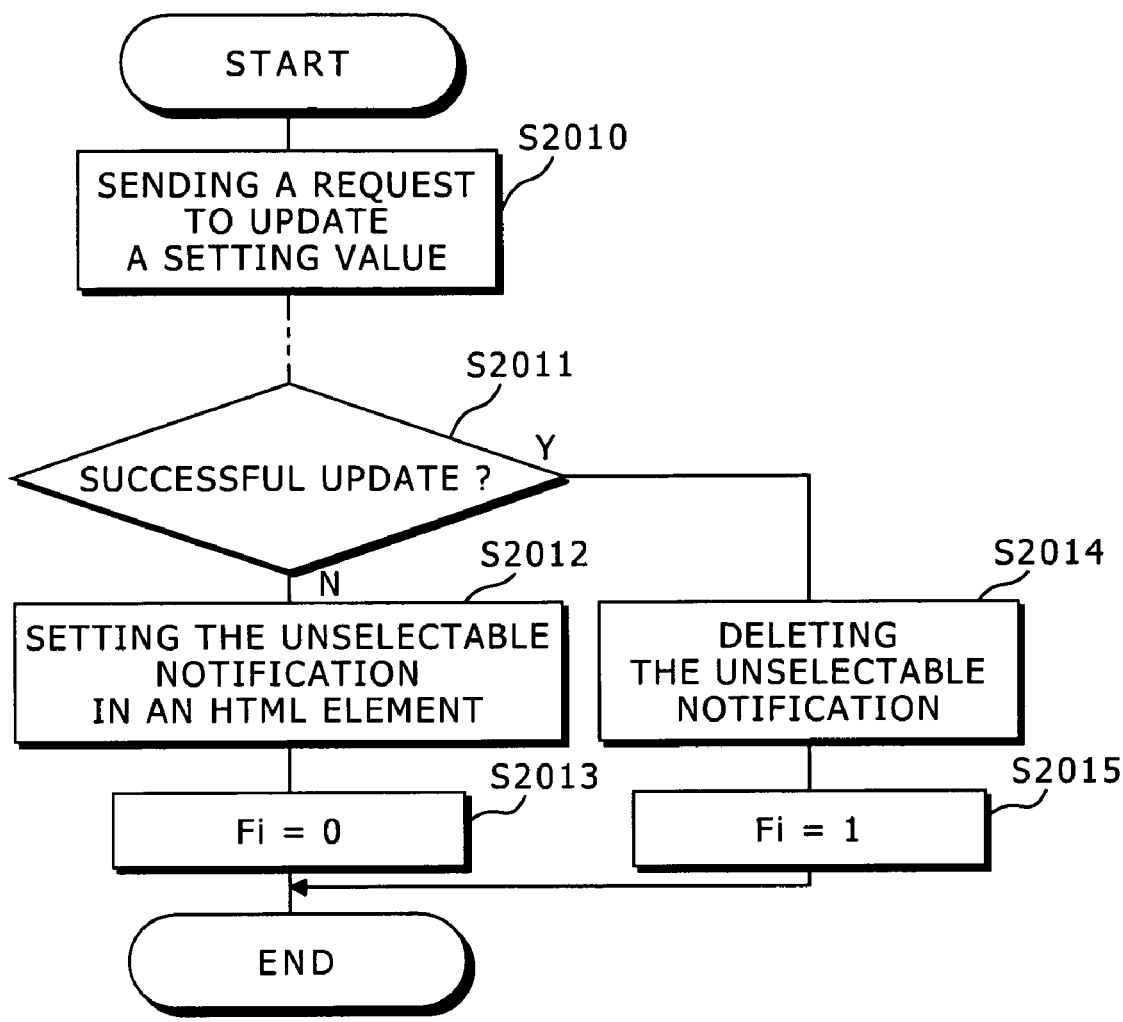
FIG. 16A shows a flowchart that indicates a process of an event handler started corresponding to a change of a setting value in one of selection boxes shown in FIG. 17.

If a current setting value is changed in one of the selection boxes 2071 to 2075, a corresponding event handler starts the process shown in FIG. 16A.

(Step S2010) a setting value change request corresponding to the onChange event is sent to the WS client 2602. This request contains (a) identifiers of an operation name "setting value change" and a function name "scanner" of a target function, and (b) a selection field name (e.g. color mode) of a target selection field and its value (i.e. a new value).

The WS client 2602 receives the request, and generates a SOAP request message based on the request, SOAP protocol and a WSDL file that has been received from the image forming apparatus 50. The WS client 2602 generates an HTTP request message that contains the SOAP request message in its body, and sends it via the communication unit 2600. This SOAP request message contains a URI of the selectablility determining unit 2503 of the image forming apparatus 50, an object name, a method name of a method that changes a setting value in the object, and an argument of the method.

The communication unit 2500 receives the request message from the communication unit 2600, and provides it to the WS server 2501. If this message is for the setting value change request, the WS server 2501 provides the request message to the selectability determining unit 2503.

Figure 15:
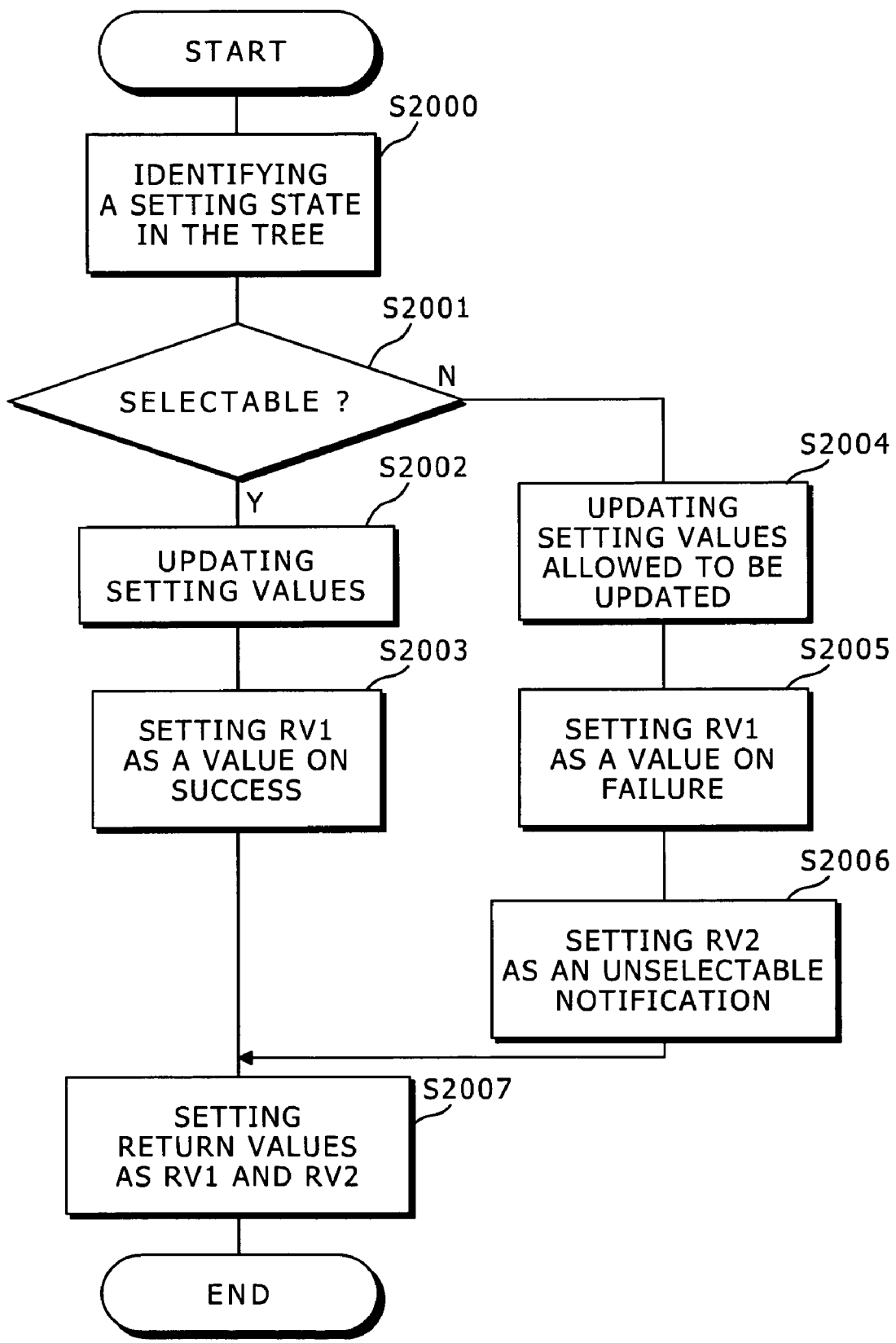
FIG. 15 shows a flowchart that indicates a process started by a selectability determining unit in FIG. 14 when a setting value is changed in one of selection boxes shown in FIG. 17.

Hereby, the process shown in FIG. 15 is started. FIG. 15 shows a schematic flowchart that mainly indicates a process of the selectability determining unit 2503.

A variable ST is to identify a current setting state in the setting state tree 2504. The variable ST is set as a node identifier, for example, a node identifier of the node 2080 in FIG. 18A.

(Step S2000) an argument in the request message to the selectability determining unit 2503 contains information on a requested operation. The variable ST, that is, the current setting state is changed to a new setting state specified in the information. For example, if the information indicates "scanner"-"document type"-"photograph" as a set of a function name, a selection field name and a new value, then the value of the variable ST is changed from the node identifier of the node 2080 to that of the node 2082 in the setting state tree 2504 of all states as shown in FIG. 18A.

(Step S2001) if the new setting state contains at least an unselectable setting value (e.g. one specified by "=false" in FIG. 18A), then Step S2004 is next executed; otherwise, Step S2002 is next executed. For example, in a setting state "scanner"-"monochrome"-"text"-"1200 dpi", if "text" is changed to "photograph", Step S2004 is next executed due to "1200 dpi=false".

(Step S2002) the setting value changing unit 2505 is invoked with an argument. The argument is set as the argument of the request message to the selectability determining unit 2503. The selectability determining unit 2503 changes a setting value of a selection field name in the request. For example, the setting value of "document type" under "scanner" is changed from "text" to "photograph".

(Step S2003) a variable RV1 is set as information on a successful result of this change, and then Step S2007 is next executed.

(Step S2004) if the new setting state has one or more setting values allowed to be changed, then the selectability determining unit 2503 changes it. For example, in the case mentioned in Step S2001, "text" is allowed to be changed with "photograph". Therefore, for this change, a process same as that in Step S2002 is executed.

For example, in a setting state "scanner"-"monochrome"-"photograph"-"600 dpi", even though the request specifies a change from "600 dpi" to "1200 dpi", the setting value of the resolution setting is not changed due to "1200 dpi=false".

(Step S2005) the variable RV1 is set as information on an unsuccessful result of the change, then Step S2006 is next executed.

(Step S2006) a variable RV2 is set as unselectable notification information. The unselectable notification information indicates the unselectable setting value detected in Step S2001, for example, "1200 dpi" of the resolution setting as mentioned above.

(Step S2007) return values are set as values of the variables RV1 and RV2.

The WS server 2501 generates a SOAP response message that contains the return values (i.e. values of RV1 and RV2) in its message body, and generates an HTTP response message by attaching an HTTP header to the SOAP response message, and sends it via the communication unit 2500.

In the user interface device 60, the communication unit 2600 receives the response message from the communication unit 2500. The WS client 2602 obtains the values of RV1 and RV2 from the response message, and provides them as return values to a caller in the event handler of the web browser 2601. This event handler receives the return values (i.e. values of RV1 and RV2), and starts Step S2011 in FIG. 16A.

(Step S2011) if the value of the variable RV1 indicates an unsuccessful result of the change, then Step S2012 is next executed; otherwise, Step S2014 is next executed.

(Step S2012) a message text is generated by concatenating a text that denotes the unselectable setting value specified in the value of RV2 and the text "is not selectable.". The message text is set in a predetermined text box in HTML data used to display the current screen. This means that a part of the HTML data is dynamically changed. For the aforementioned example (the change from "600 dpi" to "1200 dpi"), the message text "Resolution: 1200 dpi is not selectable." is displayed on the user interface screen as shown in FIG. 19A.

(Step S2013) a variable Fi (as a scan restriction flag) in a script of the event handler is set as zero, and this process of the event handler ends.

(Step S2014) a null text " " is set in the predetermined text box in the HTML data.

(Step S2015) the scan restriction flag Fi is set as 1, and this process of the event handler ends. For the aforementioned example (the change from "monochrome" to "color"), the user interface screen is changed as shown in FIG. 19B.

Only the user interface server 30 totally manages the user interface screens of image forming apparatuses, and therefore, a common user interface screen file is used for all of the image forming apparatuses. According to this embodiment, the user interface device 60 sends a setting value change request to the selectability determining unit 2503 via the WS client 2602 and the WS server 2501 according to a script in the user interface screen file. In the image forming apparatus 50, the selectability determining unit 2503 determines, according to the setting state tree 2504, whether a new setting value to be set is selectable. The selectability determining unit 2503 sends a result of determining whether the new setting value is selectable or not to the web browser 2601 via the WS server 2501 and the WS client 2602. In the user interface device 60, the web browser 2601 receives it, and if the new setting value is not selectable, then the web browser 2601 causes the touch panel 62 to display information that new setting value is not selectable. Therefore, in the user interface server 30, it is not necessary to use different programs for displaying user interface screens corresponding to the types of image forming apparatuses. Even if an image forming apparatus is replaced in the system, it is not necessary to change the program in the user interface server 30.

The operation methodology by the selectability determining unit 2503 is not dependent on the setting state. Therefore, respective setting state trees 2504 are prepared for the types of image forming apparatuses, and consequently, the selectability determining unit 2503 can operate by the same program to determine whether each of various setting values is selectable or not.

Figure 16B:
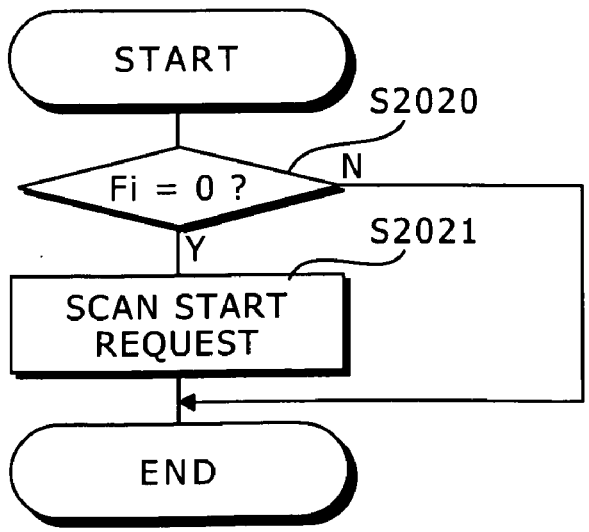
FIG. 16B shows a flowchart that indicates a process of an event handler started corresponding to a touch of a button shown in FIG. 17.

On the other hand, for staring a scan operation, a user touches the button 2076 on the user interface screen 2070 in the touch panel 62, and then an event handler corresponding to onClick event starts a process shown in FIG. 16B. This event handler is a script in the user interface screen file.

(Step S2020) if the value of the scan restriction flag Fi is 1, this process of the event handler ends; otherwise Step S2021 is next executed.

(Step S2021) a scan start request is sent to the WS client 2602.

This request is transmitted to the image forming function part 2502 via the WS client 2602, the communication units 2600 and 2500, and the WS server 2501. The image forming function part 2502 receives the request, and performs a scan operation in the current setting state.

For stopping the scan operation, a user touches the button 2077 on the user interface screen 2070 in the touch panel 62, and then a request is transmitted to the image forming function part 2502 in the same way, and the image forming function part 2502 stops the scan operation according to the request.

For returning to the main user interface screen, a user touches the button 2077 on the user interface screen 2070 in the touch panel 62, and then the user interface device 60 sends a request to the user interface server 30 to obtain a user interface screen file of the main user interface screen, and receives the file from the user interface server 30, and causes the touch panel 62 to display the main user interface screen based on the received file.

Embodiment 4

A basic configuration of an image forming system according to Embodiment 4 of this invention is the same as that according to Embodiment 1 (FIG. 5).

Hereinafter, a relationship between the apparatus 10 and the server 30 in Embodiment 4 will be explained, and a relationship between the apparatus 20 and the server 30 is the same as that between the apparatus 10 and the server 30.

A hardware configuration of the image forming system according to Embodiment 4 is the same as that according to Embodiment 1 (FIG. 6).

In Embodiment 4, in the PROM 53 such as flash memory, an OS, drivers, programs to be executed in an upper layer of the OS, and setting values have been stored. The programs are executed to embody an image forming function part, a web service server (a WS server), and a setting part. Image forming functions of the image forming function part includes copying, scanning, printing, transmitting and receiving facsimile data, and transmitting and receiving email. The WS server communicates in SOAP/HTTP protocols. The setting part includes a setting value selectability determining method, a setting value changing method, and a setting state tree. The setting value changing method is executed when it is determined that a setting value is selectable. The setting state tree is used for determining whether a setting value is selectable.

In Embodiment 4, the operation panel 55 has a display unit and a key input unit, receives input of setting information or instruction, and displays a screen such as selection screen or setting screen. In Embodiment 4, in a normal state the user interface device 60 is used instead of the operation panel 55, but when a system failure occurs the operation panel 55 is used.

In Embodiment 4, in the HDD 67 of the user interface device 60, programs have been installed to embody an OS, drivers, a WS client, and a web browser. The WS client performs client-server communication with the WS server in the image forming apparatus 50. The web browser causes the touch panel 62 to display a screen based on a user interface screen file (an HTML file or an XHTML file) received from a TCP layer of the OS.

In the HDD 37, programs have been installed to embody an OS, drivers, a database (DB), a DBMS to manage the database, a web server, and a web application. In the database, respective sets of setting values of the image forming apparatuses are stored. The DBMS performs retrieving, updating, and adding data, and a consistency check, an exclusive lock, and a shared lock. The web application dynamically generates an HTML file or an XHTML file based on data in the database according to an instruction from the web server, and updates data in the database according to an instruction from the web server.

Hereinafter, a scan process in Embodiment 4 will be explained in a case that a user puts a document on the image forming apparatus 10, and operates the touch panel 62 to start the scan process.

The touch panel 62 displays a user interface screen 2070 as shown in FIG. 17.

In FIG. 17, respective initial setting values of scan setting items have been selected. This combination of the initial setting values is denoted by a node 3080 in the setting state tree in FIG. 22A. The node 3080 corresponds to a setting state that "monochrome", "text" and "600 dpi" have been selected in the scanner. For simplicity, FIG. 22A shows setting values in only four layers from the top layer to the fourth layer for scan setting items.

Figure 22A:
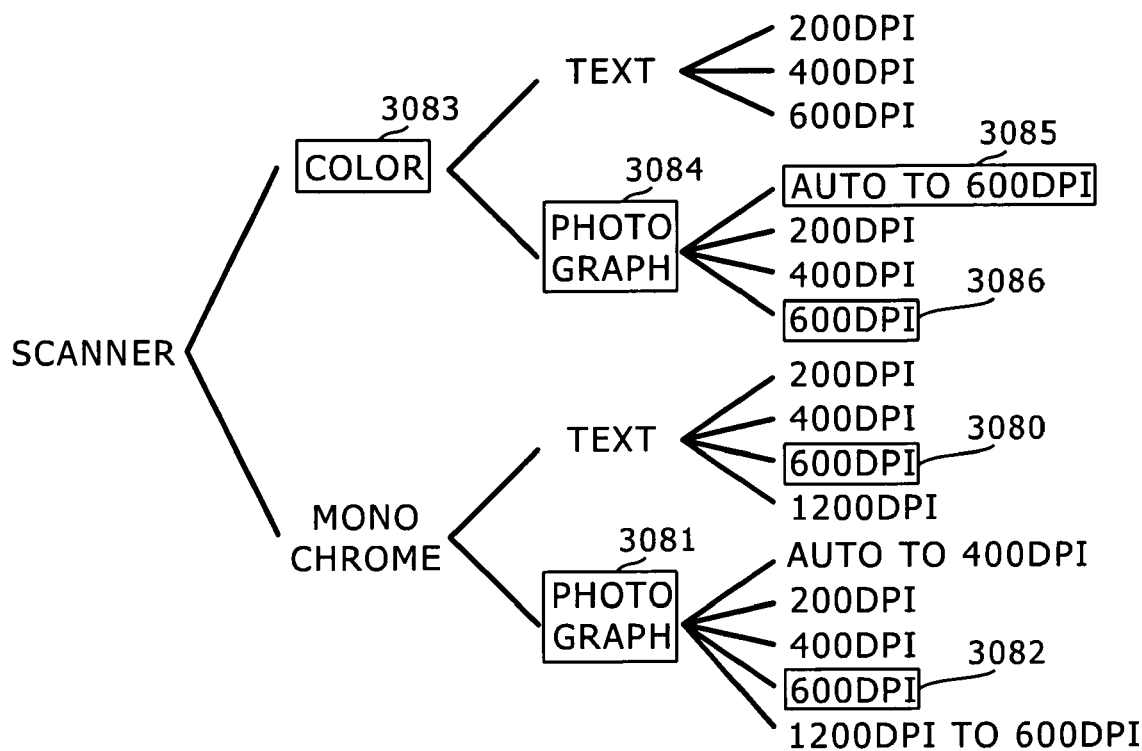
FIG. 22A shows a setting state tree that contains all combinations of setting values in Embodiment 4.

In the state shown in FIG. 17, if a user changes a setting value of the document type setting to "photograph", then the setting state is changed to that denoted by a node 3082 shown in FIG. 22A. After this change, if a user changes a setting value of the color mode setting to "color", then a node 3083, a node 3084 and the node 3086 are selected, and the setting state is changed to that denoted by the node 3086.

In a case that a setting value of the document type setting is "photograph", if the document scan resolution is prevented from being set as "auto", then the value "auto to 600 dpi" has been described to specify "auto" as an unselectable setting value in this case, and to specify an automatic change from this setting value "auto" to a standard value "600 dpi" as the most probable value. This value is assigned to a node 3085 in the setting state tree. The setting value "auto" is one for automatically setting the document scan resolution. In a case that setting values of the document type setting and the color mode setting are "photograph" and "monochrome", if the resolution setting is prevented from being set as "1200 dpi", then the value "1200 dpi to 600 dpi" has been described to specify "1200 dpi" as an unselectable setting value in this case, and to specify an automatic change from this setting value "1200 dpi" to the maximum value "600 dpi" as the most probable value.

A software configuration of the image forming system according to Embodiment 4 is the same as that according to Embodiment 3 (FIG. 14).

Figure 21:
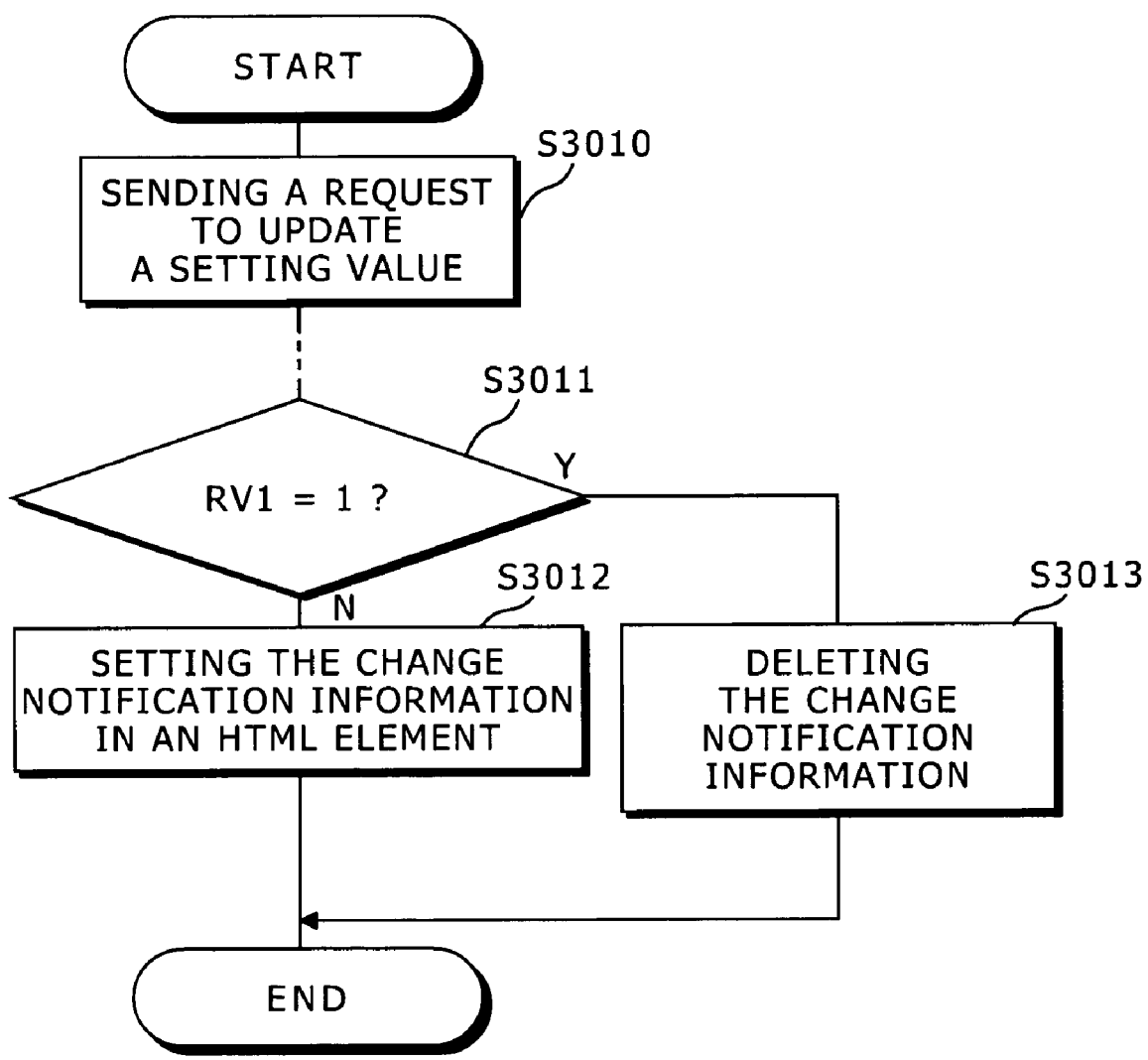
FIG. 21 shows a flowchart that indicates a process of an event handler started corresponding to a change of a setting value in one of selection boxes shown in FIG. 17, in Embodiment 4.

If a current setting value is changed in one of the selection boxes 2071 to 2075, a corresponding event handler starts the process shown in FIG. 21.

(Step S3010) a setting value change request is sent to the WS client 2602. This request contains (a) identifiers of an operation name "setting value change" and a function name "scanner" of a target function, and (b) a selection field name (e.g. color mode) of a target selection field and its value (i.e. a new value).

The WS client 2602 receives the request, and generates a SOAP request message based on the request, SOAP protocol and a WSDL file that has been received from the image forming apparatus 50. The WS client 2602 generates an HTTP request message that contains the SOAP request message in its body, and sends it via the communication unit 2600. This SOAP request message contains a URI of the selectablility determining unit 2503 of the image forming apparatus 50, an object name, a method name of a method that changes a setting value in the object, and an argument of the method.

The communication unit 2500 receives the request message from the communication unit 2600, and provide it to the WS server 2501. If this message is for the setting value change request, then the WS server 2501 provides the request message to the selectability determining unit 2503.

Figure 20:
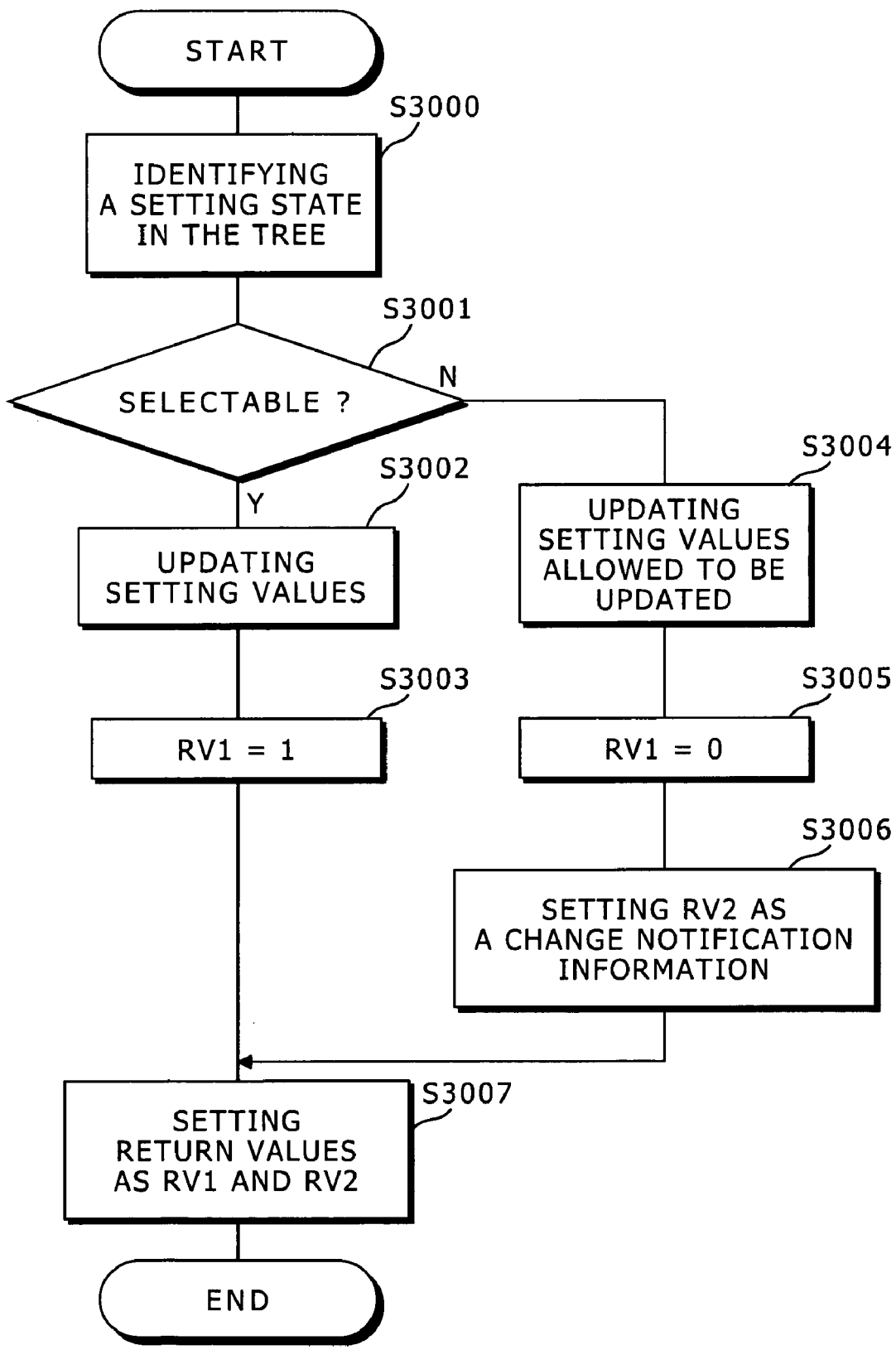
FIG. 20 shows a flowchart that indicates a process started by a selectability determining unit in FIG. 14 when a setting value is changed in one of selection boxes shown in FIG. 17, in Embodiment 4.

Hereby, the process shown in FIG. 20 is started. FIG. 20 shows a schematic flowchart that mainly indicates a process of the selectability determining unit 2503.

A variable ST is to identify a current setting state in the setting state tree 2504. The variable ST is set as a node identifier, for example, a node identifier of the node 3080 in FIG. 22A.

(Step S3000) an argument in the request message to the selectability determining unit 2503 contains information on a requested operation. The variable ST, that is, the current setting state is changed to a new setting state specified in the information. For example, if the information indicates "scanner"-"document type"-"photograph" as a set of a function name, a selection field name and a new value, then the value of the variable ST is changed from the node identifier of the node 3080 to that of the node 3082 in the setting state tree 2504 of all states as shown in FIG. 22A.

(Step S3001) if the new setting state contains at least an unselectable setting value, then Step S3004 is next executed; otherwise, Step S3002 is next executed. For example, in a setting state "scanner"-"monochrome"-"text"-"1200 dpi", if "text" is changed to "photograph", Step S3004 is next executed due to "1200 dpi to 600 dpi" as an unselectable setting value.

(Step S3002) the setting value changing unit 2505 is invoked with an argument. The argument is set as the argument of the request message to the selectability determining unit 2503. The selectability determining unit 2503 changes a setting value of a selection field name in the request. For example, the setting value of "document type" under "scanner" is changed from "text" to "photograph".

(Step S3003) a variable RV1 is set as 1, and then Step S3007 is next executed.

(Step S3004) if the new setting state has one or more setting values allowed to be updated, then the selectability determining unit 2503 changes it. For example, in the case mentioned in Step S3001, "text" is allowed to be updated with "photograph". Therefore, for this change, a process same as that in Step S3002 is executed. Further, the unselectable setting value is forced to be changed to a change value that has been associated with the unselectable setting value.

For the aforementioned example in Step S3001, the value "1200 dpi to 600 dpi" has been set, and therefore, the setting value of the resolution setting is changed from 1200 dpi to 600 dpi.

(Step S3005) a variable RV1 is set as zero, then Step S3006 is next executed.

(Step S3006) a variable RV2 is set as change notification information, for example, "Resolution: 1200 dpi to 600 dpi".

(Step S3007) return values are set as values of the variables RV1 and RV2.

The WS server 2501 generates a SOAP response message that contains the return values (i.e. values of RV1 and RV2) in its message body, and generates an HTTP response message by attaching an HTTP header to the SOAP response message, and sends it via the communication unit 2500.

In the user interface device 60, the communication unit 2600 receives the response message from the communication unit 2500. The WS client 2602 obtains the values of RV1 and RV2 from the response message, and provides them as return values to a caller in the event handler of the web browser 2601. This event handler receives the return values (i.e. values of RV1 and RV2), and starts Step S3011 in FIG. 21.

(Step S3011) if the value of the variable RV1 is zero, then Step S3012 is next executed; otherwise, Step S3013 is next executed.

(Step S3012) a message text is set in a predetermined text box in HTML data used to display the current screen, and then this process of the event handler ends. The message text is generated by concatenating a text A, the text "has been automatically changed to", a text B and a period ".". The text A is a text before "to" in the value of RV2, and the text B is a text after "to" in the value of RV2. In a case of "Resolution: 1200 dpi to 600 dpi", the text A is "Resolution: 1200 dpi", and the text B is "600 dpi", and therefore, the text "Resolution: 1200 dpi has been automatically changed to 600 dpi." is displayed on the user interface screen.

(Step S3013) a null text " " is set in the predetermined text box in the HTML data. As a result, for example, the user interface screen as shown in FIG. 23B is displayed.

Only the user interface server 30 totally manages the user interface screens of image forming apparatuses, and therefore, a common user interface screen file is used for all of the image forming apparatuses. According to this embodiment, the user interface device 60 sends a setting value change request to the selectability determining unit 2503 via the WS client 2602 and the WS server 2501 according to a script in the user interface screen file. In the image forming apparatus 50, the selectability determining unit 2503 determines, according to the setting state tree 2504, whether a new setting value to be set is selectable. If the new setting value is not selectable, then the selectability determining unit 2503 automatically changes the unselectable setting value to a change value as the most probable value, and sends a change notification information to the web browser 2601 via the WS server 2501 and the WS client 2602. In the user interface device 60, the web browser 2601 receives it, and causes the touch panel 62 to display a message that includes the change notification information.

Therefore, in the user interface server 30, it is not necessary to use different programs for displaying user interface screens corresponding to the types of image forming apparatuses. Even if an image forming apparatus is replaced in the system, it is not necessary to change the program in the user interface server 30. Further, if a user tries to change a setting value to an unselectable one, then the image forming apparatus 50 automatically changes the unselectable setting value to a standard selectable setting value, without a manual change. Consequently, this system increases usability.

The operation methodology by the selectability determining unit 2503 is not dependent on the setting state. Therefore, respective setting state trees 2504 are prepared for the types of image forming apparatuses, and consequently, the selectability determining unit 2503 can operate by the same program to determine whether each of various setting values is selectable or not.

On the other hand, for staring a scan operation, a user touches the button 2076 on the user interface screen 2070 in the touch panel 62, and then an event handler starts a process to causes the WS client 2602 to send a scan start request. This event handler is a script in the user interface screen file. This request is transmitted to the image forming function part 2502 via the WS client 2602, the communication units 2600 and 2500, and the WS server 2501. The image forming function part 2502 receives the request, and performs a scan operation in the current setting state.

For stopping the scan operation, a user touches the button 2077 on the user interface screen 2070 in the touch panel 62, and then a request is transmitted to the image forming function part 2502 in the same way, and the image forming function part 2502 stops the scan operation according to the request.

For returning to the main user interface screen, a user touches the button 2077 on the user interface screen 2070 in the touch panel 62, and then the user interface device 60 sends a request to the user interface server 30 to obtain a user interface screen file of the main user interface screen, and receives the file from the user interface server 30, and causes the touch panel 62 to display the main user interface screen based on the received file.

Embodiment 5

Figure 28:
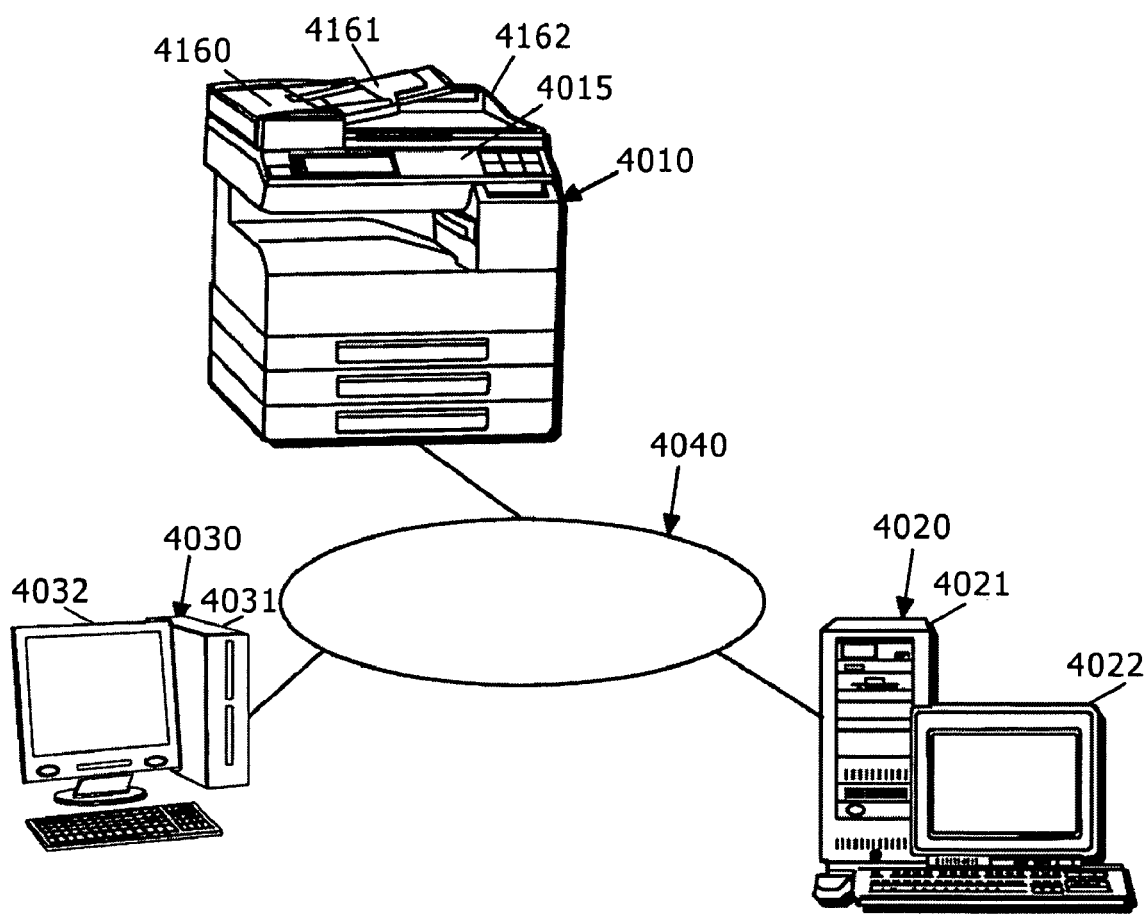
FIG. 28 shows a schematic diagram that indicates an image forming system according to Embodiment 5 of this invention.

FIG. 28 shows a schematic diagram that indicates an image forming system according to Embodiment 5 of this invention.

In the system, image forming apparatuses, a server 4020, and host computers are connected to a LAN 4040. For simplicity, FIG. 28 shows an image forming apparatus 4010 out of the image forming apparatuses and a host computer 4030 out of the host computers.

The server 4020 uniforms user interface screens displayed by operation panels of the respective image forming apparatuses, and receives a file request from the image forming apparatus 4010, and sends the requested file to the image forming apparatus 4010. The image forming apparatus 4010 receives the file, and displays a user interface screen based on the received file with a web browser.

When a user pushes down a control button on the user interface screen, information on this user operation is transmitted to the server 4020, and the server 4020 sends a request of a web service corresponding to the information to the image forming apparatus 4010. The image forming apparatus 4010 receives the request, and executes a process according to the request, and sends a result of the process as a response to the server 4020.

The host computer 4030 can also send a web service request to the image forming apparatus 4010. The server 4020 also can uniform a screen of the host computer 4030 as well as the screens of the image forming apparatuses. The host computer 4030 can send a web service request without the server 4020. Hereinafter, the latter case will be explained.

Figure 29:
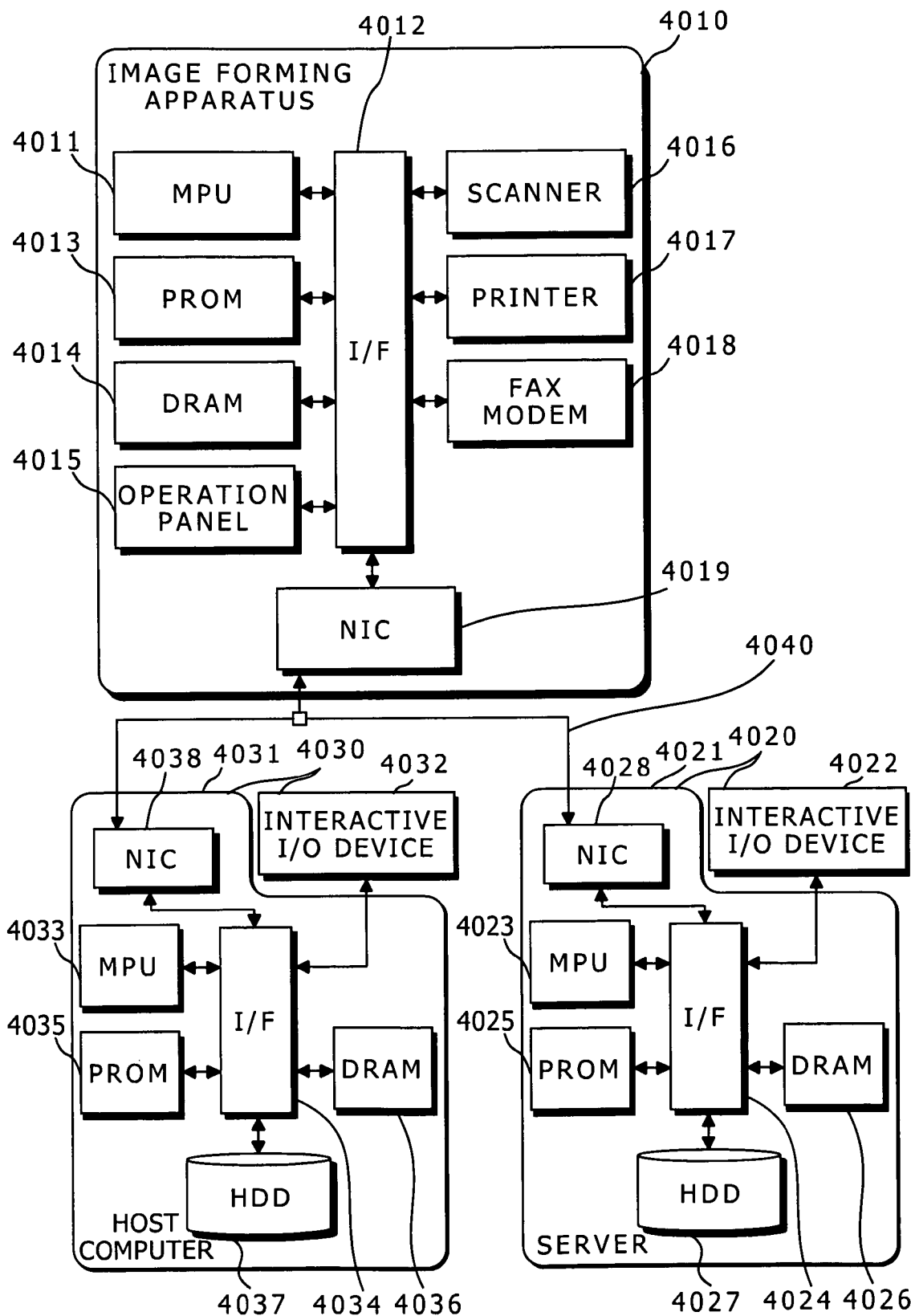
FIG. 29 shows a schematic block diagram that indicates a hardware configuration of the image forming system shown in FIG. 28.

FIG. 29 shows a schematic block diagram that indicates a hardware configuration of the image forming system shown in FIG. 28.

In the image forming apparatus 50, an MPU 4011 is connected to a PROM 4013, a DRAM 4014, an operation panel 4015, a scanner 4016, a printer 4017, a FAX modem 4018, and a network interface 4019 via interfaces 4012. For simplicity, the interfaces 4012 are depicted as one block in FIG. 29.

In the PROM 4013 such as flash memory, an operating system (OS), drivers, programs to be executed in an upper layer of the OS, and setting values have been stored.

Figure 27:
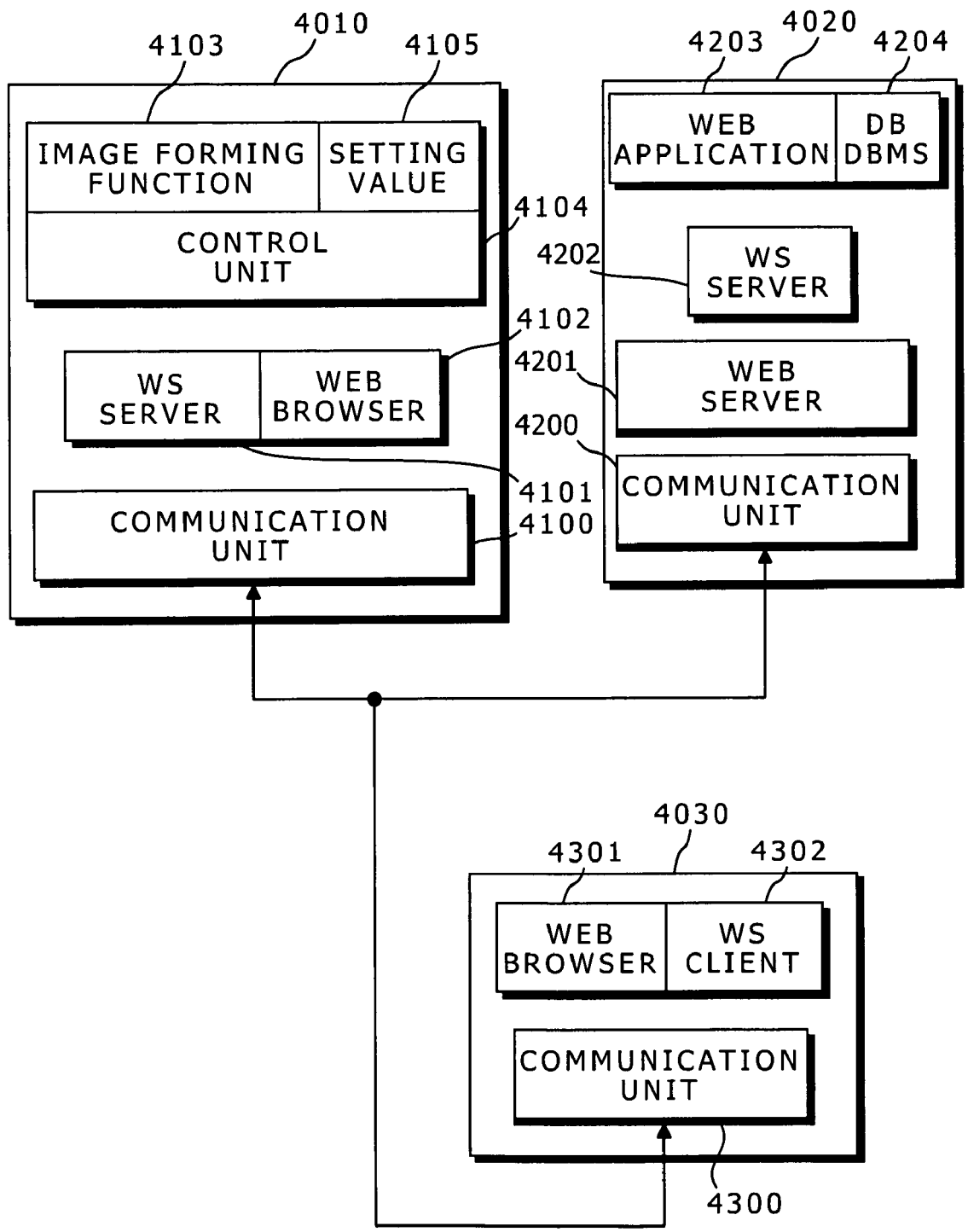
FIG. 27 shows a schematic block diagram that indicates a software configuration of the image forming system shown in FIG. 26.

FIG. 27 shows a schematic block diagram that indicates a software configuration of the system shown in FIG. 28.

The programs are executed to embody a web service server (a WS server) 4101, a panel web browser 4102, an image forming function part 4103, and a control unit 4104. The panel web browser 4102 causes the operation panel 4015 to display a user interface screen, and receives a user input. The control unit 4104 controls these parts. Image forming functions of the image forming function part 4103 includes copying, scanning, printing, transmitting and receiving facsimile data, and transmitting and receiving email. The WS server 4101 parses a SOAP request message received with SOAP/HTTP protocols, and provides a parsing result to the control unit 4104, and generates a SOAP response message based on information from the control unit 4104.

Return to FIG. 29, and the DRAM 4014 is used as a work area for converting image data to bitmap data, and so on. The operation panel 4015 has a display unit and a key input unit, receives an input of setting information or instruction, and displays a screen such as selection screen or setting screen.

The scanner 4016 is a device to input an image for copying and facsimile transmission.

The printer 4017 has a print engine, a toner cartridge, a fuser, a paper drawer, a paper transportation unit, and a paper output unit, and forms an electrostatic latent image on a photoconductor drum in the print engine with bitmap data supplied as print data, develops it with toner, transfers the toner image onto a sheet, fixes the toner image, and outputs the sheet.

The FAX modem 4018 is a communicating device for facsimile transmission and reception. The network interface 4019 is connected to the LAN 4040, and the FAX modem 4018 is connected to a PSTN (Public Switched Telephone Network) not shown.

In the server 4020, an interactive input and output device 4022 is connected to a server body 4021. In the server body 4021, an MPU 4023 is connected to a PROM 4025, a DRAM 4026, an HDD 4027, a network interface 4028, and the interactive input and output device 4022 via interfaces 4024.

The interactive I/O device 4022 has a keyboard and a pointing device as input devices, and a display device as an output device.

In the PROM 4025, a BIOS and its setting values have been stored. The DRAM 4026 is used for a main memory device of a virtual memory system.

In the HDD 4027, an OS, drivers, and programs to be executed in an upper layer of the OS, and data have been stored.

As shown in FIG. 27, these programs and the data are used to embody a web server 4201, a WS server 4202, a web application 4203, and a data management unit 4204. The WS server 4202 is a SOAP/HTTP server that operates in an upper layer of the web server 4201. The data management unit 4204 has a database (DB), and a DBMS to manage the database. In the database, respective sets of setting values of the image forming apparatuses are stored. The DBMS performs retrieving, updating and adding data, a consistency check, an exclusive lock, and a shared lock.

The WS server 4202 parses a SOAP request message received from the web server 4201, and provides a parsing result to the web application 4203, and generates a SOAP response message based on information from the web application 4203, and provides the SOAP response message to the web server 4201.

Return to FIG. 29, and in the host computer 4030, an interactive input and output device 4032 is connected to a host computer body 4031. In the host computer body 4031, an MPU 4033 is connected to a PROM 4035, a DRAM 4036, an HDD 4037, a network interface 4038, and the interactive input and output device 4032 via interfaces 4034.

In the PROM 4035, a BIOS and its setting values have been stored. The DRAM 4036 is used for a main memory device of a virtual memory system.

In the HDD 4037, an OS, drivers, and programs to be executed in an upper layer of the OS, and data have been stored.

As shown in FIG. 27, the programs and the data are used to embody a web server 4301, and a WS client 4302. The WS client 4302 performs client-server communication with the WS server 4101 in the image forming apparatus 4010. This web browser 4301 acts as a graphical user interface, and the web browser 4301 is a special web browser to send a service request to the image forming apparatus 4010 via the WS client 4302. In other words, the web browser 4301 is an application with web browser functions. The WS client 4302 generates a SOAP request message based on information from the web browser 4301, and provides it to a communication unit 4300. The WS client 4302 parses a SOAP response message received by the communication unit 4300, and provides a parsing result to the web browser 4301.

A communication unit 4100 in the image forming apparatus 4010, a communication unit 4200 in the server 4020, and the communication unit 4300 in the host computer 4030 have respective drivers (data link layers) of the network interfaces, respective TCP/IP layers, and respective socket layers realized by executing programs.

In the server 4020, the web application 4203 receives a request via the communication unit 4200 and the web server 4201, and performs a service corresponding to the request as follows. The web application 4203 causes a data management unit 4204 to register or update initial setting values of an image forming apparatus. The web application 4203 dynamically generates a user interface screen file (e.g. an HTML file or an XHTML file) based on the setting values to be sent to the panel web browser 4102, and sends it as a response of the request. Further, the web application 4203 receives an image reduction service request via the communication unit 4200 and the web server 4201, performs an image reduction service corresponding to the request, and sends a result of the service as a response of the request.

In the host computer 4030, when a user touches a control button on a screen of the interactive input and output device 4032, the web browser 4301 sends a service request corresponding to this user operation such as setting value change request or scan request to the image forming apparatus 4010 via the WS client 4302 and the communication unit 4300, and receives a result of the service from the requestee. Instead of the WS client 4302, the web browser 4301 can realize functions of the WS client 4302 by parsing a script contained by the user interface screen file and executing the script with class libraries. Web service requests and dynamic update of the user interface screen file can be realized with AJAX.

Figure 26:
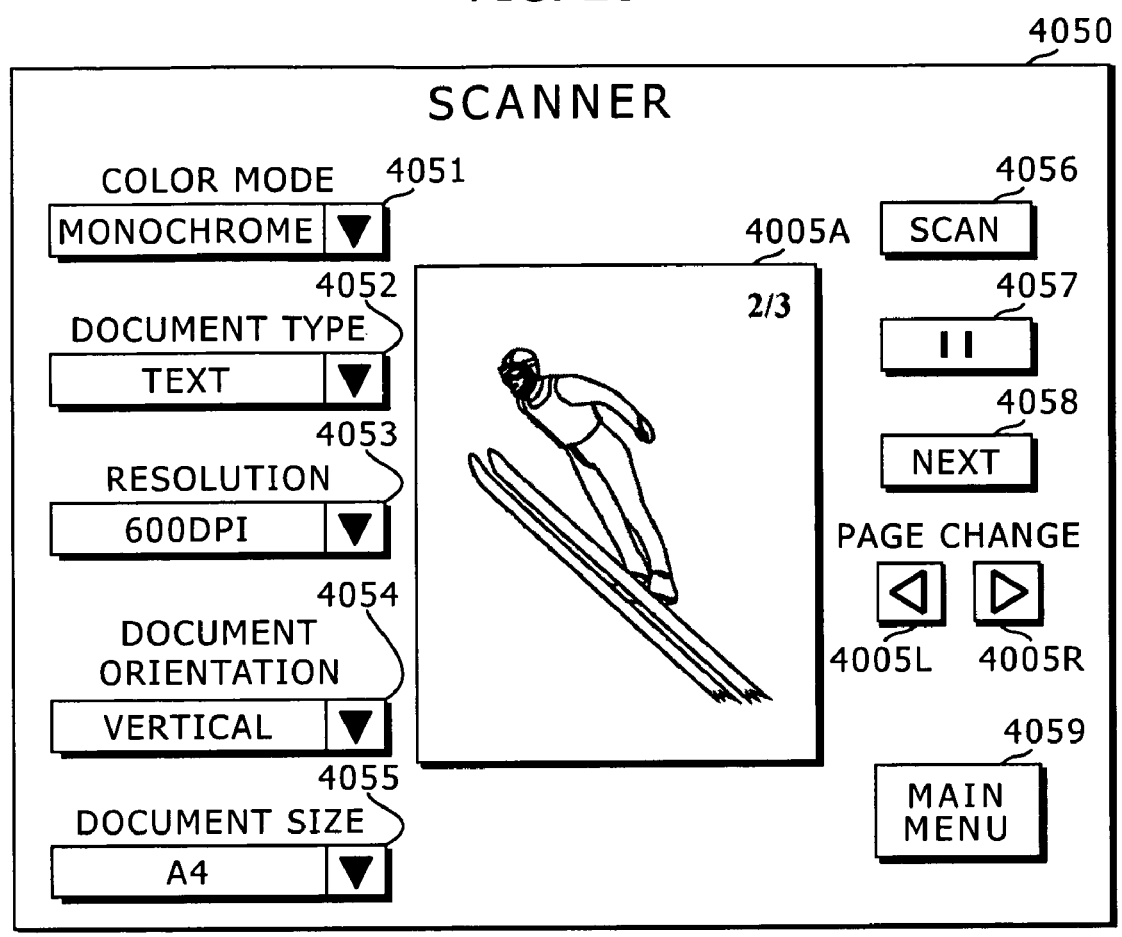
FIG. 26 shows a screen on an operation panel of the image forming apparatus at a scan in Embodiment 5.

If "scanner" is chosen in a main menu (not shown) displayed by the operation panel 4015, the operation panel 4015 displays a user interface screen 4050 as shown in FIG. 26. The user interface screen 4050 has selection boxes 4051 to 4055 for selection of setting values, a "scan" button 4056 for control, a scan pause/release button 4057 for control, a previous page button 4005L for control, a next page button 4005R for control, a "next" button 4058 to make a screen transition of this screen, and a "main menu" button 4059.

An event handler is described in a header part of the user interface screen file. In "Form" of the user interface screen file, selection input fields (i.e. Select boxes), and button fields are described corresponding to the selection boxes 4051 to 4055 and the buttons 4056 to 4059, 4005L and 4005R. Respective event handler calls are described in the fields as scripts (e.g. in JavaScript).

At the image forming apparatus 4010 shown in FIG. 28, a user puts a bunch of document paper sheets on a paper drawer tray 4161 of an auto sheet feeder 4160, and chooses setting values with the selection boxes 4051 to 4055, and then touches the scan button 4056. This user operation starts scanning a document image to generate image data. The image forming apparatus 4010 sends the image data and an image reduction request to the server 4020, and receives thumbnail image data as a response from the server 4020.

On the user interface screen 4050 shown in FIG. 26, a preview image (e.g. a thumbnail image) in an area 4005A is changed to a preview image of a previous page when a user touches the previous page button 4005L, and is changed to a preview image of a next page when a user touches the next page button 4005R. To update the preview image, HTML data used to display the user interface screen is partially and dynamically changed as well as mentioned above.

The user touches the pause/release button 4057 on the user interface screen 4050, and a scan pause service request is provided to the image forming function part 4502. The image forming function part 4502 pauses a scan operation according to the request. The pause/release button 4057 is a toggle button. The user touches this button again, and then a scan pause release service request is provided to the image forming function part 4502. The image forming function part 4502 resumes the scan operation according to the request.

After scanning a bunch of document paper sheets, the user touches the next button 4058 on the user interface screen 4050 shown in FIG. 26. According to this user operation, the image forming apparatus 4010 sends a request of a user interface screen file to the server 4020. This user interface screen file is used to execute a next process along a predetermined workflow. For example, this user interface screen file is to assign a file name and a file type to a file of scanned image data stored in the HDD 4027, and to attach retrieval meta data to the image data file.

When the user touches the main menu button 4059 on the user interface screen 4050, a request of a main user interface screen file is sent to the server 4020. The main user interface screen file is received as a response from the server 4020, and the operation panel 4015 displays a main user interface screen based on the received file.

In FIG. 27, in general, when the image forming apparatus 4010 is powered on, and when a user pushes down a button on the operation panel 4015 to send a request of a user interface screen, the panel web browser 4102 sends the request to the web server 4201 via the communication units 4100 and 4200. The request specifies a URL. If the URL contains an extension of a static file, then the web server sends the static file as a response to the panel web browser 4102 via the communication units 4100 and 4200. If the URL contains an extension of a dynamic file, then the request is provided to the web application 4203, and the web application 4203 reads out data from the data management unit 4204 according to the request, and dynamically generates a file based on the data, and provides the file to the WS server 4202. The WS server 4202 attaches a header to this file, and sends the file to the panel web browser 4102 via the communication units 4100 and 4200. Hereby, the operation panel 4015 displays a user interface screen based on this file.

When a user pushes down a button for an instruction on a screen of the operation panel 4015, the panel web browser 4102 generates an HTTP request message based on the file, and sends the HTTP request message to the web server 4201. The HTTP request message contains information on the pushed-down button and an input value. The web server 4201 provides the request message to the web application 4203. The web application 4203 generates a web service request message according the request message and a script in a file specified by the URL. The web application 4203 sends this web service request to the control unit 4104 via the WS server 4202, the web server 4201, the communication units 4200 and 4100, and the WS server 4101. The control unit 4104 receives the request, and starts a method with an argument. The method causes the image forming function part 4103 to perform an operation corresponding to the request.

As a result, an operation such as document image scan or its pause is executed in the image forming apparatus 4010.

Also, the host computer 4030 sends a request to the control unit 4104 by an HTTP request. Specifically, the web browser 4301 receives information on a user operation from the interactive input and output device 4032. If the user operation is for a request to the image forming apparatus 4010, then the web browser 4301 causes the WS client 4302 to generate and send a web service request message to the WS server 4101 via the communication units 4300 and 4100. The WS server 4101 provides this to the control unit 4104. The control unit 4104 starts a method according to this request for an operation of the image forming function part 4103, as well as mentioned above.

If the web service request is a scan start request, then scanned image data as a result of the operation is provided from the image forming function part 4103 to the web application 4203 via the control unit 4104, the WS server 4101, the communication units 4100 and 4200, the web server 4201, and the WS server 4202; or the scanned image data is provided to the web browser 4301 via the control unit 4104, the WS server 4101, the communication units 4100 and 4300 and the WS client 4302.

In this embodiment, a requester ID is inserted into each of service requests from either the panel web browser 4102 or the WS server 4101 to the control unit 4104. This ID is data to identify an entity that issues a service request, for example, an IP address, a MAC address of the network interface 4019, a machine name, or a serial number assigned independently from these identifiers.

Figure 24:
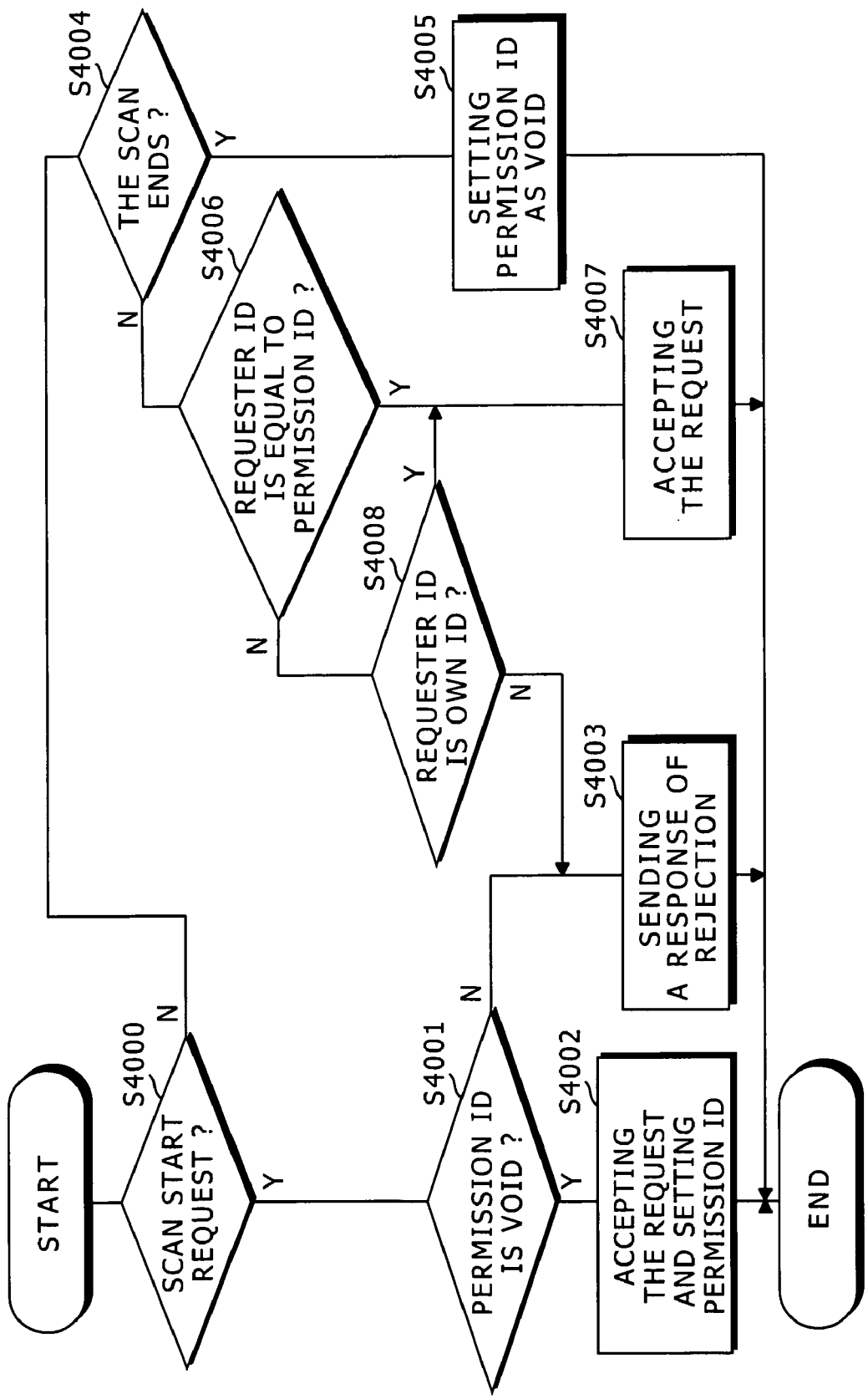
FIG. 24 shows a schematic flowchart that indicates a document image scan by a control unit in an image forming apparatus of Embodiment 5.

FIG. 24 shows a schematic flowchart that indicates a process of the control unit 4104 corresponding to a service request from the panel web browser 4102 or the WS server 4101. This process is started for each of requests.

(Step S4000) if the received service request is a scan start request, then the control unit 4104 next executes Step S4001; otherwise, the control unit 4104 next executes Step S4004.

(Step S4001) if the value of a permission ID as a variable is void, then the control unit 4104 next executes Step S4002; otherwise, the control unit 4104 next executes Step S4003.

(Step S4002) the control unit 4104 sets the permission ID as the requester ID included in the request, and accepts the request. Further, the control unit 4104 starts a method to cause the image forming function part 4103 to perform a document scan, and sends scanned image data to the requester, and then ends this process. For example, as shown in FIG. 25, if the control unit 4104 receives a scan start request from the panel web browser 4102 of an apparatus with ID1 (e.g. the image forming apparatus 4010) when the value of the permission ID is void, then the control unit 4104 accepts this request, and causes to perform the requested scanner operation in Step S4002.

(Step S4003) the control unit 4104 sends a response that indicates a rejection of the request, and then ends this process.

Figure 25:
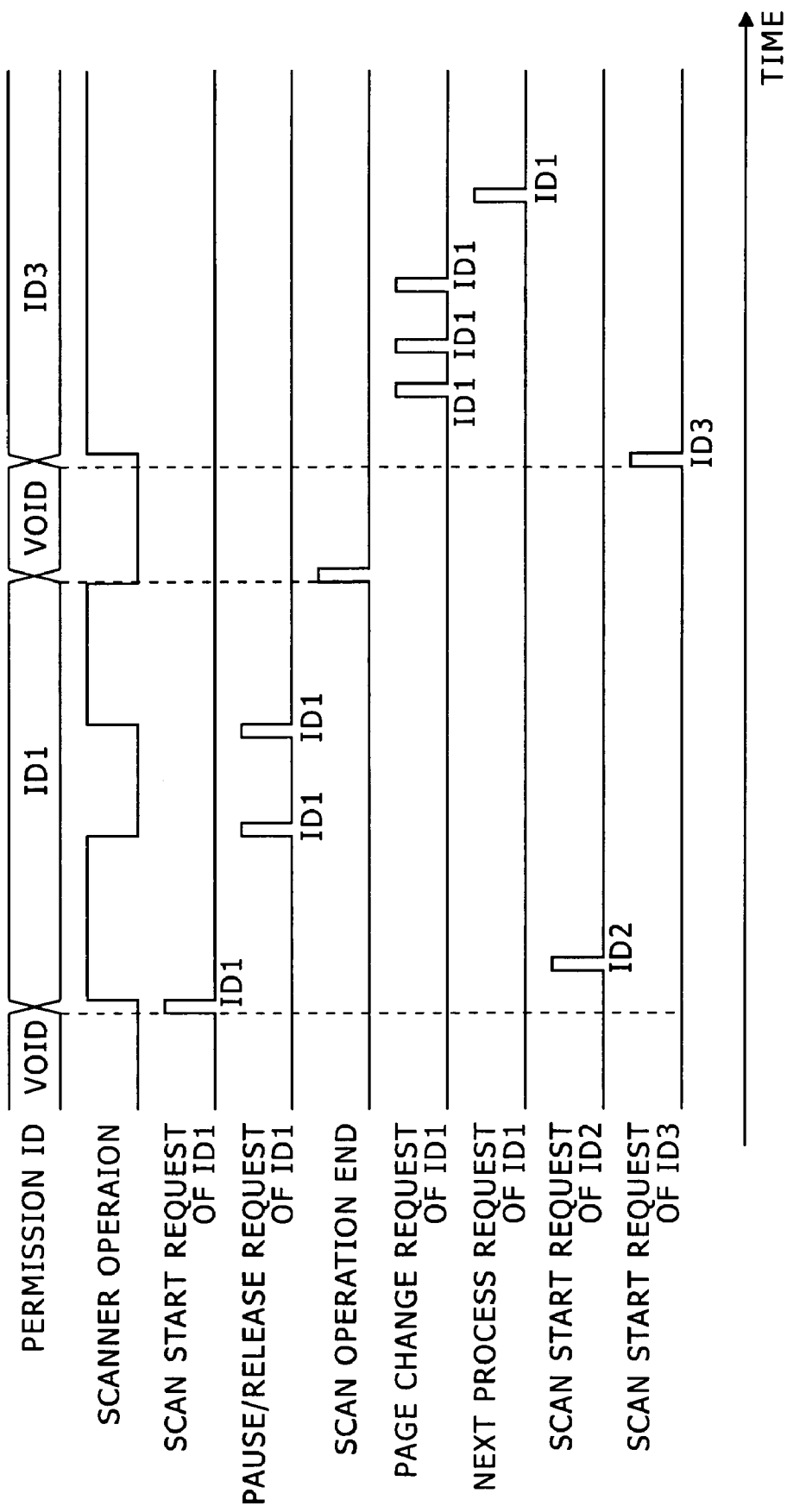
FIG. 25 shows a timing chart that indicates timings in the process shown in FIG. 24.

For example, as shown in FIG. 25, if the control unit 4104 receives a scan start request from another apparatus with ID2 (e.g. the host computer 4030) immediately after the value of the permission ID is set as ID1, then the control unit 4104 rejects this request, and keeps the permission ID as ID1.

(Step S4004) If the control unit 4104 has received a notification on the end of the scan, then the control unit 4104 next executes Step S4005; otherwise, the control unit 4104 next executes Step S4006.

(Step S4005) the control unit 4104 resets the permission ID as void, and ends this process.

(Step S4006) if the requester ID is equal to the permission ID, then the control unit 4104 executes Step S4007; otherwise, the control unit 4104 executes Step S4008.

(Step S4007) since the requester ID is equal to the permission ID, the control unit 4104 accepts the request, and causes the image forming function part 4103 to perform a process corresponding to the request. For example, if a user pushes down the pause/release button 4057 on the operation panel 4015, then the control unit 4104 receives a pause request from the panel web browser 4102, and causes to pause the scan operation according to this request. After pausing, if the user pushes down the pause/release button 4057 again, then the control unit 4104 receives a pause release request, and causes to resume the scan operation according to this request. As shown in FIG. 25, the control unit 4104 sets the permission ID as void upon finishing a scan requested by the apparatus with ID1. If the control unit 4104 receives a scan start request from an apparatus with ID3, then the control unit 4104 accepts this request in Step S4002, and changes the value of the permission ID to ID3.

(Step S4008) the control unit 4104 determines whether or not the requester ID is its own ID of the image forming apparatus. If the requester ID is its own ID, then the control unit 4104 accepts the request in Step S4007; otherwise the control unit 4104 rejects the request.

For example, where the permission ID is ID3, a scan operation of ID3 is performed in the image forming apparatus with ID1. In parallel with this scan operation of ID3, it is possible to change a thumbnail image to one of a previous or next page in the user interface screen in Step S4007 by pushing down the previous page button 4005L or the next page button 4005R in the user interface screen of the image forming apparatus with ID1. Further, in parallel with this scan operation of ID3, it is possible to perform a next operation along a workflow in Step S4007 by pushing down the next button 4058 in the user interface screen of the image forming apparatus with ID1.

According to this embodiment, a requester ID as an identifier of a requester is attached to each of requests, and when a scan start request is received, a requester ID in the request is stored as the permission ID. If the permission ID is not void, then the control unit 4104 does not receive any request from the apparatuses other than the apparatus with permission ID until the scan of the scan start request ends. Therefore, the image forming apparatus prevents an unintended scan operation.

In addition, even though the requester ID is not the permission ID, if the requester ID is its own ID, then scan-related requests are received other than a scan start request and a scan end request. Thus, after the image forming apparatus 4010 finishes a scan corresponding to an instruction input on the operation panel 4015 of the image forming apparatus 4010, it is possible to browse thumbnail images in the image forming apparatus 4010 even while the image forming apparatus 4010 is performing another scan corresponding to an instruction from another apparatus.

The description of the present invention has been presented for purposes of illustration and description, and is not intended to be exhaustive or limited to the invention in the form disclosed. Many modifications and variations will be apparent to those of ordinary skill in the art.

In Embodiment 1, instead of inquiring a manufacturer name and whether the image forming apparatus 50 is an MFP or not, the system may have another configuration and may perform another process as follow. In the another configuration, the HDD 67 may have a table. The table contains a set of a part of a machine name (e.g. "KM-" in "KM-4000", or "MX-" in "MX-4000"), a manufacturer name and type information for each of machine names of image forming apparatuses. The type information indicates whether an image forming apparatus of which machine name includes the corresponding part (e.g. "KM-" or "MX-") is an MFP or not. In the another configuration, the user interface device 60 inquires a machine name of the image forming apparatus 50, and retrieves the table for the part of the machine name, and determines, according to the type information corresponding to the part of the machine name, its manufacturer name and whether the apparatus 50 is an MFP. The table may have only sets of the part of a machine name, and a manufacturer name for MFPs, and not have the type information. Further, instead of using a manufacturer name that specifies a part of the WS client 602 to be used, the HDD 67 may have a table in which the part of a machine name is associated with the part of the WS client 602.

In Embodiment 1, the server 30 may inquire, of each of the image forming apparatuses 50, whether the image forming apparatus 50 is compatible with the extended user interface device 60, and the extended user interface device 60 may obtain a result of the inquiry from the server 30.

In respective Embodiments 1 to 5, a protocol used for the web services is not limited to SOAP, and the protocol may be one that is capable of the aforementioned web services.

In Embodiment 2, instead of the process shown in FIG. 8, the system may have another configuration in which a user can change the scan mode of the image forming apparatus 50 to "continuous scan mode" manually. In the another configuration, after changing to "continuous scan mode" at once, one of the two scan modes is used adequately.

In Embodiment 2, the default scan mode of the image forming apparatus in a standalone state may be "continuous scan mode".

In Embodiment 2, in a state that the "next scan" button 1550 is not available, the button 1550 may be grayed out, and any touches to the button 1550 may not be received. As a result, Step S1022 is always executed next to Step S1025. Consequently, Step S1026 is not necessary.

In Embodiments 2 to 4, instead of using the WSDL file, the WS clients 1602 and 2602 may provide a device independent setting value and a device independent control command to a device driver such as TWAIN driver for a scanner via the WS servers 1501 and 2501 of the image forming apparatus 50.

In respective Embodiments 3 and 4, a node that does not have any unselectable nodes in its downstream may be omitted.

Figure 18B:
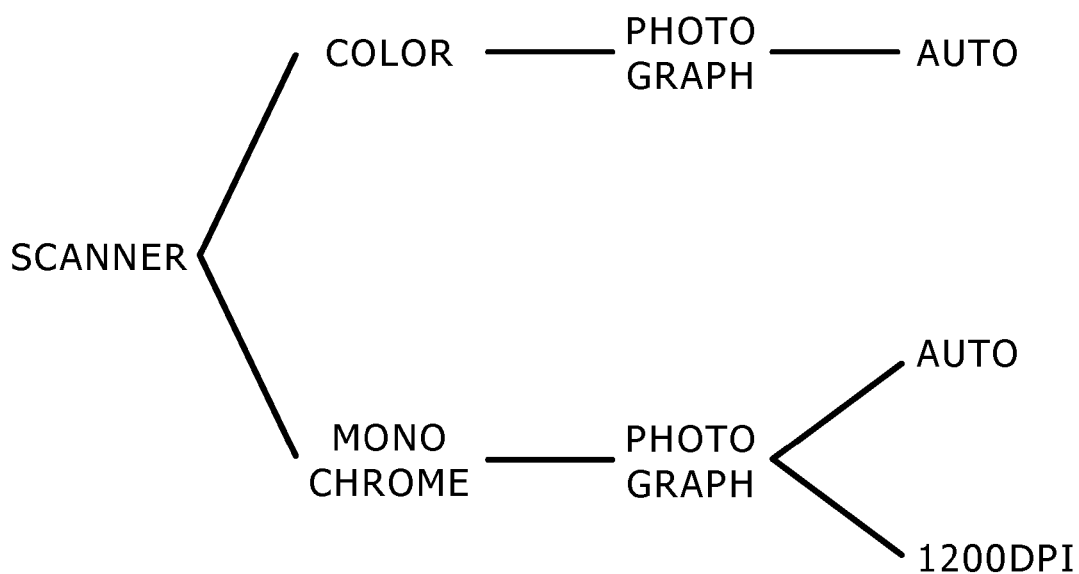
FIG. 18B shows a setting state tree that contains only unselectable combinations of setting values in Embodiment 3.

In Embodiment 3, an unselectable setting state tree as shown in FIG. 18B may be used instead of the setting state tree shown in FIG. 18A. The unselectable setting state tree contains only unselectable setting states. If the unselectable setting state tree is used, then a structure variable may be used to keep a current setting state instead of the variable ST, and in Step S2001 of FIG. 15, it may be determined whether the unselectable setting state tree contains the current setting state. This configuration reduces the amount of data required to determine whether the selected setting value is selectable or not.

In respective Embodiments 3 and 4, "Form" in an HTML file or an XHTML file as the user interface screen file may have a confirmation button, and when a user touches the confirmation button, the current setting state (the current combination of setting values) may be transmitted to the selectablility determining unit 2503 to execute the aforementioned process.

In respective Embodiments 3 and 4, instead of the WS client 2602, a script may be inserted in the XHTML file, and executed to realize functions of the WS client 2602.

In respective Embodiments 3 and 4, the image forming apparatus can perform another image forming function such as copying, printing, facsimile transmission or email transmission other than scanning.

In respective Embodiments 3 and 4, instead of the user interface device 60, its program may be stored in storage of the image forming apparatus 50, and instead of the touch panel 62, the operation panel 55 may be used. Hereby, the communication unit 2600, the WS client 2602, and the WS server 2501 can be omitted.

Figure 22B:
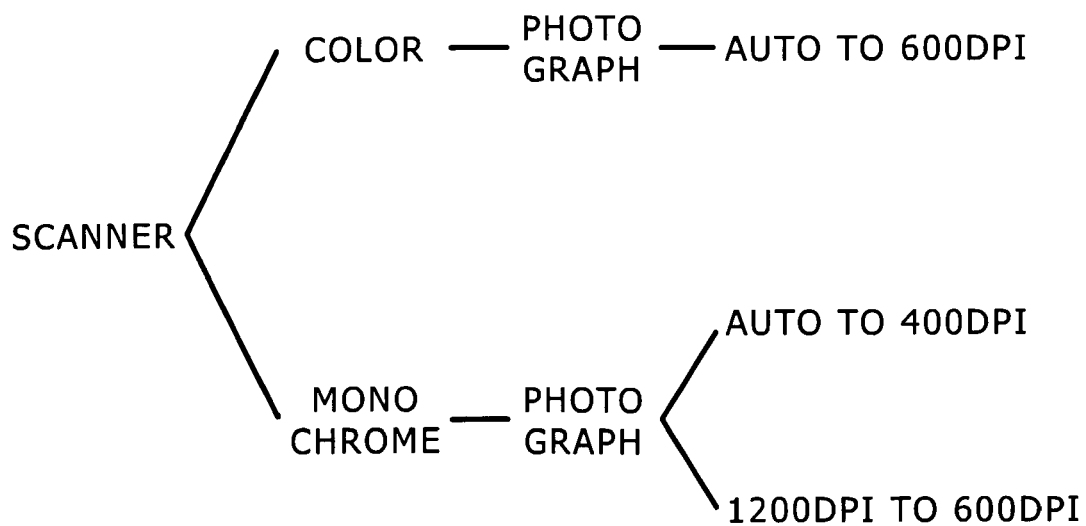
FIG. 22B shows a setting state tree that contains only unselectable combinations of setting values in Embodiment 4.

In Embodiment 4, an unselectable setting state tree as shown in FIG. 22B may be used instead of the setting state tree shown in FIG. 22A. The unselectable setting state tree contains only unselectable setting states. If the unselectable setting state tree is used, then a structure variable may be used to keep a current setting state instead of the variable ST, and in Step S3001 of FIG. 20, it may be determined whether the unselectable setting state tree contains the current setting state. This configuration reduces the amount of data required to determine whether the selected setting value is selectable or not.

In Embodiment 4, for simplicity, the most probable value as a change value may be either a standard value or an initial value.

The methodology of Embodiment 5 can be applied to prevent conflicts of web services in the case that the image forming apparatus does not have an operation panel, and receives web services from host computers.

This invention also applies to an image forming system that includes an image forming apparatus other than an MFP.

What is claimed is:

1. A document scanning method, comprising the steps of:
   (a) connecting an extended user interface device to an image forming apparatus, the extended user interface device having an extended operation panel, the image forming apparatus having an operation panel and a scanner with an auto sheet feeder;
   (b) sending a scan request to the image forming apparatus by the extended user interface device, the scan request corresponding to an instruction received by the extended operation panel;
   (c) generating respective pieces of image data corresponding to document images scanned by the scanner according to either the scan request or respective first instructions received by the operation panel of the image forming apparatus after the scan request, and sending the pieces of the image data and scan end information to the extended user interface device, the scan end information corresponding to a second instruction received by the operation panel of the image forming apparatus; and
   (d) receiving the pieces of image data and the scan end information by the extended user interface device, and determining that pieces of the image data received until the scan end information is received are image data of one scan job.

2. The document scanning method according to claim 1, further comprising the steps of:
   storing setting information in a storage unit, the setting information indicating a scan mode available when the image forming apparatus is capable of using the extended user interface device, the scan mode being either "continuous scan mode" or "discontinuous scan mode";
   identifying the scan mode upon each of the first instructions;
   if the scan mode is "continuous scan mode", then enabling the operation panel of the image forming apparatus to receive the first instructions and the second instruction; and
   if the scan mode is "discontinuous scan mode", then generating respective pieces of image data corresponding to document images scanned by driving the auto sheet feeder until the end of the document images according to the scan request, and automatically sending the scan end information to the extended user interface device after all the pieces of image data are sent.

3. The document scanning method according to claim 2, wherein
   a workflow to specify a processing procedure is stored in the storage unit; and
   when the extended operation panel receives the second instruction, if the scan end information has been received, the extended user interface device executes a next process along the workflow.

4. An image forming apparatus, comprising:
   an image forming apparatus body that has an operation panel, an auto sheet feeder, a scanner, a first control unit, and a first communication unit; and
   an extended user interface device that has an extended operation panel, a second control unit, and a second communication unit;
   wherein the second control unit sends a scan request to the first control unit via the first communication unit and the second communication unit according to an instruction received by the extended operation panel;
   the first control unit generates respective pieces of image data corresponding to document images scanned by the scanner according to either the scan request or respective first instructions received by the operation panel of the image forming apparatus body after the scan request, and sends the pieces of the image data and scan end information to the second control unit via the first communication unit and the second communication unit, the scan end information corresponding to a second instruction received by the operation panel of the image forming apparatus body;
   the second control unit receives the pieces of image data and the scan end information, and determines that pieces of the image data received until the scan end information is received are image data of one scan job.

5. The image forming apparatus according to claim 4, wherein
   the image forming apparatus body further has a storage unit;
   the first control unit stores setting information in the storage unit, the setting information indicates a scan mode available when the image forming apparatus is capable of using the extended user interface device, and the scan mode is either "continuous scan mode" or "discontinuous scan mode";
   the first control unit identifies the scan mode upon each of the first instructions; and
   if the scan mode is "continuous scan mode", then the first control unit enables the operation panel of the image forming apparatus body to receive the first instructions and the second instruction; and
   if the scan mode is "discontinuous scan mode", then the first control unit generates respective pieces of image data corresponding to document images scanned by driving the auto sheet feeder until the end of the document images according to the scan request, and automatically sends the scan end information to the second control unit after all the pieces of image data are sent.

6. The image forming apparatus according to claim 5, wherein
   a workflow to specify a processing procedure is stored in the storage unit; and
   when the extended operation panel receives the second instruction, if the scan end information has been received, the second control unit executes a next process along the workflow.

7. The image forming apparatus according to claim 4, wherein
   the extended user interface device is connected to a server by the second communication unit; and
   the second control unit sends a request to the server, receives a user interface screen file as a response from the server, and causes the extended operation panel to display a screen based on the user interface screen file.

8. The image forming apparatus according to claim 7, wherein
   the extended user interface device sends a piece of the received image data with a preview screen data request to the server, receives a preview screen data from the server, and causes the extended operation panel to display a preview screen based on the preview screen data.

9. The image forming apparatus according to claim 7, wherein
   the second control unit has a web browser to cause the extended operation panel to display a user interface screen based on the user interface screen file.

10. An image forming system, comprising:
    an image forming apparatus; and
    a server;

wherein the image forming apparatus comprises:

an image forming apparatus body that has an operation panel, an auto sheet feeder, a scanner, a first control unit, and a first communication unit; and an extended user interface device that has an extended operation panel, a second control unit, and a second communication unit;

wherein the second control unit sends a scan request to the first control unit via the first communication unit and the second communication unit according to an instruction received by the extended operation panel;

the first control unit generates respective pieces of image data corresponding to document images scanned by the scanner according to either the scan request or respective first instructions received by the operation panel of the image forming apparatus body after the scan request, and sends the pieces of the image data and scan end information to the second control unit via the first communication unit and the second communication unit, the scan end information corresponding to a second instruction received by the operation panel of the image forming apparatus;

the second control unit receives the pieces of image data and the scan end information, and determines that pieces of the image data received until the scan end information is received are image data of one scan job;

the extended user interface device is connected to the server by the second communication unit; and the second control unit sends a request to the server, receives a user interface screen file as a response from the server, and causes the extended operation panel to display a screen based on the user interface screen file; and the server is connected to the second communication unit, receives the request from the second control unit, and sends the user interface screen file to the second control unit.

11. A setting value managing method, comprising the steps of:

(a) connecting an image forming apparatus, a user interface device as an extended console of the image forming apparatus, and a user interface server to each other via a communication medium, the user interface server managing a screen transition of the user interface device;

(b) storing setting information on selectablility of setting values in a storage unit of the image forming apparatus;

(c) receiving input of setting value selection information by a user interface screen of the user interface device, and sending the setting value selection information to the image forming apparatus by the user interface device upon receiving the input or finalizing the input; and (d) receiving the setting value selection information by the image forming apparatus, determining whether a setting value specified in the setting value selection information is selectable or not according to the setting information by the image forming apparatus, and if it is determined that the setting value is not selectable, then sending information that the setting value is not selectable to the user interface device by the image forming apparatus.

12. The setting value managing method according to claim 11, further comprising the step of:

(e) if the user interface device receives the information that the setting value is not selectable, then displaying this information in the user interface screen by the user interface device.

13. The setting value managing method according to claim 11, wherein
the setting information includes only unselectable setting values out of all setting values.

14. The setting value managing method according to claim 11, wherein
the user interface screen is displayed with a web browser; and
the setting value selection information is sent as a SOAP request message in the step (c), and the information that the setting value is not selectable is sent as a SOAP response message in the step (d).

15. An image forming apparatus, comprising:
a processor;
an operation panel;
a communication interface connected to a user interface device as an extended console, and a user interface server via a communication medium, the user interface server managing a screen transition of the user interface device; and
a storage unit where a program and data are stored;
wherein the data includes setting information on selectability of setting values; and
the program causes the processor to execute the steps of:
receiving setting value selection information from the user interface device;
determining whether a setting value specified in the setting value selection information is selectable or not according to the setting information; and
if it is determined that the setting value is not selectable, then sending information that the setting value is not selectable to the user interface device.

16. The image forming apparatus according to claim 15, wherein
the setting information includes only unselectable setting values out of all setting values.

17. An image forming apparatus, comprising:
a processor;
an operation panel;
a communication interface connected to a user interface server via a communication medium, the user interface server managing a screen transition of a user interface screen on the operation panel; and
a storage unit where a program and data are stored;
wherein the data includes setting information on selectability of setting values; and
the program causes the processor to execute the steps of:
receiving input of a setting value by the operation panel;
determining whether the setting value is selectable or not according to the setting information; and
if it is determined that the setting value is not selectable, then causing the operation panel to display information that the setting value is not selectable in the user interface screen.

18. A user interface device that acts as an extended console of an image forming apparatus, comprising:
an interactive input and output unit;
a communication interface connected via a communication medium to the image forming apparatus and a user interface server that manages a screen transition of a user interface screen in the interactive input and output unit;

a processor; and a storage unit where a program is stored;

wherein the program causes the processor to execute the steps of:
- (a) sending setting value selection information to the image forming apparatus upon receiving input of the setting value selection information by a user interface screen or finalizing the input; and
- (b) if information that a setting value specified in the setting value selection information is not selectable is received from the image forming apparatus, then causing the interactive input and output unit to display the received information in the user interface screen.

19. An image forming apparatus, comprising:

an image forming apparatus body; and a user interface device that acts as an extended console of the image forming apparatus body;

wherein the image forming apparatus body comprises:
- a first processor;
- a first communication interface connected to the user interface device and a user interface server via a communication medium, the user interface server managing a screen transition of a user interface screen in the user interface device;
- an operation panel; and
- a first storage unit where a first program and data are stored;
- wherein the data includes setting information on selectability of setting values; and
- the first program causes the first processor to execute the steps of:
  - receiving setting value selection information from the user interface device;
  - determining whether a setting value specified in the setting value selection information is selectable or not according to the setting information; and
  - if it is determined that the setting value is not selectable, then sending information that the setting value is not selectable to the user interface device; and the user interface device comprises:
- an interactive input and output unit;
- a second communication interface connected via a communication medium to the image forming apparatus body, and the user interface server that also manages a screen transition of the interactive input and output unit;
- a second processor;
- a second storage unit where a second program is stored;
- wherein the second program causes the second processor to execute the steps of:
  - (a) sending setting value selection information to the image forming apparatus body upon receiving input of the setting value selection information by a user interface screen or finalizing the input; and
  - (b) if information that the setting value is not selectable is received from the image forming apparatus body, then causing the interactive input and output unit to display the received information in the user interface screen.

20. A setting value managing method, comprising the steps of:
- (a) connecting an image forming apparatus, a user interface device as an extended console of the image forming apparatus, and a user interface server to each other via a communication medium, the user interface server managing a screen transition of the user interface device;
- (b) storing automatic change setting information in a storage unit of the image forming apparatus, the automatic change setting information including a pair of an unselectable setting value and a change value of the unselectable setting value;
- (c) receiving input of setting value selection information by a user interface screen of the user interface device, and sending the setting value selection information to the image forming apparatus by the user interface device upon receiving the input or finalizing the input; and
- (d) receiving the setting value selection information by the image forming apparatus, determining whether a setting value specified in the setting value selection information is selectable or not according to the automatic change setting information by the image forming apparatus, and if it is determined that the setting value is not selectable, then changing the setting value to the change value of the setting value by the image forming apparatus.

21. The setting value managing method according to claim 20, wherein further in the step (d), change notification information is sent to the user interface device, and the change notification information indicates that the selected setting value was automatically changed to the change value.

22. The setting value managing method according to claim 21, further comprising the step of:
- (e) receiving the change notification information, and displaying the change notification information in the user interface screen by the user interface device.

23. The setting value managing method according to claim 21, wherein the user interface screen is displayed with a web browser; and the setting value selection information is sent as a SOAP request message in the step (c), and the change notification information is sent as a SOAP response message in the step (d).

24. The setting value managing method according to claim 20, wherein the automatic change setting information includes only pairs of respective unselectable setting values out of all available setting values and respective change values of the unselectable setting values.

25. An image forming apparatus, comprising:

a processor;

an operation panel;

a communication interface connected to a user interface device as an extended console, and a user interface server via a communication medium, the user interface server managing a screen transition of the user interface device; and a storage unit where a program and data are stored;

wherein the data includes automatic change setting information that has a pair of an unselectable setting value and a change value of the unselectable setting value; and the program causes the processor to execute the steps of:
- (a) receiving setting value selection information from the user interface device, and determining whether a setting value specified in the setting value selection information is selectable or not according to the automatic change setting information; and
- (b) if it is determined that the setting value is not selectable, then changing the setting value to the change value of the setting value according to the automatic change setting information.

26. The image forming apparatus according to claim 25, wherein
the program further causes the processor to send change notification information to the user interface device in the step (b), and the change notification information indicates that the selected setting value was automatically changed to the change value.

27. The image forming apparatus according to claim 25, wherein
the automatic change setting information includes only pairs of respective unselectable setting values out of all available setting values and respective change values of the unselectable setting values.

28. An image forming apparatus, comprising:
a processor;
an operation panel;
a communication interface connected to a user interface server via a communication medium, the user interface server managing a screen transition of a user interface screen on the operation panel; and
a storage unit where a program and data are stored;
wherein the data includes automatic change setting information that has a pair of an unselectable setting value and a change value of the unselectable setting value; and
the program causes the processor to execute the steps of:
receiving input of a setting value by the operation panel;
determining whether the setting value is selectable or not according to the automatic change setting information; and
if it is determined that the setting value is not selectable, then changing the setting value to the change value of the setting value according to the automatic change setting information.

29. A user interface device that acts as an extended console of an image forming apparatus, comprising:
a processor;
an interactive input and output unit;
a communication interface connected via a communication medium to the image forming apparatus and a user interface server that manages a screen transition of a user interface screen in the interactive input and output unit; and
a storage unit where a program is stored;
wherein the program causes the processor to execute the steps of:
(a) sending setting value selection information to the image forming apparatus upon receiving input of the setting value selection information by a user interface screen or finalizing the input; and
(b) receiving change notification information from the image forming apparatus, and causing the interactive input and output unit to display the change notification information in the user interface screen, wherein the change notification information indicates that a setting value specified in the setting value selection was automatically changed to a change value corresponding to the setting value.

30. An image forming apparatus, comprising:
an image forming apparatus body;
a user interface device that acts as an extended console of the image forming apparatus body;
wherein the image forming apparatus body comprises:
a first processor;
a first communication interface connected to the user interface device, and a user interface server via a communication medium, the user interface server managing a screen transition of the user interface device;
an operation panel;
a first storage unit where a first program and data are stored;
wherein the data includes automatic change setting information that has a pair of an unselectable setting value and a change value of the unselectable setting value; and
the first program causes the first processor to execute the steps of:
(a) receiving setting value selection information from the user interface device, and determining whether a setting value specified in the setting value selection information is selectable or not according to the automatic change setting information; and
(b) if it is determined that the setting value is not selectable, then changing the setting value to the change value of the setting value according to the automatic change setting information, and sending change notification information to the user interface device, wherein the change notification information indicates that the selected setting value was automatically changed to the change value; and
the user interface device comprises:
a second processor;
an interactive input and output unit;
a second communication interface connected via a communication medium to the image forming apparatus body and a user interface server that manages a screen transition of a user interface screen in the interactive input and output unit; and
a second storage unit where a second program is stored;
wherein the second program causes the second processor to execute the steps of:
(c) sending the setting value selection information to the image forming apparatus upon receiving input of the setting value selection information by a user interface screen or finalizing the input; and
(d) receiving the change notification information from the image forming apparatus, and causing the interactive input and output unit to display the change notification information in the user interface screen.

31. An image forming apparatus, comprising:
a scanner;
a storage unit;
an instruction inputting part that has devices capable of receiving an instruction input at different places; and
a control part that receives a scan start request from the instruction inputting part, drives the scanner upon receiving the request, and stores document image data output by the scanner in the storage unit;
wherein the instruction inputting part relates a requester identifier to the scan start request and other scan-related requests; and
the control part stores the requester identifier of a scan start request in the storage unit as a permission identifier when the scan start request is received, and does not receive another scan start request related to a requester identifier other than the permission identifier until a scan with the permission identifier is finished.

32. The image forming apparatus according to claim 31, wherein
the scan start request and the other scan-related requests are web service requests to the control part.

33. The image forming apparatus according to claim 31, wherein
the instruction inputting part has an operation panel, and a communication unit that receives an instruction input from outside.

34. The image forming apparatus according to claim 33, wherein
even though the requester identifier in a scan-related request is not the permission identifier, if the permission identifier is its own identifier, then the control part receives the scan-related request except for a scan start request and a scan end request.

35. The image forming apparatus according to claim 33, wherein
the control part comprises:
a web browser that receives a scan-related request from the operation panel; and
a control unit that receives a web service request from the web browser, and a web service request from the communication unit.

36. An image forming system, comprising:
an image forming apparatus; and
respective personal computers connected to a communication unit of the image forming apparatus, and capable of sending a scan-related request to the image forming apparatus;
wherein the image forming apparatus comprises:
a scanner;
a storage unit;
an instruction inputting part that has devices capable of receiving an instruction input at different places; and
a control part that receives a scan start request from the instruction inputting part, drives the scanner upon receiving the request, and stores document image data output by the scanner in the storage unit;
wherein the instruction inputting part relates a requester identifier to the scan start request and other scan-related requests; and
the control part stores the requester identifier of a scan start request in the storage unit as a permission identifier when the scan start request is received, and does not receive another scan start request related to a requester identifier other than the permission identifier until a scan with the permission identifier is finished.

* * * * *